(12) United States Patent
Sakazume

(10) Patent No.: US 10,218,995 B2
(45) Date of Patent: Feb. 26, 2019

(54) MOVING PICTURE ENCODING SYSTEM, MOVING PICTURE ENCODING METHOD, MOVING PICTURE ENCODING PROGRAM, MOVING PICTURE DECODING SYSTEM, MOVING PICTURE DECODING METHOD, MOVING PICTURE DECODING PROGRAM, MOVING PICTURE REENCODING SYSTEM, MOVING PICTURE REENCODING METHOD, MOVING PICTURE REENCODING PROGRAM

(71) Applicant: JVC KENWOOD CORPORATION, Yokohama-shi, Kanagawa (JP)

(72) Inventor: Satoru Sakazume, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 67 days.

(21) Appl. No.: 14/692,138

(22) Filed: Apr. 21, 2015

(65) Prior Publication Data

US 2015/0229942 A1    Aug. 13, 2015

Related U.S. Application Data

(62) Division of application No. 12/995,039, filed as application No. PCT/JP2009/059801 on May 28, 2009, now Pat. No. 9,042,448.

(30) Foreign Application Priority Data

May 30, 2008  (JP) .............................. P2008-142433
May 22, 2009  (JP) .............................. P2009-123960

(51) Int. Cl.
*H04N 19/33*    (2014.01)
*H04N 19/40*    (2014.01)
(Continued)

(52) U.S. Cl.
CPC ............. *H04N 19/50* (2014.11); *H04N 19/33* (2014.11); *H04N 19/40* (2014.11);
(Continued)

(58) Field of Classification Search
USPC ............ 375/240.12, 240.18, E7.243, E7.226
See application file for complete search history.

(56) References Cited

U.S. PATENT DOCUMENTS 6,091,855 A    7/2000  Hosaka et al.
6,173,013 B1 *  1/2001  Suzuki ................. H04N 19/563
                                                            375/240.16
(Continued)

FOREIGN PATENT DOCUMENTS

JP    07-162870 A    6/1995
JP    2007-110348 A  4/2007
(Continued)

OTHER PUBLICATIONS

Ong Chin Phek et al.(Machine translation of JP 2007-316161 A).*
(Continued)

*Primary Examiner* — Behrooz M Senfi
*Assistant Examiner* — Ana Picon-Feliciano
(74) *Attorney, Agent, or Firm* — Nath, Goldberg & Meyer; Jerald L. Meyer; Stanley N. Protigal

(57) ABSTRACT

A first super-resolution enlarger (103) works on moving pictures input with a standard resolution, implementing a process for a super-resolution enlargement including information on frequency components in the spatial and temporal directions that has been potentially contained in the input moving pictures but unable to express to a sufficient degree by the standard resolution, and provides super-resolution enlarged signals, which are returned to the standard resolution at a first resolution converter (104). The super-resolution enlarged signals as returned to the standard resolution
(Continued)

are encoded at a second encoder (107). A first encoder (102) encodes moving pictures input with the standard resolution, and a multiplexer (109) multiplexes a sequence of encoded bits from a first encoder (102), a sequence of encoded bits from the second encoder (107), and the like. The second encoder (107) employs local decoded signals in the first encoder (102) or processed signals thereof, as reference signals.

11 Claims, 25 Drawing Sheets

(51) Int. Cl.
*H04N 19/44* (2014.01)
*H04N 19/50* (2014.01)
*H04N 19/59* (2014.01)
*H04N 19/61* (2014.01)
*H04N 19/70* (2014.01)
*H04N 19/80* (2014.01)
*H04N 19/91* (2014.01)
*H04N 19/436* (2014.01)

(52) U.S. Cl.
CPC ........... *H04N 19/436* (2014.11); *H04N 19/44* (2014.11); *H04N 19/59* (2014.11); *H04N 19/61* (2014.11); *H04N 19/70* (2014.11); *H04N 19/80* (2014.11); *H04N 19/91* (2014.11)

(56) References Cited

U.S. PATENT DOCUMENTS

| | | | |
|---|---|---|---|
| 6,580,754 B1 | 6/2003 | Wan et al. | |
| 7,106,914 B2 | 9/2006 | Tipping et al. | |
| 7,379,496 B2 * | 5/2008 | Holcomb | H04N 19/527 |
| | | | 375/240.03 |
| 7,428,639 B2 | 9/2008 | Demos | |
| 2001/0048719 A1 * | 12/2001 | Takeuchi | H04N 21/2368 |
| | | | 375/240.15 |
| 2005/0105814 A1 | 5/2005 | Bruls et al. | |
| 2005/0128307 A1 | 6/2005 | Kobayashi et al. | |
| 2005/0195899 A1 | 9/2005 | Han | |
| 2007/0064795 A1 | 3/2007 | Cho et al. | |
| 2007/0091997 A1 | 4/2007 | Fogg et al. | |
| 2007/0103595 A1 | 5/2007 | Gong et al. | |
| 2007/0133680 A1 | 6/2007 | Kimoto | |
| 2007/0160153 A1 | 7/2007 | Sullivan | |
| 2007/0189385 A1 | 8/2007 | Park et al. | |
| 2007/0247529 A1 | 10/2007 | Toma et al. | |
| 2008/0043832 A1 * | 2/2008 | Barkley | H04N 21/23432 |
| | | | 375/240 |
| 2009/0034941 A1 | 2/2009 | Kageyama et al. | |

FOREIGN PATENT DOCUMENTS

| | | | |
|---|---|---|---|
| JP | 2007-316161 A | | 12/2007 |
| JP | 2007316161 A | * | 12/2007 |
| JP | 2008-042407 A | | 2/2008 |
| JP | 2008-053848 A | | 3/2008 |

OTHER PUBLICATIONS

Sung Cheol Park, et al., "Super-Resolution Image Reconstruction: A Technical Overview", Signal Processing Magazine, vol. 20, Issue 3, IEE, pp. 21-37, May 2003.
Office Action dated May 21, 2013, in the counterpart Japanese Application No. 2009-123960, two (2) pages.
Office Action dated Sep. 28, 2012 in the counterpart Chinese Application, ten (10) pages.

* cited by examiner

FIG. 6
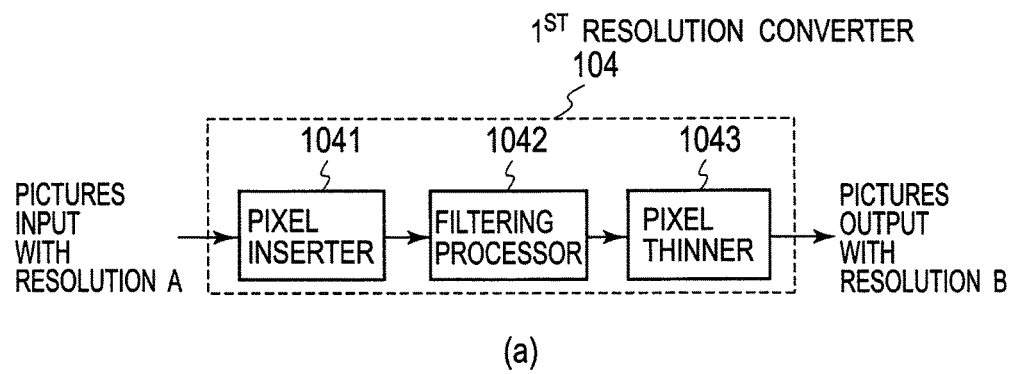
(a)
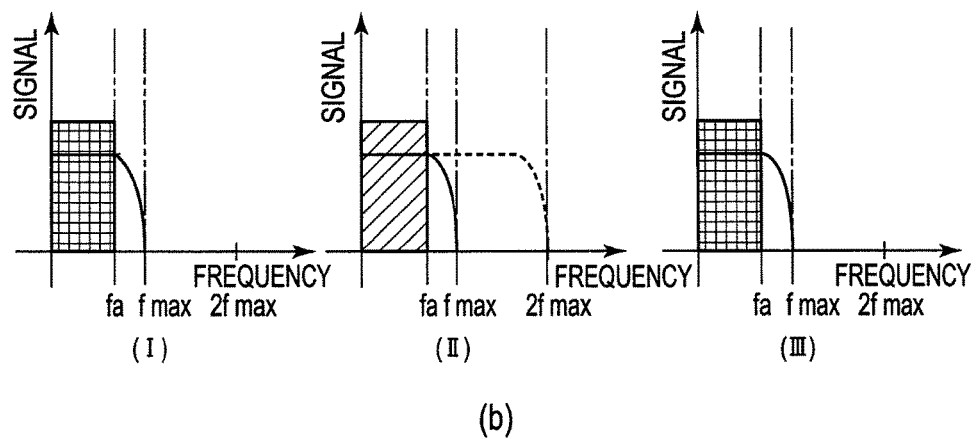
(b)

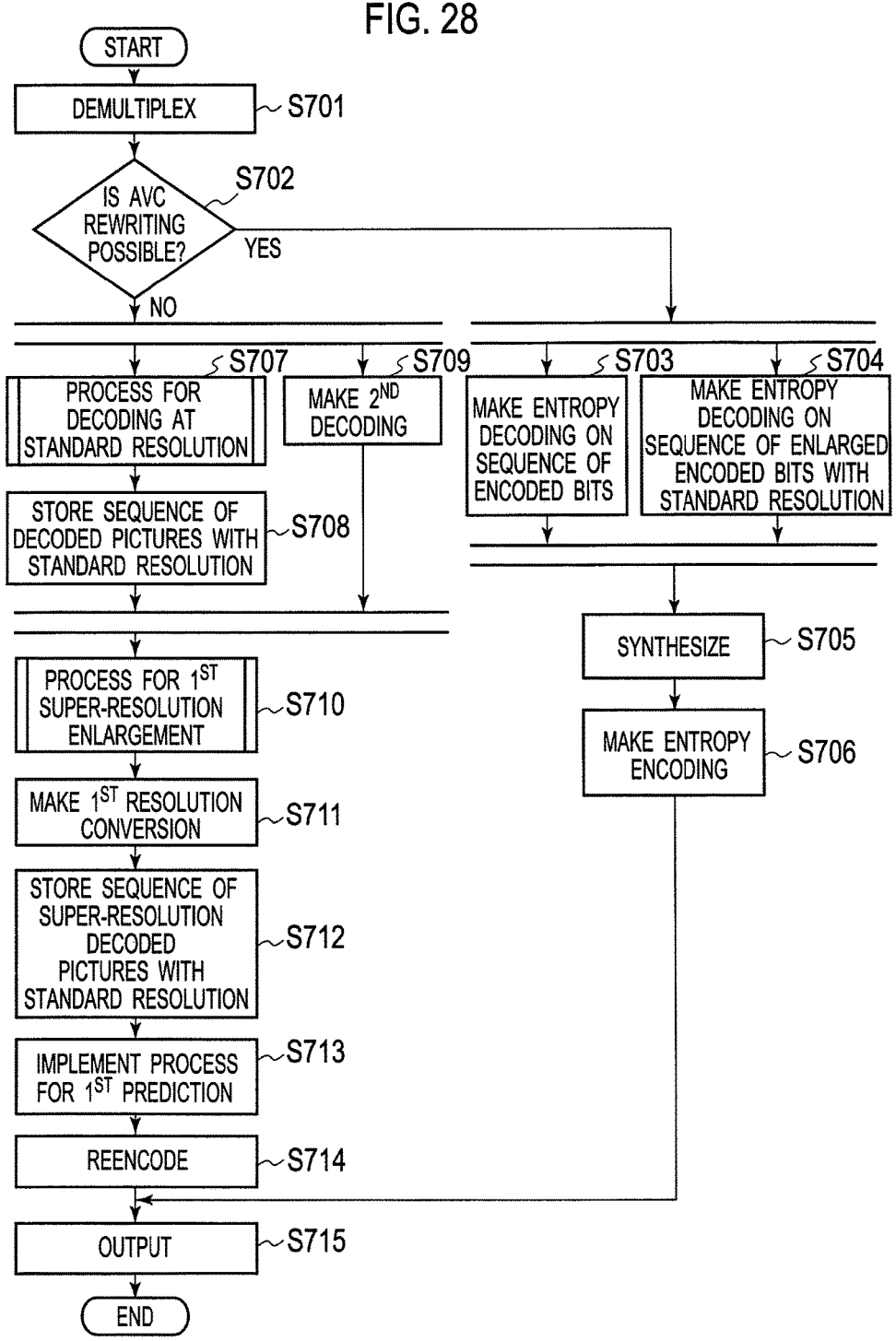

MOVING PICTURE ENCODING SYSTEM, MOVING PICTURE ENCODING METHOD, MOVING PICTURE ENCODING PROGRAM, MOVING PICTURE DECODING SYSTEM, MOVING PICTURE DECODING METHOD, MOVING PICTURE DECODING PROGRAM, MOVING PICTURE REENCODING SYSTEM, MOVING PICTURE REENCODING METHOD, MOVING PICTURE REENCODING PROGRAM

This is a Divisional Application of U.S. patent application Ser. No. 12/995,039, filed Nov. 29, 2010, a National Phase Application filed under 35 U.S.C. 371 as a national stage of PCT/JP2009/059801, filed May 28, 2009, an application claiming the benefit from Japanese Application No. 2008-142433, filed May 30, 2008, and claiming benefit from Japanese Application No. 2009-123960, filed May 22, 2009, the content of each of which is hereby incorporated by reference in its entirety.

TECHNICAL FIELD

The present invention relates to a moving picture encoding system, a moving picture encoding method, a moving picture encoding program, a moving picture decoding system, a moving picture decoding method, a moving picture decoding program, a moving picture reencoding system, a moving picture reencoding method, and a moving picture reencoding program adapted to work on moving picture sequences to implement processes such as those for super-resolution enlargement.

BACKGROUND ART

As conventional techniques to attain a spatial resolution scalability of pictures, there have been those implementing, in a hierarchical encoding system with two layers being a base layer and an enhancement layer, for instance, processing signals of pictures input with the same spatial resolution as the enhancement layer, for a decimation into a spatial resolution of the base layer, followed by an encoding at the base layer, making a prediction using a correlation between those signals decoded along with the base layer encoding and spatially interpolated as signals having the same spatial resolution as the enhancement layer and those signals of pictures input with the same spatial resolution as the enhancement layer, encoding signals of errors in the prediction, and having a combination of encoded bit streams obtained there and bit streams obtained by the base layer encoding, multiplexed and transmitted to a decoding system, the multiplexed combination of encoded bit streams being decoded in reverse at the decoding system. (Refer to Patent Literature 1.)

CITATION LIST

Patent Literature

PTL 1: Japanese Patent Application Laying-Open Publication No. 7-162870

SUMMARY OF THE INVENTION

Technical Problem

By the way, there are techniques for moving picture encoding services such as represented by MPEG-1, -2, and -4/AVC/SVC specified to standardize under the ISO/IEC SC29WG11, including use of decoded pictures obtained by a local decoding as reference pictures for estimation of motions to create data on motion vectors, and use of data on motion vectors created by compensation of motions, to create such predictive pictures as having nearest image qualities to target pictures as encoding targets, followed by determining difference data between predictive pictures and target pictures, and implementing on the difference data a process for a prescribed encoding to attain a high efficient encoding making use of high correlations in the temporal direction. It is thus possible to have predictive pictures improved in image quality, and enhanced in correlation to target pictures, affording to expect more enhanced encoding efficiencies. However, failures to allot a sufficient code rate would cause deficiencies such as deficient precision of data on motion vectors or deficient attainment of the quality of images of locally decoded reference pictures, degrading image qualities of predictive pictures, resulting in reduced encoding efficiencies.

Moreover, there are techniques for hierarchical encoding services on moving pictures represented by among others the above-noted Patent Literature 1 and MPEG-4 SVC, which also include predictive pictures or predictive blocks created from reference pictures of a layer lower than the layer in which a current encoding is made, for use in combination with target pictures or target blocks of the current layer to make an inter-layer prediction in between, aiming at still enhanced encoding efficiencies making use of high correlations between different spatial resolutions. However, like techniques making use of high correlations in the temporal direction, also those making use of high correlations between layers are subject to the problem that failures to allot a sufficient code rate would degrade image qualities of predictive pictures or predictive blocks, resulting in reduced encoding efficiencies.

Further, they involve implementing a process for a prescribed resolution conversion on moving pictures input as encoding targets with a spatial resolution (referred herein to as a base or standard resolution), creating moving pictures with a resolution (referred herein to as a low resolution) lower than the standard resolution of the input moving pictures, to make a hierarchical encoding on moving pictures between two or more layers making use of high correlations between layers. However, in such the hierarchical encoding, even if the encoding process implemented was reversible, input moving pictures would undergo a band limitation to information on their spatial frequency components in the spatial direction that can be represented by the standard resolution, in addition to the implementation of a hierarchical encoding including a process to be implemented on the input moving pictures for such an encoding that involves decoded pictures obtained through a local decoding in course of hierarchical encoding, or by decoding bit streams encoded by way of hierarchical encoding, with image qualities nearest to those of input moving pictures under given encoding conditions, thus affording to make use of correlations between associated layers to estimate new information on spatial frequency components, while failing to encode and transmit more information on spatial frequency components than the information on spatial frequency components that can be represented by the standard resolution, as a problem.

It therefore is an object of the present invention to provide a moving picture encoding system, a moving picture encoding method, and a moving picture encoding program adapted to encode and transmit more information on spatial frequency components than information on spatial frequency components that can be represented by a resolution of input moving pictures. It also is an object of the present invention to provide a moving picture decoding system, a moving picture decoding method, and a moving picture decoding program adapted to acquire and decode sequences of encoded bits created by a moving picture encoding system, a moving picture encoding method, or a moving picture encoding program according to the present invention. It also is an object of the present invention to provide a moving picture reencoding system, a moving picture reencoding method, and a moving picture reencoding program adapted for a decoding followed by a re-encoding and a transmission.

Solution to Problem

To solve the problems described, according to the present invention, there is a moving picture encoding system comprising, as illustrated in FIG. 9 for instance, a first encoder configured to work on a subsequence of a sequence of moving pictures with a standard resolution to implement a first combination of processes for an encoding and a decoding to create a first sequence of encoded bits and a set of decoded pictures with the standard resolution, a first super-resolution enlarger configured to work on the subsequence of the sequence of moving pictures with the standard resolution to implement a process for a first super-resolution enlargement to create a set of super-resolution enlarged pictures with a resolution higher than the standard resolution, a first resolution converter configured to work on the set of super-resolution enlarged pictures to implement a process for a first resolution conversion to create a set of super-resolution enlarged and converted pictures with the standard resolution, and a second encoder configured to have the set of super-resolution enlarged and converted pictures from the first resolution converter as a set of encoding target pictures to implement a second combination of processes for a prediction and an encoding to create a second sequence of encoded bits.

Here, as illustrated in FIG. 7 for instance, it may well have the second encoder configured to have the set of decoded pictures from the first encoder as a set of reference pictures to implement the second combination of processes for the prediction and the encoding to create the second sequence of encoded bits.

Further, as illustrated in FIGS. 1 and 8 for instance, it may well comprise a second super-resolution enlarger configured to acquire the set of decoded pictures with the standard resolution from the first encoder to implement thereon a process for a second super-resolution enlargement to create a set of super-resolution enlarged decoded pictures with a resolution higher than the standard resolution, and a second resolution converter configured to work on the set of super-resolution enlarged decoded pictures to implement a process for a second resolution conversion to create a set of super-resolution enlarged and converted decoded pictures with the standard resolution, the second encoder being configured to have the set of super-resolution enlarged and converted decoded pictures from the second resolution converter as a set of reference pictures to implement the second combination of processes for the prediction and the encoding to create the second sequence of encoded bits.

Further, as illustrated at (a) in FIG. 4 for instance, it may well have the first super-resolution enlarger comprising a positioner configured to work in a processing for super-resolution enlargement, on a combination of a base picture constituting a base therein and one or more observation pictures to be based on, to make a positioning to pixel positions of a desirable high resolution, for an interval-unequal sampling to create nonhomogeneous high resolution pictures, an interpolator configured to work on nonhomogeneous high resolution pictures created at the positioner, to implement a process for a prescribed nonhomogeneous interpolation to create interpolated pictures with a desirable high resolution, an estimated picture creator configured to acquire interpolated pictures created at the interpolator, to implement thereon a process for a prescribed reconstruction to create estimated pictures with a desirable resolution, and a repetition determiner configured to acquire a nonhomogeneous high resolution picture from the positioner and a nonhomogeneous estimated picture from the estimated picture creator, for employment of the acquired pictures to follow a prescribed determination method to determine whether or not a repetition of the processing for super-resolution enlargement is necessary, and work depending on a result thereof, to operate as the repetition is necessary, to provide the interpolator with information for a control to continue the processing, and operate as the repetition is unnecessary, to provide the estimated picture creator with information for a control to output a set of estimated pictures with a high resolution after super-resolution enlargement.

Further, as illustrated in FIG. 1 or such for instance, it may well comprise a multiplexer configured to operate complying with a prescribed syntax structure to multiplex the first sequence of encoded bits from the first encoder, the second sequence of encoded bits from the second encoder, and information on encoding parameters of respective types used in the encoding at the first encoder and the encoding at the second encoder.

Further, as illustrated in FIG. 10 for instance, it may well comprise a first accumulation buffer configured to work in a course before the first encoder and the first super-resolution enlarger, to accumulate subsequences of the sequence of moving pictures with the standard resolution, a second accumulation buffer configured to work in a course between the first encoder and the second encoder, to accumulate sets of decoded pictures from the first encoder, an accumulation controller configured to work for detections of buffer accumulation amounts at the first accumulation buffer, the second accumulation buffer, the first encoder, and the second encoder, to control the buffer accumulation amounts, and a code rate controller configured to work on bases of the detections of buffer accumulation amounts at the accumulation controller, to control code rates at the first encoder and the second encoder.

Further, according to the present invention, there is a moving picture encoding system comprising, as illustrated in FIG. 13 for instance, a first encoder configured to work on a sequence of moving pictures with a standard resolution to implement a first combination of processes for an encoding and a decoding to create a first sequence of encoded bits and a set of decoded pictures with the standard resolution, a first super-resolution enlarger configured to work on the sequence of moving pictures with the standard resolution to implement a process for a first super-resolution enlargement to create a set of super-resolution enlarged pictures with a resolution higher than the standard resolution, a second super-resolution enlarger configured to acquire the set of decoded pictures from the first encoder to implement thereon a process for a second super-resolution enlargement to create a set of super-resolution enlarged decoded pictures with a resolution higher than the standard resolution, a third resolution converter configured to acquire the set of decoded pictures from the first encoder to implement thereon a process for a third resolution conversion to create a set of resolution converted enlarged decoded pictures with a resolution higher than the standard resolution, and a third encoder configured to have the set of super-resolution enlarged pictures from the first super-resolution enlarger as a set of encoding target pictures, employing the set of super-resolution enlarged decoded pictures from the second super-resolution enlarger and the set of resolution converted enlarged decoded pictures from the third resolution converter as sets of reference pictures, to implement thereon a third combination of processes for a prediction and an encoding to create a third sequence of encoded bits.

Further, according to the present invention, there is a moving picture encoding system comprising, as illustrated in FIG. 16 for instance, a first encoder configured to work on a sequence of moving pictures with a standard resolution to implement a first combination of processes for an encoding and a decoding to create a first sequence of encoded bits and a set of decoded pictures with the standard resolution, a first super-resolution enlarger configured to work on the sequence of moving pictures with the standard resolution to implement a process for a first super-resolution enlargement to create a set of super-resolution enlarged pictures with a resolution higher than the standard resolution, a third resolution converter configured to acquire the set of decoded pictures from the first encoder to implement thereon a process for a third resolution conversion to create a set of resolution converted enlarged decoded pictures with a resolution higher than the standard resolution, and a third encoder configured to have the set of super-resolution enlarged pictures from the first super-resolution enlarger as a set of encoding target pictures, employing the set of resolution converted enlarged decoded pictures from the third resolution converter as a set of reference pictures, to implement thereon a third combination of processes for a prediction and an encoding to create a third sequence of encoded bits.

Further, according to the present invention, there is a moving picture encoding system comprising, as illustrated in FIG. 17 for instance, a first encoder configured to work on a sequence of moving pictures with a standard resolution to implement a first combination of processes for an encoding and a decoding to create a first sequence of encoded bits and a set of decoded pictures with the standard resolution, a first super-resolution enlarger configured to work on the sequence of moving pictures with the standard resolution to implement a process for a first super-resolution enlargement to create a set of super-resolution enlarged pictures with a resolution higher than the standard resolution, a second super-resolution enlarger configured to acquire the set of decoded pictures from the first encoder to implement thereon a process for a second super-resolution enlargement to create a set of super-resolution enlarged decoded pictures with a resolution higher than the standard resolution, and a third encoder configured to have the set of super-resolution enlarged pictures from the first super-resolution enlarger as a set of encoding target pictures, employing the set of super-resolution enlarged decoded pictures from the second super-resolution enlarger as a set of reference pictures, to implement thereon a third combination of processes for a prediction and an encoding to create a third sequence of encoded bits.

Further, according to the present invention, there is a moving picture encoding system comprising, as illustrated in FIG. 19 for instance, a first encoder configured to work on a sequence of moving pictures with a standard resolution to implement a first combination of processes for an encoding and a decoding to create a first sequence of encoded bits and a set of decoded pictures with the standard resolution, a first super-resolution enlarger configured to work on the sequence of moving pictures with the standard resolution to implement a process for a first super-resolution enlargement to create a set of super-resolution enlarged pictures with a resolution higher than the standard resolution, a first resolution converter configured to work on the set of super-resolution enlarged pictures to implement a process for a first resolution conversion to create a set of super-resolution enlarged and converted pictures with the standard resolution, a second super-resolution enlarger configured to acquire the set of decoded pictures from the first encoder to implement thereon a process for a second super-resolution enlargement to create a set of super-resolution enlarged decoded pictures with a resolution higher than the standard resolution, a second resolution converter configured to work on the set of super-resolution enlarged decoded pictures from the second super-resolution enlarger to implement a process for a second resolution conversion to create a set of super-resolution enlarged and converted decoded pictures with the standard resolution, a second encoder configured to have the set of super-resolution enlarged and converted pictures from the first resolution converter as a set of encoding target pictures, employing the set of decoded pictures from the first encoder and the set of super-resolution enlarged and converted decoded pictures with the standard resolution from the second resolution converter as sets of reference pictures, to implement thereon a second combination of processes for a prediction and an encoding to create a second sequence of encoded bits, a third resolution converter configured to acquire the set of decoded pictures from the first encoder to implement thereon a process for a third resolution conversion to create a set of resolution converted enlarged decoded pictures with a resolution higher than the standard resolution, and a third encoder configured to have the set of super-resolution enlarged pictures from the first super-resolution enlarger as a set of encoding target pictures, employing the set of super-resolution enlarged decoded pictures from the second super-resolution enlarger and the set of resolution converted enlarged decoded pictures from the third resolution converter as sets of reference pictures, to implement thereon a third combination of processes for a prediction and an encoding to create a third sequence of encoded bits.

Further, according to the present invention, there is a moving picture encoding method comprising a step of implementing a first combination of processes for an encoding and a decoding on a sequence of moving pictures with a standard resolution, creating a first sequence of encoded bits and a set of decoded pictures with the standard resolution, a step of implementing a process for a first super-resolution enlargement on the sequence of moving pictures with the standard resolution, creating a set of super-resolution enlarged pictures with a resolution higher than the standard resolution, a step of implementing a process for a first resolution conversion on the set of super-resolution enlarged pictures, creating a set of super-resolution enlarged and converted pictures with the standard resolution, and a step of having the set of super-resolution enlarged and converted pictures as a set of encoding target pictures, implementing thereon a second combination of processes for a prediction and an encoding, creating a second sequence of encoded bits.

Further, according to the present invention, there is a moving picture encoding program configured to have a computer execute a step of implementing a first combination of processes for an encoding and a decoding on a sequence of moving pictures with a standard resolution, creating a first sequence of encoded bits and a set of decoded pictures with the standard resolution, a step of implementing a process for a first super-resolution enlargement on the sequence of moving pictures with the standard resolution, creating a set of super-resolution enlarged pictures with a resolution higher than the standard resolution, a step of implementing a process for a first resolution conversion on the set of super-resolution enlarged pictures, creating a set of super-resolution enlarged and converted pictures with the standard resolution, and a step of having the set of super-resolution enlarged and converted pictures as a set of encoding target pictures, implementing thereon a second combination of processes for a prediction and an encoding, creating a second sequence of encoded bits.

Further, according to the present invention, there is a moving picture decoding system comprising, as illustrated in FIG. 26 for instance, a demultiplexer configured to work on a sequence of input encoded bits to implement a process for a prescribed demultiplexing to output sequences of encoded bits with a standard resolution, a first decoder configured to acquire a sequence of encoded bits obtained with the standard resolution at the demultiplexer to implement thereon a process for a prescribed decoding to create a sequence of decoded pictures with the standard resolution, a first super-resolution enlarger configured to acquire the sequence of decoded pictures created with the standard resolution at the first decoder to implement thereon a process for a prescribed super-resolution enlargement to create a sequence of super-resolution enlarged decoded pictures, a first resolution converter configured to acquire the sequence of super-resolution enlarged decoded pictures created at the first super-resolution enlarger to implement thereon a process for a prescribed resolution conversion to create a sequence of super-resolution decoded pictures with the standard resolution, and a second decoder configured to acquire a sequence of encoded bits obtained with an extension of the standard resolution at the demultiplexer, the sequence of decoded pictures created with the standard resolution at the first decoder, and the sequence of super-resolution decoded pictures created with the standard resolution at the first resolution converter, to implement thereon processes including a prescribed second decoding being a decoding with an extension of the standard resolution, to create a sequence of super-resolution pictures decoded with the standard resolution.

Here, the moving picture decoding system may well comprise, as illustrated in FIG. 23 for instance, a second resolution converter configured to acquire the sequence of decoded pictures with the standard resolution from the decoder to implement thereon a process for a prescribed resolution conversion to create a sequence of enlarged decoded pictures with a high resolution as a resolution higher than the standard resolution, and a third decoder configured to acquire a sequence of encoded bits obtained with an extension of the high resolution at the demultiplexer, the sequence of super-resolution enlarged decoded pictures created at the super-resolution enlarger, and the sequence of enlarged decoded pictures with the high resolution from the second resolution converter, to implement thereon a combination of processes for a prescribed prediction and a prescribed decoding, to create a sequence of super-resolution enlarged pictures as decoded.

Further, according to the present invention, there is a moving picture reencoding system comprising, as illustrated in FIG. 27 for instance, a demultiplexer configured to work on a sequence of input encoded bits to implement a process for a prescribed demultiplexing to output sequences of encoded bits with a standard resolution, a decoder configured to acquire a sequence of encoded bits obtained with the standard resolution at the demultiplexer to implement thereon a process for a prescribed decoding to create a sequence of decoded pictures with the standard resolution, a first super-resolution enlarger configured to acquire the sequence of decoded pictures created with the standard resolution at the decoder to implement thereon a process for a prescribed super-resolution enlargement to create a sequence of super-resolution enlarged decoded pictures, a first resolution converter configured to acquire the sequence of super-resolution enlarged decoded pictures created at the first super-resolution enlarger to implement thereon a process for a prescribed resolution conversion to create a sequence of super-resolution decoded pictures with the standard resolution, a second decoder configured to acquire a sequence of encoded bits obtained with an extension of the standard resolution at the demultiplexer, the sequence of decoded pictures created with the standard resolution at the above-noted decoder, and the sequence of super-resolution decoded pictures created with the standard resolution at the first resolution converter, to implement thereon a process for a prescribed second decoding being a decoding with an extension of the standard resolution, to create a sequence of super-resolution pictures decoded with the standard resolution, a reencoder configured to acquire from the above-noted decoder information on coefficients of orthogonal transform in a course of decoding thereof, and from the second decoder information on coefficients of orthogonal transform in an extension layer of the standard resolution in a course of decoding thereof, to make a synthesis of respective information on coefficients of orthogonal transform and implement thereon a process for a prescribed entropy encoding to create a sequence of encoded bits as reencoded, and a multiplexer configured to acquire the sequence of encoded bits reencoded at the reencoder, to implement thereon a process for a multiplexing complying with a prescribed syntax structure, inserting encoding information inclusive of identification information for identification of information on encoding modes and parameters of respective types used, to create a sequence of encoded bits as multiplexed.

Here, the moving picture reencoding system may well have the reencoder configured to acquire the sequence of decoded pictures with the standard resolution from the above-noted decoder, the sequence of super-resolution decoded pictures with the standard resolution from the first resolution converter, and the sequence of super-resolution pictures with the standard resolution from the second decoder, to implement thereon a process for a prescribed encoding to create a sequence of encoded bits as reencoded.

Further, according to the present invention, there is a moving picture decoding method comprising a step of implementing a process for a prescribed demultiplexing on a sequence of input encoded bits, outputting sequences of encoded bits with a standard resolution, a step of acquiring a sequence of encoded bits obtained with the standard resolution through the process for the prescribed demultiplexing, implementing thereon a process for a prescribed decoding, creating a sequence of decoded pictures with the standard resolution, a step of acquiring the sequence of decoded pictures created with the standard resolution through the process for the above-noted prescribed decoding, implementing thereon a process for a prescribed super-resolution enlargement, creating a sequence of super-resolution enlarged decoded pictures, a step of acquiring the sequence of super-resolution enlarged decoded pictures created through the process for the prescribed super-resolution enlargement, implementing thereon a process for a prescribed resolution conversion, creating a sequence of super-resolution decoded pictures with the standard resolution, and a step of acquiring a sequence of encoded bits obtained with an extension of the standard resolution through the process for the prescribed demultiplexing, the sequence of decoded pictures created with the standard resolution through the process for the above-noted prescribed decoding, and the sequence of super-resolution decoded pictures created with the standard resolution through the process for the prescribed resolution conversion, implementing thereon processes including a prescribed second decoding being a decoding with an extension of the standard resolution, creating a sequence of super-resolution pictures decoded with the standard resolution.

Here, the moving picture decoding method may well comprise a step of acquiring the sequence of decoded pictures created with the standard resolution through the process for the above-noted prescribed decoding, implementing thereon a process for a prescribed resolution conversion, creating a sequence of enlarged decoded pictures with a high resolution as a resolution higher than the standard resolution, and a step of acquiring a sequence of encoded bits obtained with an extension of the high resolution through the process for the prescribed demultiplexing, the sequence of super-resolution enlarged decoded pictures created through the process for the prescribed super-resolution enlargement, and the sequence of enlarged decoded pictures created with the high resolution through the process for the prescribed resolution conversion, implementing thereon a combination of processes for a prescribed prediction and a prescribed decoding, creating a sequence of super-resolution enlarged pictures as decoded.

Further, according to the present invention, there is a moving picture reencoding method comprising a step of implementing a process for a prescribed demultiplexing on a sequence of input encoded bits, a step of acquiring a sequence of encoded bits obtained with a standard resolution through the process for the prescribed demultiplexing, implementing thereon a process for a prescribed decoding, creating a sequence of decoded pictures with the standard resolution, a step of acquiring the sequence of decoded pictures created with the standard resolution through the process for the above-noted prescribed decoding, implementing thereon a process for a prescribed super-resolution enlargement, creating a sequence of super-resolution enlarged decoded pictures, a step of acquiring the sequence of super-resolution enlarged decoded pictures created through the process for the prescribed super-resolution enlargement, implementing thereon a process for a prescribed resolution conversion, creating a sequence of super-resolution decoded pictures with the standard resolution, a step of acquiring a sequence of encoded bits obtained with an extension of the standard resolution through the process for the prescribed demultiplexing, the sequence of decoded pictures created with the standard resolution through the process for the above-noted prescribed decoding, and the sequence of super-resolution decoded pictures created with the standard resolution through the process for the prescribed resolution conversion, implementing thereon a process for a prescribed second decoding being a decoding with an extension of the standard resolution, creating a sequence of super-resolution pictures decoded with the standard resolution, a step of acquiring information on coefficients of orthogonal transform in a course of decoding in the process for the above-noted prescribed decoding, and information on coefficients of orthogonal transform in an extension layer of the standard resolution in a course of decoding in the process for the prescribed second decoding being a decoding with an extension of the standard resolution, making a synthesis of respective information on coefficients of orthogonal transform, implementing thereon a process for a prescribed entropy encoding, creating a sequence of encoded bits as reencoded, and a step of acquiring the sequence of encoded bits as reencoded, implementing thereon a process for a multiplexing complying with a prescribed syntax structure, inserting encoding information inclusive of identification information for identification of information on encoding modes and parameters of respective types used, creating a sequence of encoded bits as multiplexed.

Further, according to the present invention, there is a moving picture decoding program configured to have a computer execute a step of implementing a process for a prescribed demultiplexing on a sequence of input encoded bits, outputting sequences of encoded bits with a standard resolution, a step of acquiring a sequence of encoded bits obtained with the standard resolution through the process for the prescribed demultiplexing, implementing thereon a process for a prescribed decoding, creating a sequence of decoded pictures with the standard resolution, a step of acquiring the sequence of decoded pictures created with the standard resolution through the process for the above-noted prescribed decoding, implementing thereon a process for a prescribed super-resolution enlargement, creating a sequence of super-resolution enlarged decoded pictures, a step of acquiring the sequence of super-resolution enlarged decoded pictures created through the process for the prescribed super-resolution enlargement, implementing thereon a process for a prescribed resolution conversion, creating a sequence of super-resolution decoded pictures with the standard resolution, and a step of acquiring a sequence of encoded bits obtained with an extension of the standard resolution through the process for the prescribed demultiplexing, the sequence of decoded pictures created with the standard resolution through the process for the above-noted prescribed decoding, and the sequence of super-resolution decoded pictures created with the standard resolution through the process for the prescribed resolution conversion, implementing thereon processes including a prescribed second decoding being a decoding with an extension of the standard resolution, creating a sequence of super-resolution pictures decoded with the standard resolution.

Further, according to the present invention, there is a moving picture reencoding program configured to have a computer execute a step of implementing a process for a prescribed demultiplexing on a sequence of input encoded bits, a step of acquiring a sequence of encoded bits obtained with a standard resolution through the process for the prescribed demultiplexing, implementing thereon a process for a prescribed decoding, creating a sequence of decoded pictures with the standard resolution, a step of acquiring the sequence of decoded pictures created with the standard resolution through the process for the above-noted prescribed decoding, implementing thereon a process for a prescribed super-resolution enlargement, creating a sequence of super-resolution enlarged decoded pictures, a step of acquiring the sequence of super-resolution enlarged decoded pictures created through the process for the prescribed super-resolution enlargement, implementing thereon a process for a prescribed resolution conversion, creating a sequence of super-resolution decoded pictures with the standard resolution, a step of acquiring a sequence of encoded bits obtained with an extension of the standard resolution through the process for the prescribed demultiplexing, the sequence of decoded pictures created with the standard resolution through the process for the above-noted prescribed decoding, and the sequence of super-resolution decoded pictures created with the standard resolution through the process for the prescribed resolution conversion, implementing thereon a process for a prescribed second decoding being a decoding with an extension of the standard resolution, creating a sequence of super-resolution pictures decoded with the standard resolution, a step of acquiring information on coefficients of orthogonal transform in a course of decoding in the process for the above-noted prescribed decoding, and information on coefficients of orthogonal transform in an extension layer of the standard resolution in a course of decoding in the process for the prescribed second decoding being a decoding with an extension of the standard resolution, making a synthesis of respective information on coefficients of orthogonal transform, implementing thereon a process for a prescribed entropy encoding, creating a sequence of encoded bits as reencoded, and a step of acquiring the sequence of encoded bits as reencoded, implementing thereon a process for a multiplexing complying with a prescribed syntax structure, inserting encoding information inclusive of identification information for identification of information on encoding modes and parameters of respective types used, creating a sequence of encoded bits as multiplexed.

Advantageous Effects of the Invention

According to the present invention, there are systems such as a moving picture encoding system, having a first encoder working for services to encode moving pictures input with a standard resolution, in combination with a first super-resolution enlarger working on moving pictures input with the standard resolution, implementing a process for a super-resolution enlargement including information on frequency components in the spatial direction and the temporal direction that has been potentially contained in the input moving pictures but unable to express to a sufficient degree by the standard resolution, followed by implementing processes such as for a prescribed resolution conversion at a first resolution converter, thus permitting a second encoder to make an encoding of moving pictures based on an increased amount of information relative to an information amount of moving pictures input with the standard resolution, as a resultant effect. At the second encoder, as reference signals for the encoding there may be use of, among others, decoded signals as decoded at the first encoder or as additionally processed through processes such as for a second super-resolution enlargement and a second resolution conversion.

Moreover, according to the present invention, there are systems such as a moving picture encoding system, having a first encoder working for services to encode moving pictures input with a standard resolution, in combination with a first super-resolution enlarger working on moving pictures input with the standard resolution, implementing a process for a super-resolution enlargement including information on frequency components in the spatial direction and the temporal direction that has been potentially contained in the input moving pictures but unable to express to a sufficient degree by the standard resolution, followed by an encoding of thus obtained signals at a third encoder, permitting the third encoder to make an encoding of moving pictures based on an increased amount of information relative to an information amount of moving pictures input with the standard resolution, as a resultant effect. At the third encoder, as reference signals for the encoding there may be use of decoded signals as decoded at the first encoder and processed through processes such as for a second super-resolution enlargement or a third resolution conversion to enhance the resolution up to the same resolution as first super-resolution enlarged signals. Still more, according to the present invention, there are systems such as a moving picture decoding system, adapted to input thus encoded moving pictures to decode, and yet more, according to the present invention, there are systems such as a moving picture reencoding system, adapted to input thus encoded moving pictures to decode and reencode.

BRIEF DESCRIPTION OF DRAWINGS

FIG. 6 is a combination of a block diagram showing an example of detailed structure of a first resolution converter 104 in the first embodiment, and conceptual diagrams illustrating an example of process for a prescribed resolution conversion to be implemented at the first resolution converter 104.

FIG. 28 is a flowchart of exemplary actions of the moving picture reencoding system according to the eleventh embodiment.

DESCRIPTION OF EMBODIMENTS (First Embodiment)

Figure 1:
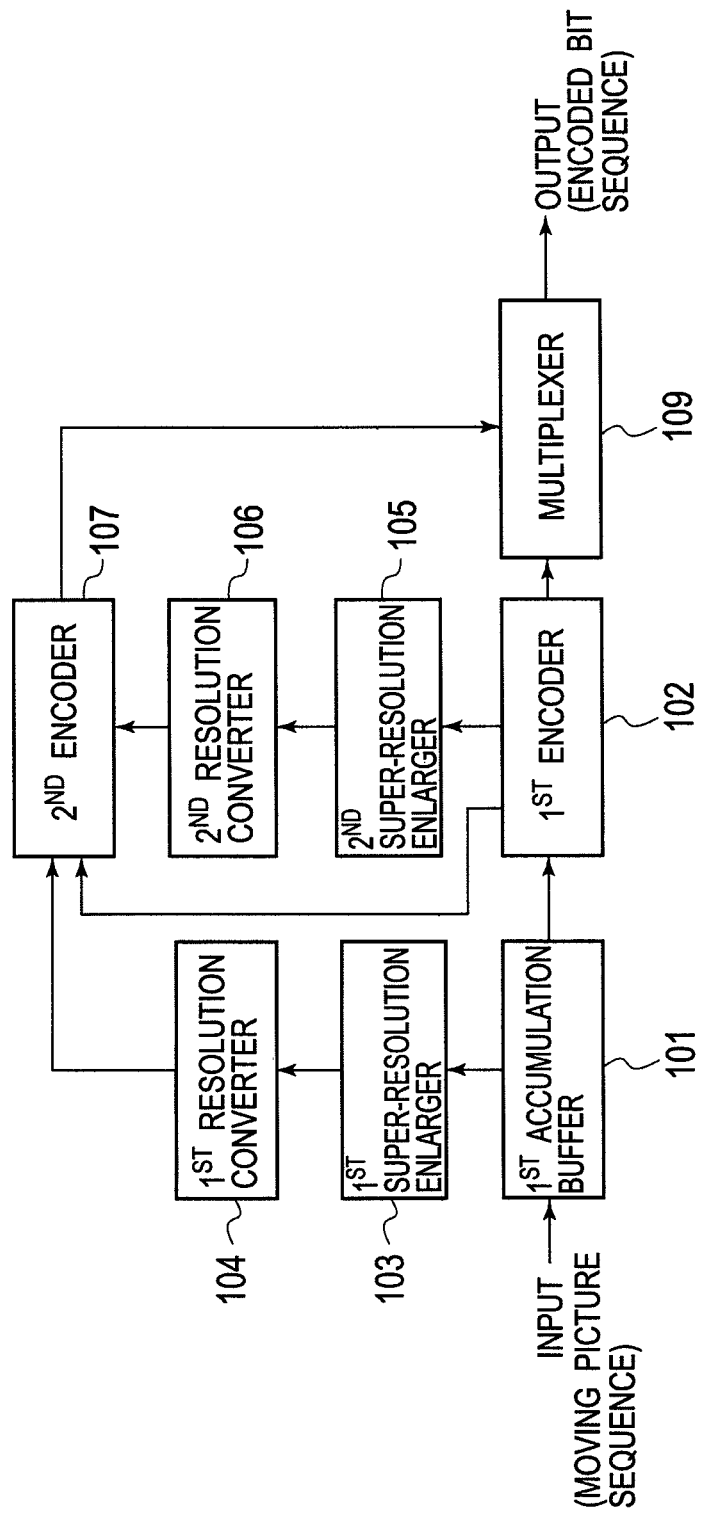
FIG. 1 is a block diagram showing an example of basic configuration of a moving picture encoding system according to a first embodiment of the present invention.

FIG. 1 is a block diagram showing an example of configuration of a moving picture encoding system according to a first embodiment of the present invention.

Referring to FIG. 1, the moving picture encoding system according to the first embodiment includes a first accumulation buffer 101, a first encoder 102, a first super-resolution enlarger 103, a first resolution converter 104, a second super-resolution enlarger 105, a second resolution converter 106, a second encoder 107, and a multiplexer 109.

The first accumulation buffer 101 is configured for functions to work on moving pictures input as an input, to accumulate two or more pictures as necessary to implement later-described processes for a prescribed pre-super-resolution encoding and a first super-resolution enlargement, and supply the first encoder 102, the first super-resolution enlarger 103, and the like with pictures they require.

The first encoder 102 is configured for functions to acquire from the first accumulation buffer 101 a set of pictures with a standard resolution required for a process for a prescribed encoding, and work on pictures acquired with the standard resolution to implement the process for the prescribed encoding (referred herein to as a process for a pre-super-resolution encoding), to create a first sequence of encoded bits, to supply the first sequence of encoded bits thus created to the multiplexer 109. The first encoder 102 is configured for functions to implement a process for a prescribed decoding, to supply decoded pictures to the second super-resolution enlarger 105 and the second encoder 107. The first encoder 102 may well be configured for functions to temporarily store decoded pictures. There may be a configuration to implement the process for the prescribed decoding as a decoding process on the first sequence of encoded bits as created to create decoded pictures. There may be configuration for use of a process for a local decoding constituting part of the process for the prescribed encoding to employ results of the local decoding to create pictures decoded therefrom.

The first super-resolution enlarger 103 is configured for functions to acquire from the first accumulation buffer 101 two or more pictures with the standard resolution, as necessary for a process for a prescribed super-resolution enlargement, and work on pictures acquired with the standard resolution to implement the process for the prescribed super-resolution enlargement, to create super-resolution enlarged pictures with a resolution higher than the standard resolution, and supply thus created super-resolution enlarged pictures to the first resolution converter 104. There may be configuration with a function to have a ratio of enlargement set up upon implementation of the process for the prescribed super-resolution enlargement as preset information on a prescribed enlargement ratio, or as acquired information on enlargement ratio such as set up by an external user, and work on the basis of acquired information on enlargement ratio to establish an enlargement ratio to implement the process for the prescribed super-resolution enlargement. More preferably, to provide information on the prescribed enlargement ratio to a decoding system end, there should be use of a configuration to implement an unshown process for a prescribed entropy encoding, to create a bit sequence of information on enlargement ratio, to supply to the multiplexer 109, to transmit to that end. In this regard, there should be use of similar configuration for the second super-resolution enlarger 105 also. The first super-resolution enlarger 103 and the second super-resolution enlarger 105 have their configurations and actions, of which detailed examples will be described with reference to FIG. 4.

The first resolution converter 104 is configured for functions to acquire super-resolution enlarged pictures from the first super-resolution enlarger 103, and work on acquired super-resolution enlarged pictures to implement a process for a prescribed resolution conversion to create, from the super-resolution enlarged pictures having a resolution higher than the standard resolution, a set of pictures (as a set of super-resolution enlarged and converted pictures) such as having the standard resolution for instance, to supply to the second encoder 107.

The second super-resolution enlarger 105 is configured for functions to acquire from the first encoder 102 two or more decoded pictures with the standard resolution, as necessary for a process for a prescribed super-resolution enlargement, and work on pictures acquired with the standard resolution to implement the process for the prescribed super-resolution enlargement, to create super-resolution enlarged decoded pictures with a resolution higher than the standard resolution, and supply thus created super-resolution enlarged decoded pictures to the second resolution converter 106. Like the first super-resolution enlarger 103, there may be configuration with a function to have a ratio of enlargement set up upon implementation of the process for the prescribed super-resolution enlargement as preset information on a prescribed enlargement ratio, or as acquired information on enlargement ratio such as set up by an external user, and work on the basis of acquired information on enlargement ratio to establish an enlargement ratio to implement the process for the prescribed super-resolution enlargement. It is noted that the resolution after enlargement at the second super-resolution enlarger 105 may be equal to or different from the resolution after enlargement at the first super-resolution enlarger 103.

The second resolution converter 106 is configured for functions to acquire super-resolution enlarged decoded pictures from the second super-resolution enlarger 105, and work on acquired super-resolution enlarged decoded pictures to implement a process for a prescribed resolution conversion to create, from the super-resolution enlarged decoded pictures having a resolution higher than the standard resolution, a set of super-resolution decoded pictures (as a set of super-resolution enlarged and converted decoded pictures) such as having the standard resolution for instance, to supply to the second encoder 107. There may be configuration with a function to have a ratio of resolution conversion set up upon implementation of the process for the prescribed resolution conversion as preset information on a prescribed resolution conversion ratio, or as acquired information on resolution conversion ratio such as set up by an external user, and work on the basis of acquired information on resolution conversion ratio to establish a resolution conversion ratio to implement the process for the prescribed resolution conversion. More preferably, to provide information on the resolution conversion ratio, there should be use of a configuration to implement an unshown process for a prescribed entropy encoding, to create a bit sequence of information on resolution conversion ratio, to supply to the multiplexer 109.

The second encoder 107 is configured for functions to have super-resolution enlarged and converted signals of input pictures with the standard resolution from the first resolution converter 104 as encoding target pictures, decoded pictures from the first encoder 102 as first reference pictures, and super-resolution enlarged and converted signals of decoded pictures with the standard resolution from the second resolution converter 106 as second reference pictures, and implement thereon a combination of processes for a prescribed prediction and a second encoding, to create a second sequence of encoded bits, and supply the multiplexer 109 with the second sequence of encoded bits thus created.

For a reference picture to be used in a process for the prescribed prediction at the second encoder 107, there may be a configuration to employ either a first reference picture obtained from a decoded picture or a second reference picture obtained from a super-resolution enlarged and converted decoded picture, to create a predictive picture, and subtract the predictive picture from a target picture, to create a data on a difference in between.

There may be a configuration involved to create a difference data from a target picture, using neither first reference picture nor second reference picture.

For control to make a selection of reference picture for each picture or for each set of a prescribed number of pictures, the second encoder 107 may be configured to create a set of data on the selection of reference picture to identify a first reference picture or a second reference picture whichever is used, and implement thereon a process for a prescribed entropy encoding using an unshown entropy encoder to create a sequence of encoded bits of data on the reference picture selection, to supply to the multiplexer 109. There are sequences of encoded bits of data on reference picture selection, multiplexed as a bit sequence 310 of data on encoding parameters constituting part of a multiplexed bit sequence 300, as will be described later on. There may be use of combination of target pictures each respectively divided with no spaces left into regions of a prescribed area and first and second reference pictures likewise divided with no spaces left into regions of a prescribed area, to operate for each commensurate region to identify a first reference picture or a second reference picture whichever is selective to create a predictive picture, and subtract the predictive picture from a target picture, to create a data on a difference in between. There may be operations made for each region of a prescribed area to have data for identification of which reference picture has been used, as data on reference picture selection, and implement thereon a process for a prescribed entropy encoding using an unshown entropy encoder, to create, and supply to the multiplexer 109, a resultant sequence of encoded bits of data on reference picture selection. There may well be regions of a prescribed area shaped as regions of a prescribed rectangular form, or as regions of an arbitrary form conforming to a prescribed domain division.

The second encoder 107 may be configured for combination of a set of operations to subtract a first reference picture as a predictive picture from an encoding target picture, to obtain a data on a difference in between as a first difference data, and implement thereon a process for a prescribed second encoding to create a first sequence of bits encoded by the second encoding, a set of operations to subtract a second reference picture as a predictive picture from the encoding target picture, to obtain a data on a difference in between as a second difference data, and implement thereon the process for the prescribed second encoding to create a second sequence of bits encoded by the second encoding, and a set of operations to create a data on difference simply from the encoding target picture, using neither first reference picture nor second reference picture, to use as a third difference data, and implement thereon the process for the prescribed second encoding to create a third sequence of bits encoded by the second encoding, to provide the multiplexer 109 with thus created first to third sequences of bits encoded by second encoding. There are data on methods for selection of respective types of reference pictures and data on encoding methods as described, which may be collected as data on reference picture selection modes and as data on encoding modes for the second encoding, respectively, and processed by implementing thereon a process for a prescribed entropy encoding using an unshown entropy encoder, to supply to the multiplexer 109.

The second encoder 107 may be configured to execute an encoding in the CGS (Coarse Grain Scalability) layer under MPEG-4 SVC for instance, and work for sequences of moving pictures equal in spatial resolution to the spatial resolution of sequences of moving pictures having a standard resolution at the first encoder 102, to operate complying with a prescribed syntax structure meeting the restraining conditions to facilitate a conversion from SVC to AVC in terms of the AVC rewriting by the JVT (Joint Video Team) being a joint group of MPEG and ITU-T, to make the second encoding for creation of second encoded bit sequences. This configuration permits the second encoder 107 to create second encoded bit sequences, as sequences of such encoded bits that afford to make the conversion from the encoding format of SVC that is a hierarchical encoding to the encoding format of AVC that is a single layer encoding, without the need of making such a reencoding that involves a combination of complete decoding and encoding.

Figure 3:
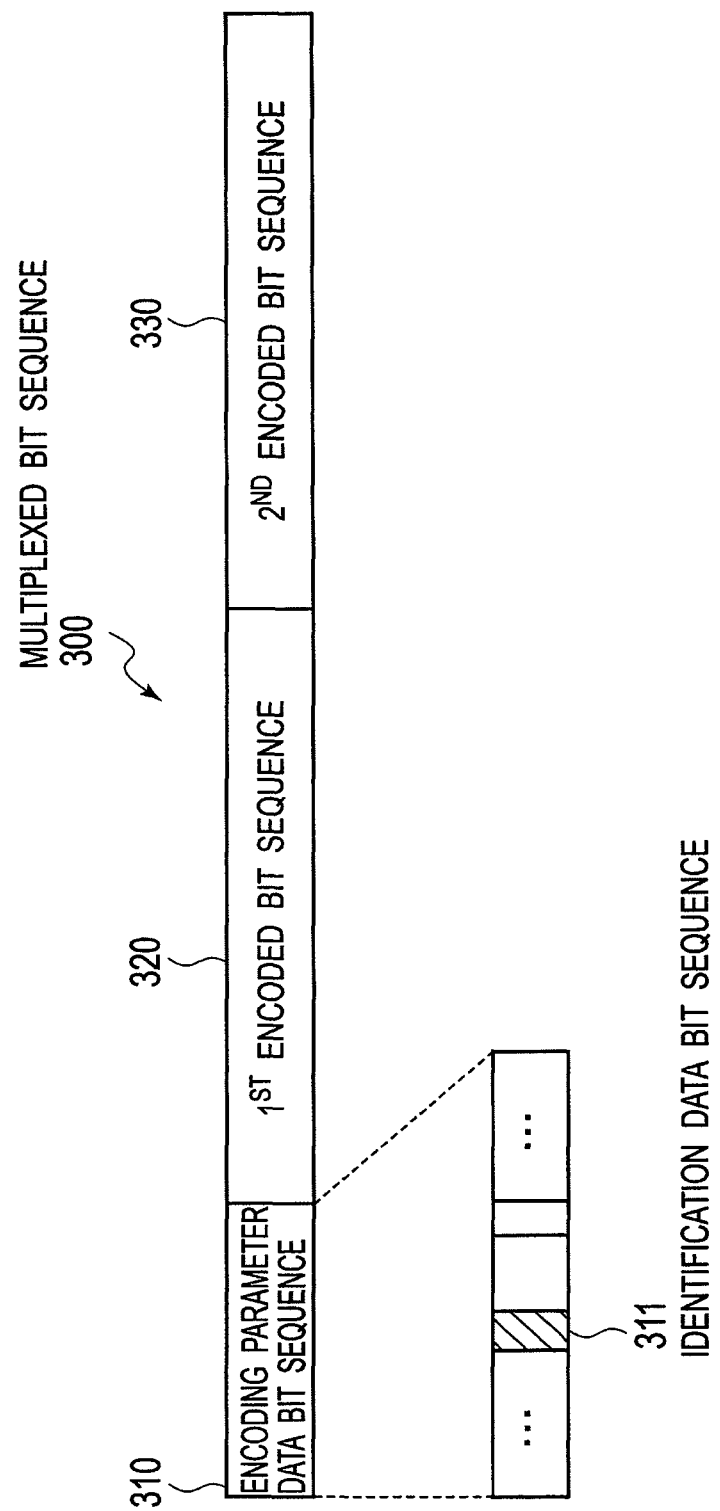
FIG. 3 is a diagram of data format illustrating an example of structure of a multiplexed bit sequence created at a multiplexer 109 in the first embodiment.

The multiplexer 109 is configured for functions to acquire from the first encoder 102 a first sequence of encoded bits and from the second encoder 107 a second sequence of encoded bits, and operate complying with a prescribed syntax structure to implement a process of multiplexing the first sequence of encoded bits, the second sequence of encoded bits, and sequences of encoded bits of associated data covering sets of data on encoding parameters of respective types used in encoding processes, involving data on motion vectors and data on quantizing parameters, encompassing data on the above-noted reference picture selection and the like, as well as sets of data on encoding modes or such, as they are each respectively processed through an unshown entropy encoder, while inserting identification data for their identification, to create a sequence of bits multiplexed as illustrated in FIG. 3 that will be described later on. The multiplexer 109 may well be configured for functions to additionally acquire data on modes of reference picture selection and data on reference picture selection as prepared at the second encoder 107 in the form of sequences of encoded bits encoded through an unshown entropy encoder, and implement thereon a process for a multiplexing to create a sequence of bits multiplexed as described above.

According to the present embodiment, there is a system including the foregoing configurations and adapted to work on input moving pictures, to implement a process for a prescribed super-resolution enlargement and a process for a prescribed resolution conversion, creating super-resolution enlarge and converted signals of moving pictures input with a standard resolution, to make use of them allowing for a moving picture encoding based on an increased amount of information relative to an information amount of input moving pictures. It is noted that between the first super-resolution enlarger 103 and the second super-resolution enlarger 105, the enlargement ratios applied may not be always equal to each other. Likewise, between the first resolution converter 104 and the second resolution converter 106, the resolution conversion ratios applied may not be always equal to each other. However, for configuration in FIG. 1, there should be resolution conversion ratios established for the first resolution converter 104 and the second resolution converter 106 to have a spatial resolution after their processes for resolution conversion, equalized to the standard resolution.

Figure 2:
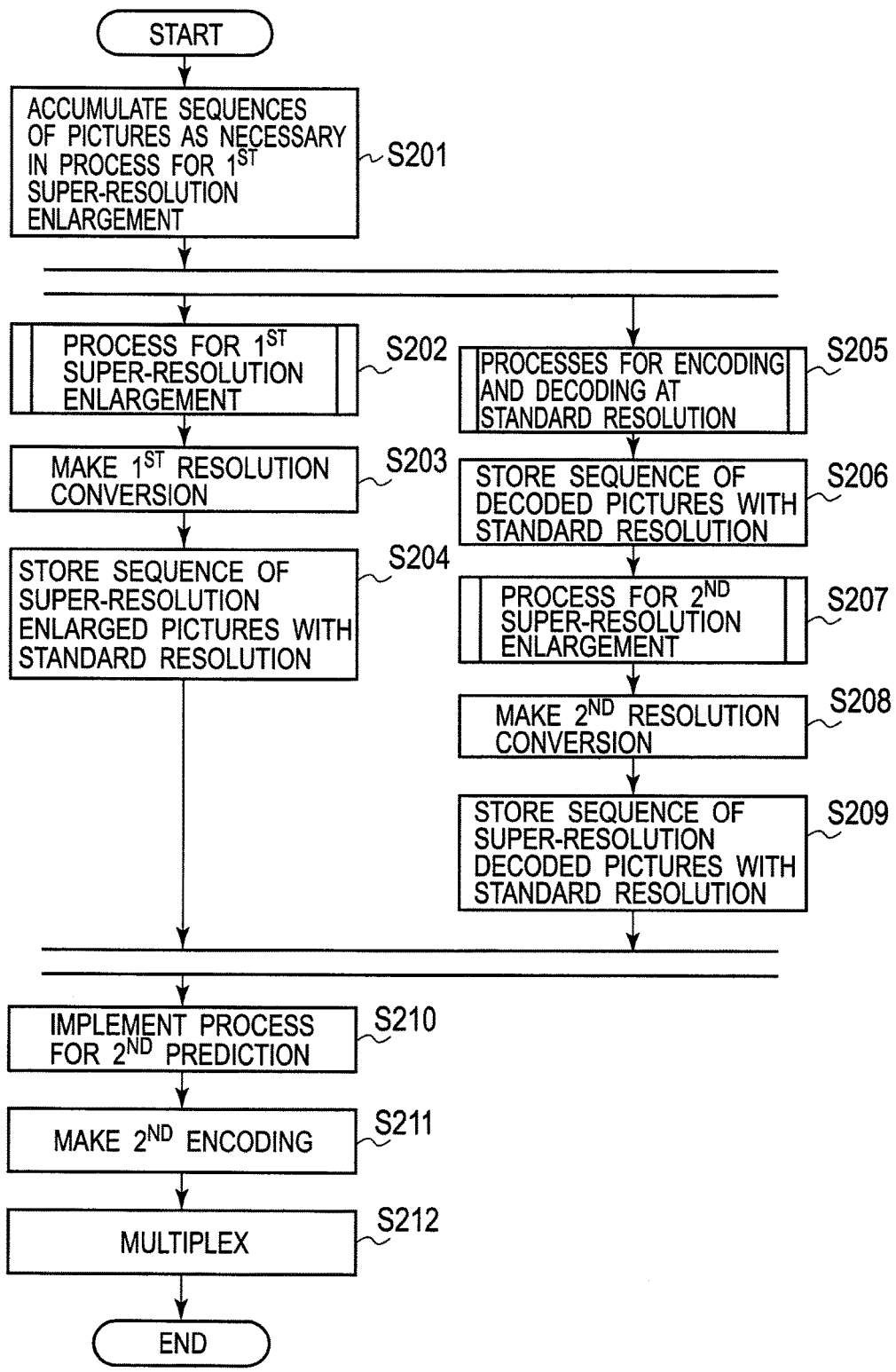
FIG. 2 is a flowchart of actions of the moving picture encoding system according to the first embodiment.

Description is now made of actions of the moving picture encoding system according to the first embodiment shown in FIG. 1, with reference to a flowchart of FIG. 2.

First, the first accumulation buffer 101 stores therein input moving pictures, as necessary in number of pictures for the first super-resolution enlarger 103 to implement a process for a first super-resolution enlargement (step S201).

The first super-resolution enlarger 103 acquires from the first accumulation buffer 101 two or more pictures, as necessary for a process for a prescribed super-resolution enlargement, and implements thereon the process for the prescribed super-resolution enlargement (step S202), whereby it creates super-resolution enlarged pictures with a resolution higher than a standard resolution that input moving pictures have as a spatial resolution thereof, to supply to the first resolution converter 104. For the first super-resolution enlarger 103, specific configurations as well as contents of the process for super-resolution enlargement will be described later on.

After that, the first resolution converter 104 acquires super-resolution enlarged pictures from the first super-resolution enlarger 103, and implements thereon a process for a prescribed resolution conversion (step S203), whereby it creates super-resolution enlarged and converted signals of pictures input with the standard resolution, and supplies the second encoder 107 with thus created super-resolution enlarged and converted signals of pictures input with the standard resolution.

After that, the second encoder 107 acquires super-resolution enlarged and converted signals of input pictures with the standard resolution from the first resolution converter 104, storing them in a prescribed buffer for temporary accumulation (step S204).

On the other hand, the first encoder 102 acquires from the first accumulation buffer 101 a sequence of moving pictures with the standard resolution as necessary for implementation of a process for a prescribed pre-super-resolution encoding, and implements thereon a process for an encoding and a decoding at the standard resolution (step S205), whereby it creates a first sequence of encoded bits with the standard resolution as a result of the encoding process, and a set of decoded pictures with the standard resolution as a result of the decoding. After that, the first encoder 102 works to supply the first sequence of encoded bits thus created to the multiplexer 109, and further to supply the set of decoded pictures thus created to the second super-resolution enlarger 105 and the second encoder 107.

After that, the second encoder 107 acquires the set of decoded pictures from the first encoder 102, storing in a prescribed buffer for temporary accumulation (step S206).

After that, the second super-resolution enlarger 105 works like the first super-resolution enlarger 103, to acquire the set of decoded pictures from the first encoder 102, and implement thereon a process for a prescribed super-resolution enlargement (step S207), whereby it creates a set of super-resolution enlarged decoded pictures with a resolution higher than the standard resolution, to supply to the second resolution converter 106.

After that, the second resolution converter 106 acquires the set of super-resolution enlarged decoded pictures from the second super-resolution enlarger 105, and implements thereon a process for a prescribed resolution conversion (step S208), whereby it creates super-resolution enlarged and converted signals of decoded pictures with the standard resolution, to supply to the second encoder 107.

After that, the second encoder 107 acquires super-resolution enlarged and converted signals of decoded pictures with the standard resolution from the second resolution converter 106, storing them in a prescribed buffer for temporary accumulation (step S209).

The combination of processes associated with steps S202 to S204 and the combination of processes associated with steps S205 to S209 may be implemented in parallel, or in series with either ahead in execution.

With the combinations of processes at steps S202 to S209 completed, the second encoder 107 has a set of encoding target pictures in the form of super-resolution enlarged and converted signals of input pictures as they are input pictures having undergone the first combination of super-resolution enlargement and resolution conversion through the first super-resolution enlarger 103 and the first resolution converter 104, a set of first reference pictures in the form of decoded pictures as they are input pictures having been simply encoded and decoded at the first encoder 102, and a set of second reference pictures in the form of super-resolution enlarged and converted signals of decoded pictures as they are those decoded pictures having undergone the second combination of super-resolution enlargement and resolution conversion through the second super-resolution enlarger 105 and the second resolution converter 106, and implements thereon a process for a prescribed second prediction (step S210), whereby the second encoder 107 creates a set of difference data at the standard resolution. After that, the second encoder 107 works on the set of difference data thus created to implement a second encoding process as a process for a prescribed second encoding (step S211), whereby it creates a second sequence of encoded bits, to supply to the multiplexer 109.

After that, the multiplexer 109 acquires a first sequence of encoded bits from the first encoder 102 and a second sequence of encoded bits from the second encoder 107. Then, complying with a prescribed syntax structure, it implements a process of multiplexing the first sequence of encoded bits, the second sequence of encoded bits, and sequences of encoded bits of associated data covering sets of data on encoding parameters used in encoding processes, involving data on motion vectors, data on quantizing parameters, and data on reference picture selection, as they area each respectively processed through an unshown entropy encoder, while inserting identification data for identification of a set of subsequent sequences of encoded bits and the like (step S212), to create a sequence of multiplexed bits. The present embodiment involves a series of actions to be complete through the foregoing steps.

According to the present invention, there is a moving picture encoding system operable through execution of such the steps to create sequences of encoded bits as necessary.

FIG. 3 illustrates an example of multiplexed bit sequence 300 to be output from the multiplexer 109.

As illustrated in FIG. 3, the multiplexed bit sequence 300 is comprised of multiplexed information including a bit sequence 310 of data on encoding parameters, a first sequence 320 of encoded bits from the first encoder 102, and a second sequence 330 of encoded bits from the second encoder 107.

The bit sequence 310 of data on encoding parameters has sequences of encoded bits stored therein to define data on encoding parameters of respective types that among others the first encoder 103 and the second encoder 107 have employed in their encoding processes, involving data on motion vectors, data on quantizing parameters, data on associated encoding modes, and data on the above-noted selection of reference pictures and reference picture selection modes, and a bit sequence 311 of identification data inserted to identify the first sequence of encoded bits 320 and the second sequence of encoded bits 330 as multiplexed in the multiplexed bit sequence 300. Such the configuration of multiplexed bit sequence 300 is a simple example, and there may be another example of configuration to have those data required over an entirety of encoding and stored in a bit sequence 310 of data on encoding parameters, those data employed at the first encoder 102 as inherent information to the first encoder 102 and stored in a first sequence of encoded bits 320, and those data employed at the second encoder 107 as inherent information to the second encoder 107 and stored in a second sequence of encoded bits 330.

There have been operations described as being parallel processes according to the present embodiment, while those processed in parallel may well be consecutively processed in a configuration operable according to the present embodiment.

According to the present embodiment, there may well be operations to keep the first super-resolution enlarger 103 and the first resolution converter 104 from working, to supply pictures input with the standard resolution and stored in the first accumulation buffer 101, as super-resolution enlarged and converted signals of input pictures with the standard resolution, to the second encoder 107, to implement thereon a process for a prescribed second encoding at the second encoder 107 in a configuration operable according to the present embodiment.

Like this, the provision of a first super-resolution enlarger 103 and a second super-resolution enlarger 105 combined with the provision of a first resolution converter 104 and a second resolution converter 106 affords for services on super-resolution enlarged pictures that are defined with the same standard resolution as input pictures but have information on spatial and temporal frequency components increased by a process for a first super-resolution enlargement, to implement a process for a first resolution conversion that limits the frequency band within a range of desirable frequency components, to create super-resolution enlarged and converted signals of input pictures with the standard resolution.

Thus created super-resolution enlarged and converted signals of input pictures with the standard resolution afford for services on the super-resolution enlarged pictures created with greater amounts of information on frequency components than input moving pictures have, to take in therefrom information on frequency components within a band of frequencies up to an uppermost one that can be expressed by spatial frequencies on the standard resolution, into the super-resolution enlarged and converted signals of input pictures with the standard resolution, thus permitting information amounts of frequency components that input moving pictures have to be extended, to implement a process for a moving picture encoding to create a first sequence of encoded bits with the standard resolution and a second sequence of encoded bits with the standard resolution, allowing for a moving picture encoding to be implemented on bases of information amounts greater than information amounts that input moving pictures have.

Further, it is afforded to provide services on moving pictures input with the standard resolution, to implement a combination of processes for prescribed encoding and decoding to create decoded pictures with the standard resolution. Still more, it is afforded to provide services on the decoded pictures with the standard resolution, to implement a process for a prescribed second super-resolution enlargement, creating super-resolution enlarged decoded pictures with a resolution higher than the standard resolution, having increased information on spatial and temporal frequency components, and implement a process for a prescribed second resolution conversion on thus created super-resolution enlarged decoded pictures, creating super-resolution enlarged and converted signals of decoded pictures with the standard resolution. Yet more, it is afforded to have thus created super-resolution enlarged and converted signals of decoded pictures with the standard resolution, as reference pictures, and employ them together with super-resolution enlarged and converted signals of input pictures with the standard resolution, to implement a process for a prescribed prediction in between, followed by implementing a process for a prescribed second encoding, to create a second sequence of encoded bits. It is thus permitted to utilize super-resolution enlarged and converted signals of decoded pictures with the standard resolution, as reference pictures, in combination with super-resolution enlarged and converted signals of input pictures with the standard resolution, to make a hierarchical encoding in between making use of correlations of spatial resolution between identical resolutions, allowing for a moving picture encoding based on greater amounts of information than input moving pictures have.

It also is possible for the second encoder 107 to work upon creation of a predictive picture, on one hand to have a first reference picture in the form of a decoded picture as it is an input picture having been simply encoded and decoded at the first encoder 102, and on the other hand to have a second reference picture in the form of a set of super-resolution enlarged and converted signals of a picture as decoded as it represents that decoded picture which has been processed for second super-resolution enlargement and resolution conversion through the second super-resolution enlarger 105 and the second resolution converter 106, to use the first reference picture or the second reference picture, whichever is selective to create the predictive picture, to implement thereon a process for an encoding, permitting a hierarchical encoding to be made by utilization of a correlation of spatial resolution between the decoded picture and a set of super-resolution enlarged and converted signals of the input picture with the standard resolution or by utilization of a correlation of spatial resolution between the set of super-resolution enlarged and converted decoded signals and the set of super-resolution enlarged and converted signals of the input picture with the standard resolution, whichever is requested, thus allowing for different multiplexed bit sequences to be created to supply to, accumulate at, and/or transmit to a decoding system end.

Also, it is possible to work along creation of predictive pictures, to control selection of reference picture for each picture or for each set of a prescribed number of pictures, permitting an adaptive creation of predictive picture in accordance with the image quality of decoded picture, resulting in an enhanced encoding efficiency.

Moreover, it is possible to provide a configuration for services to create a data of reference picture selection for identifying a first reference picture or a second reference picture whichever is used, to supply to the multiplexer 109, to multiplex into a multiplexed bit sequence 300, allowing for a facilitated identification of a reference picture used in the encoding.

Moreover, it is possible to provide a target picture divided with no spaces left into regions each having a prescribed area, and combination of a first reference picture and a second reference picture likewise divided into regions each having a prescribed area, and identify the first reference picture or the second reference picture whichever is selective for a respective region to create a predictive picture, thereby permitting an adaptive creation of predictive picture in accordance with the image quality of decoded picture, resulting in an enhanced encoding efficiency.

Further, it is possible to work on moving pictures input with the standard resolution, to implement a process for prescribed encoding and decoding to create a first sequence of encoded bits, and implement a process for second encoding to create a second sequence of encoded bits, and to operate complying with a prescribed syntax structure, to implement a process of multiplexing the sequences of encoded bits, together with sequences of encoded bits of data on encoding parameters used in the encoding processes, involving data on motion vectors, data on quantizing parameters, data on reference picture selection, and data on encoding modes, while inserting data else such as identification data for identification of a set of subsequent sequences of encoded bits, as necessary to create a sequence of multiplexed bits. The sequence of multiplexed bits thus created is configured as a single sequence of encoded bits including both of a result of encoding on inherent input moving pictures and a result of encoding on a set of errors in a prediction using information on frequency components as enlarged in super-resolution pictures having undergone a process for super-resolution enlargement combined with a process for resolution conversion, and is adaptive for services such as transmitting to an unshown external accumulator before recording in a prescribed recording medium, or delivering through a network using an unshown external communication system, thereby permitting a moving picture encoding system according to the present embodiment to operate on moving pictures with heavy amounts of information, allowing for efficient encoding, accumulation, and transmission.

Further, it is possible to acquire a first sequence of encoded bits from the first encoder 102 and a second sequence of encoded bits from the second encoder 107, and implement thereon a process for a prescribed multiplexing in accordance with data on encoding modes, permitting a variety of encoded bit sequences to be created, affording to make a selective decoding at a decoding system end.

Further, it is possible to operate according to the present embodiment, to keep the first super-resolution enlarger 103 and the first resolution converter 104 from working, to supply pictures input with the standard resolution and stored in the first accumulation buffer 101, as super-resolution enlarged and converted signals of input pictures with the standard resolution, to the second encoder 107, to implement thereon a process for a prescribed second encoding at the second encoder 107 in a configuration operable according to the present embodiment, thereby affording to have input pictures with the standard resolution as encoding target pictures at the second encoder 107, permitting the second encoder 107 to make more efficient use of reference pictures than in typical processes for inter-layer prediction to create predictive pictures, reducing information amounts of difference data to be created, thus allowing for an enhanced encoding efficiency of the second sequence of encoded bits, with an enabled encoding process rendered the nearer to original moving pictures with the standard resolution.

Description is now made of a process for a prescribed super-resolution enlargement applied to the present embodiment according to the present invention.

For resolution enhancement of pictures using a super-resolution enlarging process, there have been generalized techniques including those employing low-resolution pictures relatively strongly correlating with each other, such as those simply deviated in position, to predict a single high-resolution picture, there having been many studies reported in recent years. For instance, there is "Super-Resolution Image Reconstruction, by Sung C. P. and Min K. P.: A Technical Overview, IEEE Signal Proc. Magazine, Vol. 26, No. 3, pp. 21-36, 2003", among others.

Further, there is "Reconstruction of a high-resolution image by simultaneous registration, restoration, and interpolation of low-resolution images, by B. C. Tom and A. K. Katsaggelos, Proc. IEEE Int. Conf. Image Processing, Vol. 2, pp. 539-542, 1995" disclosing an ML (Maximum-likelihood) method as a proposal. The ML method has an evaluation function in terms of a square error between a set of pixel values of a low-resolution picture estimated from a high-resolution picture and a set of actual observed pixel values, and an estimated picture as such a high-resolution picture that minimizes the evaluation function. This method is a method of implementing a super-resolution process based on the principle of maximum likelihood estimation.

Further, there is "Extraction of high-resolution frames from video sequences, by R. R. Schulz and R. L. Stevenson, IEEE Trans. Image Processing, Vol. 5, pp. 996-1011, 1996" disclosing an MAP (Maximum A Posterior) method as a proposal. The MAP method makes an estimation of such a high-resolution picture that minimizes an evaluation function having probability information of high-resolution picture added to a square error. This method is a method for super-resolution process that makes the estimation of high-resolution picture as an optimization problem making use of some prior information on a high-resolution picture, to maximize the posterior probability.

Further, there is "High resolution image recovery from image-plane arrays, using convex projections, by H. Stark and P. Oskoui, J. Opt. Soc. Am. A, Vol. 6, pp. 1715-1726, 1989" disclosing a POCS (Projection Onto Convex Sets) method as a proposal. The POCS method is a method for super-resolution process that writes simultaneous equations on sets of pixel values of high-resolution picture and low-resolution picture, and solves them sequentially, to thereby obtain a high-resolution picture.

According to the present embodiment, the process for the prescribed super-resolution enlargement may for instance be an application of any such super-resolution process as described above.

There will be description made of an example of basic configuration of a process for super-resolution enlargement employed in the present embodiment according to the present invention.

Figure 4:
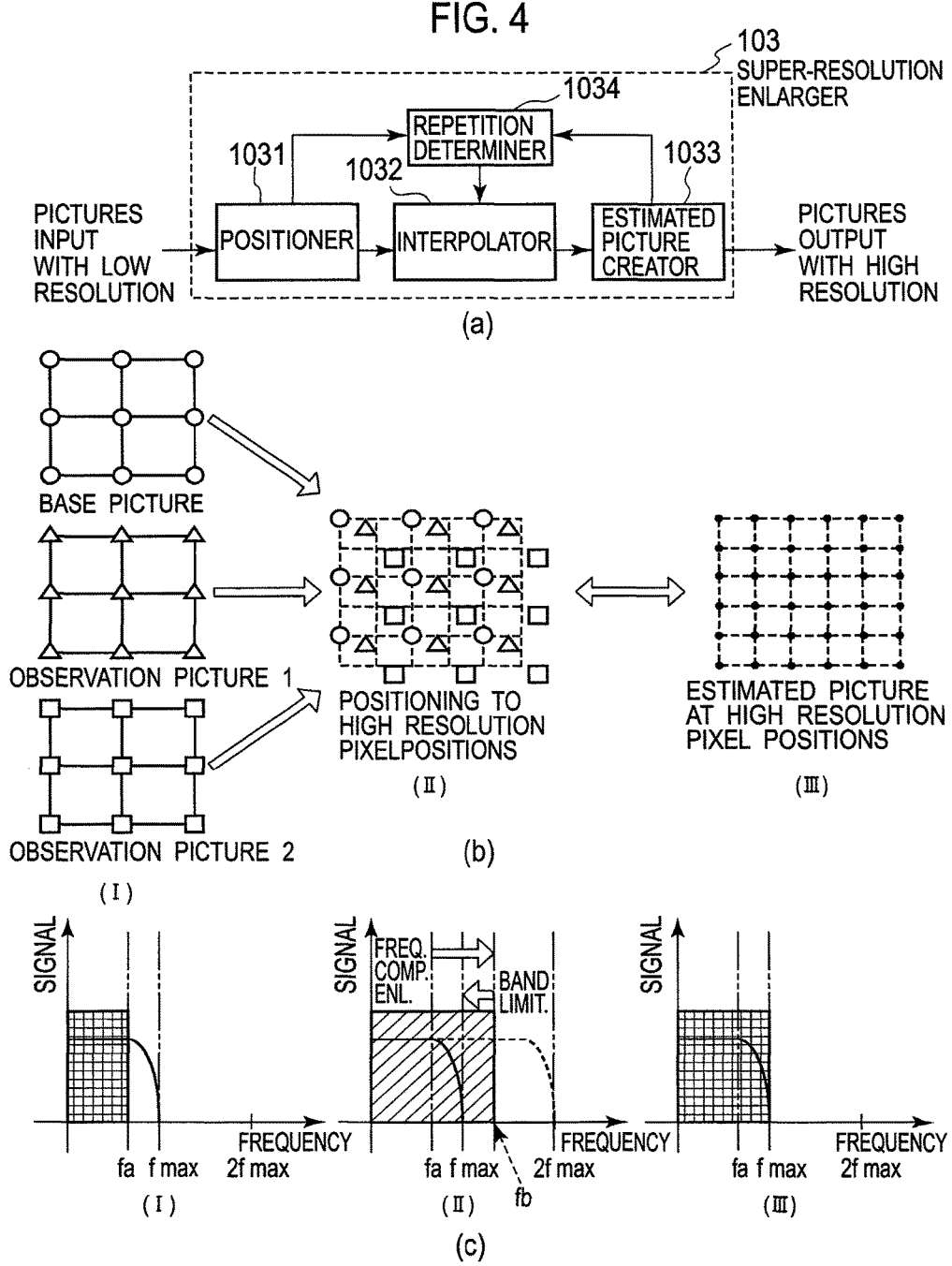
FIG. 4 is a combination of a block diagram showing an example of detailed configuration of a first super-resolution enlarger 103 in the first embodiment, and conceptual diagrams illustrating an example of process for a prescribed super-resolution enlargement to be implemented at the first super-resolution enlarger 103.
Figure 5:
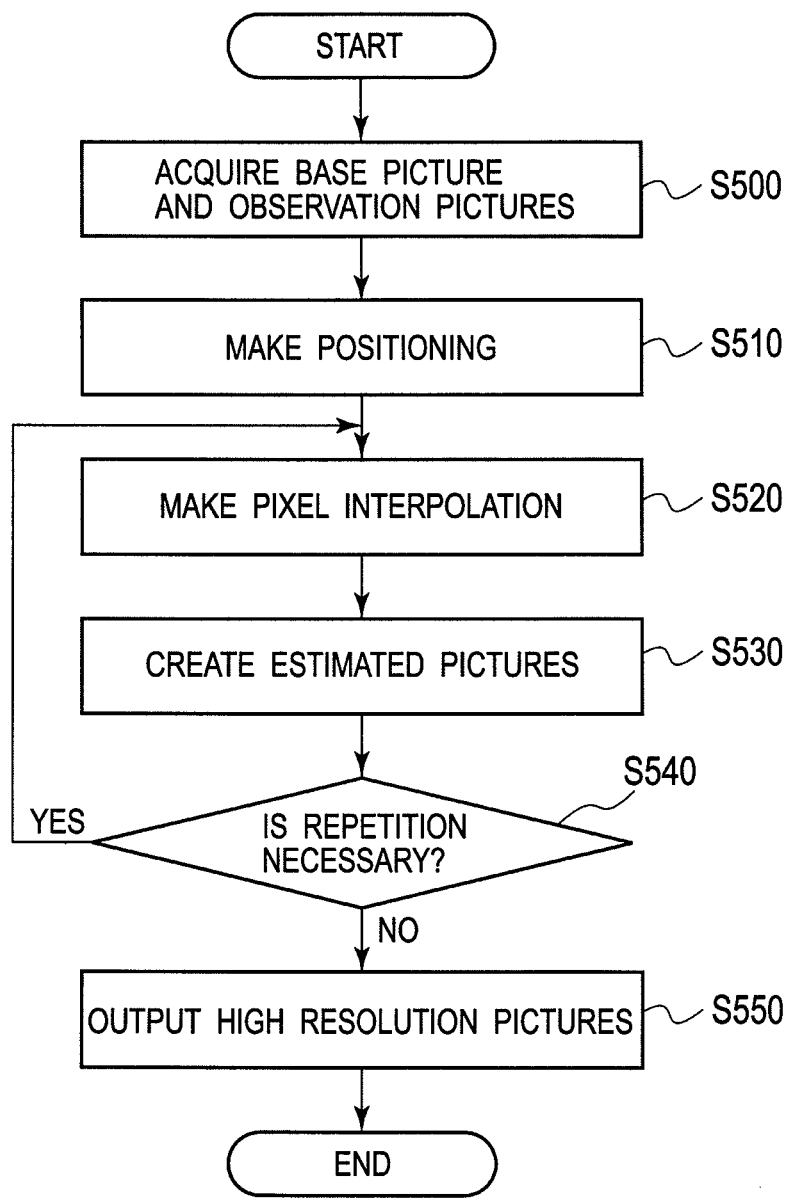
FIG. 5 is a flowchart of actions of the first super-resolution enlarger 103 in the first embodiment.

Part (a) of FIG. 4 is a block diagram showing a detailed configuration of the first super-resolution enlarger 103 in the first embodiment according to the present invention, Part (b) of FIG. 4, a combination of conceptual diagrams illustrating a process for super-resolution enlargement, and FIG. 5, a flowchart of exemplary actions in the process for super-resolution enlargement.

In Part (a) of FIG. 4, according to the first embodiment, the first super-resolution enlarger 103 includes a positioner 1031, an interpolator 1032, an estimated picture creator 1033, and a repetition determiner 1034. It is noted that the second the super-resolution enlarger 105 has a similar configuration.

The positioner 1031 is configured to work in a processing for super-resolution enlargement, to acquire combination of a base picture constituting a base in therein and one or more observation pictures, such as those illustrated in Section (I) in Part (b) of FIG. 4. It is now assumed to acquire such a combination of base picture, observation picture 1, and observation picture 2, as illustrated in Section (I) in Part (b) of FIG. 4. As illustrated in Section (II) in Part (b) of FIG. 4, the positioner 1031 is configured for functions to make a registration or positioning to pixel positions of a resolution higher than resolutions of observation pictures 1and 2 and base picture thus acquired, for an interval-unequal sampling to create nonhomogeneous high resolution pictures. Further, it is configured for a function to supply created nonhomogeneous high resolution pictures to the interpolator 1032 and the repetition determiner 1034. For the creation of nonhomogeneous high resolution pictures, preferably, as illustrated in Section (II) in Part (b) of FIG. 4, observation pictures should be each positioned relative to pixels of the base picture, to arrange in place to have a highest correlation with the base picture. Further, in application of a resolution to a certain positioning, preferably, the resolution used to make the positioning should be a higher resolution than would be obtained after an associated process for super-resolution enlargement. For Part (c) of FIG. 4, there will be description made later on in comparison with Part (c) of FIG. 6.

The interpolator 1032 is configured for functions to acquire nonhomogeneous high resolution pictures created at the positioner 1031, and use acquired nonhomogeneous high resolution pictures, for implementing a process for a prescribed nonhomogeneous interpolation to create therefrom interpolated pictures with a desirable high resolution, to supply to the estimated picture creator 1033. Further, the interpolator 1032 acquires from the repetition determiner 1034 necessary information for control to continue the process. The control information for continuation of process may well include a nonhomogeneous estimated picture created at the estimated picture creator 1033. The interpolator 1032 may be configured to work when implementing a repetition process in accordance with the control information, to operate following a prescribed updating method, for use of a nonhomogeneous estimated picture to update a nonhomogeneous high resolution picture acquired from the positioner 1031, while correcting respective interpolated pixels.

The estimated picture creator 1033 is configured for functions to acquire interpolated pictures created at the interpolator 1032, and implement thereon a process for a prescribed reconstruction in consideration of a point spread (PSF) function obtained from a prescribed camera model, implementing a process for a prescribed noise removal, as necessary, to create such estimated pictures with a desirable resolution as illustrated in Section (III) in Part (b) of FIG. 4. Further, it is configured for functions to implement a re-sampling process on estimated pictures, to create nonhomogeneous estimated pictures corresponding to pixels of non-homogeneous high resolution pictures, to supply to the repetition determiner 1034. Further, it is configured for functions to acquire control information from the repetition determiner 1034, and operate in accordance with the control information, to create and externally output estimated pictures as high resolution pictures with a desirable resolution.

The repetition determiner 1034 is configured for functions to acquire a nonhomogeneous high resolution picture from the positioner 1031 and a nonhomogeneous estimated picture from the estimated picture creator 1033, for employment of the acquired pictures to follow a prescribed determination method to determine whether or not a repetition of the process for super-resolution enlargement is necessary, and work depending on a result thereof to operate as the repetition is necessary, to provide the interpolator 1032 with information for a control to continue the process, and operate as the repetition is unnecessary, to provide the estimated picture creator 1033 with information for a control to output estimated pictures with a high resolution as a result of the process for super-resolution enlargement.

For a process for super-resolution enlargement required to implement at a still higher rate, there may be application of such a rate increasing method for super-resolution process as disclosed in Japanese Patent No. 3837575 for instance, to a picture processing system according to the present invention, to thereby attain a still better configuration.

Description is now made of actions of the super-resolution enlarger 103 shown in Part (a) of FIG. 4, with reference to a flowchart in FIG. 5.

First, the positioner 1031 acquires a base picture as a base in an associated process for super-resolution enlargement, and one or more observation pictures (S500). After that, for each picture acquired, it makes a positioning at a resolution higher than a desirable resolution (S510). On this occasion, after arrangement of pixels of the base picture to corresponding positions, it arranges pixels of observation pictures, making highest correlations with the base picture, thereby creating an interval-unequally sampled nonhomogeneous high resolution picture.

After that, the interpolator 1032 acquires the created nonhomogeneous high resolution picture, and implements thereon a process for a prescribed nonhomogeneous interpolation to effect interpolation of pixels (S520). This creates an interpolated picture with a desirable high resolution.

Next, the estimated picture creator 1033 acquires the interpolated picture, and implements thereon a process for a prescribed reconstruction, implementing a process for a prescribed noise removal, as necessary, to create an estimated picture with a desirable resolution (S530). Further, it implements a re-sampling process on the estimated picture, to create a nonhomogeneous estimated picture corresponding to a set of pixels of the nonhomogeneous resolution picture.

Next, the repetition determiner 1034 acquires the nonhomogeneous resolution picture from the positioner 1031, while acquiring the nonhomogeneous estimated picture from the estimated picture creator 1033. Employing the acquired pictures, it follows a prescribed determination method, thereby determining whether or not a repetition of the process for super-resolution enlargement is necessary (S540).

If the repetition of the process for super-resolution enlargement is determined as being necessary (YES at S540), it provides the interpolator 1032 with information for a control to continue the process. If the repetition of the process for super-resolution enlargement is determined as being unnecessary (NO at S540), it provides the estimated picture creator 1033 with information for a control to output an estimated picture with a high resolution as a result of the process for super-resolution enlargement, whereby the estimated picture creator 1033 operates in accordance with the control information, to output the estimated picture created with the desirable resolution, as a high resolution picture obtained by the process for super-resolution enlargement (S550). Then, according to the first embodiment, the process for super-resolution enlargement goes to an end.

Description is now made of an example of process for a prescribed resolution conversion applied to the first resolution converter 104 as well as to the second resolution converter 106.

Part (a) of FIG. 6 is a block diagram showing an example of configuration of the first resolution converter 104.

In Part (a) of FIG. 6, the first resolution converter 104 includes a pixel inserter 1041, a filtering processor 1042, and a pixel thinner 1043. It is noted that among others the second resolution converter 106 is likewise configured, as well as a third resolution converter 110 in a later-described embodiment.

The pixel inserter 1041 is adapted for enlargement of resolution of an input picture to extend the band of spatial frequencies available to handle, and is configured to insert new pixels between pixels, to create an upsampled picture, to supply to the filtering processor 1042.

The filtering processor 1042 is configured to acquire the upsampled picture from the pixel inserter 1041, and implement thereon a process for a filtering using a prescribed low-pass filter, to create a band-limited picture, to supply to the pixel thinner 1043. The process for the filtering using a prescribed low-pass filter may well be a filtering process implemented on an upsampled picture, by using a low-pass filter adapted for band limitation and interpolation, within a band of spatial frequencies that can represent the spatial resolution of a picture finally output at the resolution converter, and the filter used may be, for instance, a filter based on the sine function or Lanczos function, or an RR filter or FIR filter designed with a precipitous cut-off frequency characteristic for a frequency response to be flat over an entirety of band. There may be a process reduced in duty by use of such a filter as based on the Nearest-neighbor method, the Bilinear method, or the Spline method.

The pixel thinner 1043 is configured to acquire the band-limited picture from the filtering processor 1042, and implement thereon a process for a prescribed pixel thinning or decimation for a match with the resolution of a picture finally output at the resolution converter, to create a picture to be output.

Part (b) of FIG. 6 is a combination of conceptual diagrams illustrating how signal components vary in a picture subjected to a contraction process by decimation after a process for enlargement of picture by resolution conversion at a resolution converter such as the first resolution converter 104.

As illustrated in Section (I) in Part (b) of FIG. 6, assuming an input picture inherently containing a range of spatial frequency components not exceeding an 'fa', in the process for resolution conversion at the resolution converter, even if this was operated to implement a process for enlargement of the picture with a resolution enhanced to enlarge the range of spatial frequency components available to handle, and created a picture with an increased number of pixels, the range of spatial frequency components contained therein as itself could not have increased instead. Therefore, as illustrated in Section (II) in Part (b) of FIG. 6, there would have been resulted a state simply containing the range of spatial frequency components left as it was, so even if this was subjected to a low-pass filtering process to limit the band to an 'fmax', still combined with a process for an inter-pixel thinning down to the pixel number of an original spatial resolution, there would have been created a picture containing the range of spatial frequency components left as it was.

On the other hand, Part (c) of FIG. 4 is a combination of conceptual diagrams illustrating how signal components vary in a picture subjected to a decimation process after a process for super-resolution enlargement at a super-resolution enlarger such as the first super-resolution enlarger 103.

As illustrated in Section (I) in Part (c) of FIG. 4, assuming an input picture inherently containing a range of spatial frequency components not exceeding an 'fa', in the process for super-resolution enlargement at the super-resolution enlarger that makes such a processing as illustrated in Part (b) of FIG. 4, the range of spatial frequency components contained therein as itself does increase. Therefore, as illustrated in Section (II) in Part (c) of FIG. 4, assuming a resultant state having a range of contained spatial frequency components extended up to an 'fb', if this is subjected to a low-pass filtering process to limit the band to an 'fmax', there appears a picture created with such components inclusive that exceed the range of spatial frequency components inherently contained up to the 'fa', but are still contained in the picture which can express a range of spatial frequencies up to the 'fmax'.

Such the process is implemented for a super-resolution enlargement at the super-resolution enlarger 103, and provides a picture that is equal in resolution to a resolution conversion at the first resolution converter 104, but is essentially different therefrom in that the former can create and make use of such a picture as compensated for those picture components to be inherently contained. This is similar also in relationships such as associated with the second super-resolution enlarger 105 or the third super-resolution enlarger 110.

There may be configuration with a function to have a ratio of resolution conversion set up upon implementation of the process for the prescribed resolution conversion as preset information on a prescribed resolution conversion ratio, or as acquired information on resolution conversion ratio such as set up by an external user, and work on the basis of acquired information on resolution conversion ratio to establish a resolution conversion ratio to implement the process for the prescribed resolution conversion.

For instance, assuming among others the first resolution converter 104 or the second resolution converter 106 configured as illustrated in Part (a) of FIG. 6, this operates upon a process being implemented for a decimation of picture from a super-resolution enlarged picture with a resolution higher than a standard resolution to a super-resolution enlarged and converted picture with the standard resolution, to set up combination of a proportion of new pixels to be inserted between pixels at the pixel inserter 1041 and a proportion of pixels to be thinned out at the pixel thinner 1043, depending on a given resolution conversion ratio.

The resolution conversion ratio can be expressed such that the resolution conversion ratio=a pixel insertion ratio/a pixel thinning ratio, where the pixel insertion ratio is such that pixel insertion ratio=input pixels/output pixels, and the pixel thinning ratio is such that pixel thinning ratio=input pixels/output pixels.

For instance, assuming a super-resolution enlarged picture created from the standard resolution with a resolution conversion ratio of 2, there are operations to return the picture to the standard resolution with a resolution conversion ratio of 1/2, including a setting made at the pixel inserter 1041, such that input pixels:output pixels=1:1, i.e., to have an input picture supplied, as it is, in the form of an upsampled picture to the filtering processor 1042. At the pixel thinner 1043, there is a setting made such that input pixels:output pixels=2:1, i.e., to implement a process of thinning one pixel out of each set of two pixels to create a picture to be output.

Further, to implement a process for enlargement of picture using the first resolution converter 104 configured as illustrated in Part (a) of FIG. 6, assuming creating a picture enlarged twice the standard resolution with a resolution conversion ratio of 2=2/1, for instance, there are operations including a setting made at the pixel inserter 1041 such that input pixels:output pixels=1:2, i.e., to insert one pixel per one pixel to create an upsampled picture to supply to the filtering processor 1042. At the pixel thinner 1043, there is a setting made such that input pixels:output pixels=1:1, i.e., to have a picture output as it is to output without implementing the thinning process.

It is noted that the configuration of first resolution converter 104 illustrated in Part (a) of FIG. 6 is a simple example, and there may be an example configured as necessary for a process for enlargement or contraction to a more flexible resolution, such as by use of the Spline method, to prepare from an input picture a set of pixels arranged in arbitrary positions with a fractal positional precision, to create a picture with a desirable resolution.

Therefore, according to the first embodiment, there is a moving picture encoding system adapted to set a spatial resolution that an input moving picture has as a standard resolution, and process information on frequency components in the spatial direction and the temporal direction that has been potentially contained in the input moving picture but unable to express to a sufficient degree by the standard resolution, to reconstruct on basis of a prescribed super-resolution process at a first super-resolution enlarger 103, describing with a resolution higher than the standard resolution, to create a super-resolution enlarged picture with an extended amount of information of the information on frequency components the input moving picture has, to implement thereon a moving picture encoding process, permitting an encoding of input moving pictures based on a greater amount of information than the moving pictures have, as an advantageous effect.

Moreover, according to the first embodiment, there is a moving picture encoding system adapted to operate on a super-resolution enlarged picture created at a first super-resolution enlarger 103, to implement a process for a prescribed resolution conversion at a first resolution converter 104 to create a super-resolution enlarged and converted picture described with a standard resolution, thus creating information on frequency components in the spatial direction and the temporal direction that has been potentially contained in an input moving picture but unable to express to a sufficient degree by the standard resolution, while processing information on frequency components that have not been inherently contained, to restrict within a range of information on frequency components that can be expressed with the standard resolution, to include in the super-resolution picture, thereby reflecting on the super-resolution picture such information on frequency components that have been unable to express in the input moving picture, to implement a moving picture encoding process on the super-resolution picture, permitting an encoding of input moving pictures based on a greater amount of information than the moving pictures have, as an advantageous effect.

Further, according to the first embodiment, there is a moving picture encoding system adapted to operate on a decoded picture with a standard resolution as encoded and decoded to create at a first encoder 102, to implement a combination of processes for prescribed super-resolution enlargement and resolution conversion at a second super-resolution enlarger 105 and a second resolution converter 106, respectively, creating a super-resolution enlarged decoded picture and a super-resolution enlarged and converted signal of the decoded picture with the standard resolution, and operate at a second encoder 107, as this is given an input picture after another combination of processes for super-resolution enlargement and resolution conversion at a first super-resolution enlarger 103 and a first resolution converter 104, respectively, to have a super-resolution enlarged and converted signal of the input picture, as an encoding target picture, the decoded picture being the input picture encoded and decoded as it is at the first encoder 102, as a first reference picture, and the super-resolution enlarged and converted signal of the decoded picture that is the decoded picture after the combination of processes for super-resolution enlargement and resolution conversion at the second super-resolution enlarger 105 and the second resolution converter 106, as a second reference picture, to implement thereon a combination of processes for prescribed second prediction and encoding, thus affording to obtain a predictive picture or predictive blocks with an image quality better than predictive pictures or predictive blocks obtainable by motion picture encoding techniques in the past, with resultant enhancement in encoding efficiency, as an advantageous effect.

(Second Embodiment)

Figure 7:
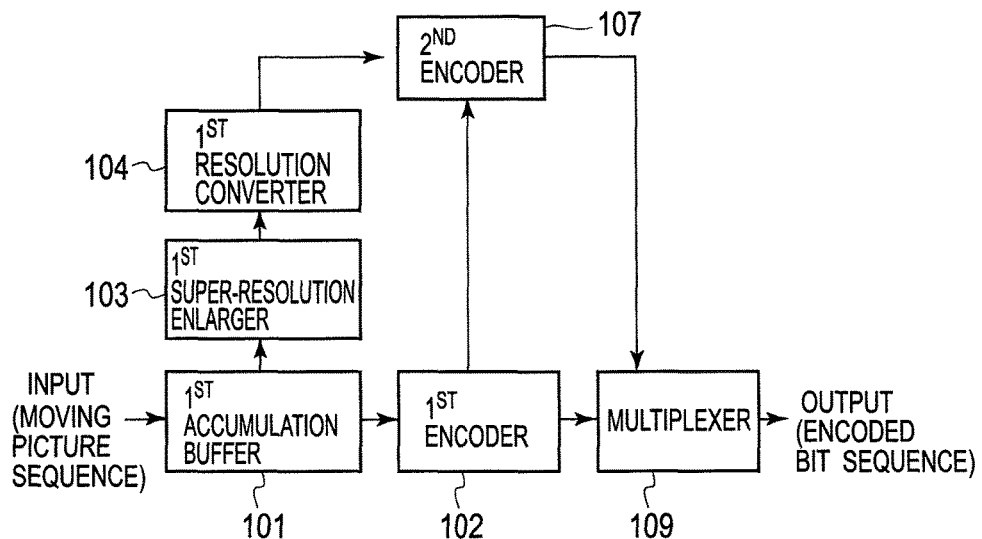
FIG. 7 is a block diagram showing an example of configuration of a moving picture encoding system according to a second embodiment.
Figure 8:
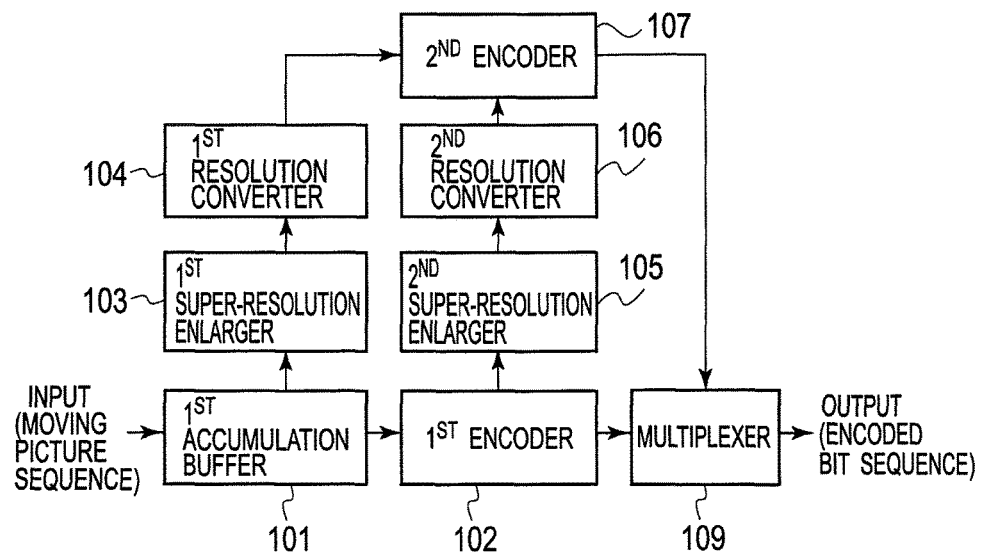
FIG. 8 is a block diagram showing another example of configuration of the moving picture encoding system according to the second embodiment.

In the first embodiment described above, there has been a second encoder 107 working as illustrated in FIG. 1 to have a pair of reference pictures input thereto, that is, combination of a first reference picture being an input picture as encoded and decoded as it is at a first encoder 102 to provide as a decoded picture, and a second reference picture being the decoded picture as subjected to a combination of second super-resolution enlargement and resolution conversion through a second super-resolution enlarger 105 and a second resolution converter 106 to provide as a super-resolution enlarged and converted signal of the decoded picture, to employ the reference pictures enabling a high efficient prediction to create a predictive picture, whereas there may well be an example adapted for instance, as illustrated in FIG. 7, for operation to supply a second encoder 107 simply with a first reference picture being an input picture as encoded and decoded as it is at a first encoder 102 to provide as a decoded picture, or as illustrated in FIG. 8, for operation to supply a second encoder 107 simply with a second reference picture being a decoded picture from a first encoder 102 as subjected to a combination of second super-resolution enlargement and resolution conversion through a second super-resolution enlarger 105 and a second resolution converter 106 to provide as a super-resolution enlarged and converted signal of the decoded picture, combined with operations for the second encoder 107 to employ simply the first or the second reference picture to make a combination of prediction and encoding using an encoding target picture being a super-resolution enlarged and converted signal of an input picture as subjected to a combination of first super-resolution enlargement and resolution conversion.

Figure 9:
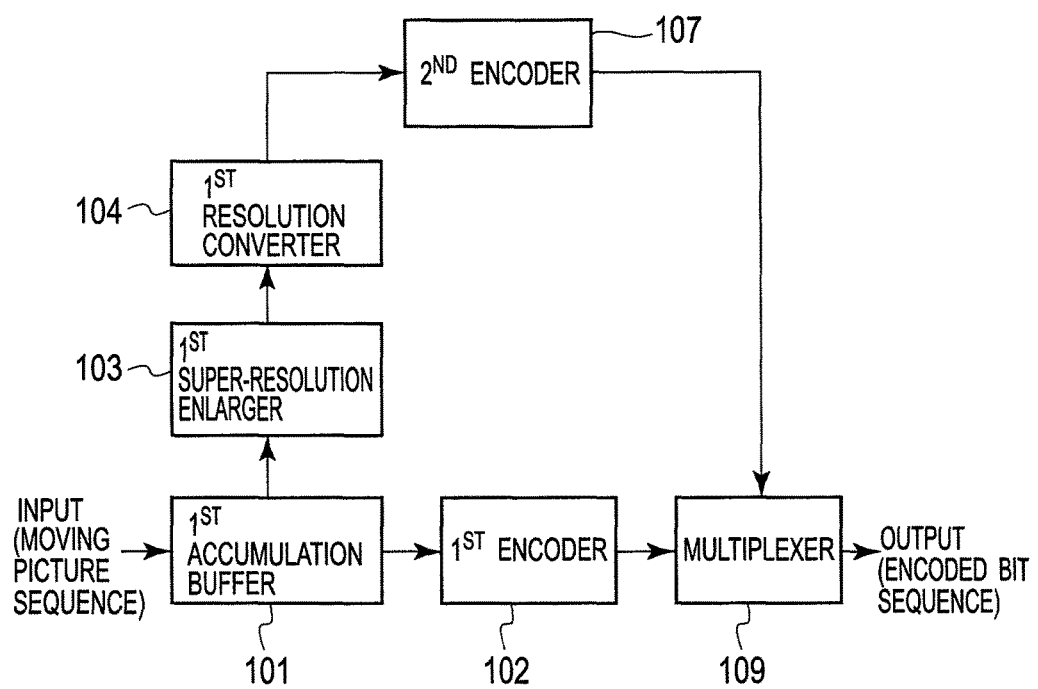
FIG. 9 is a block diagram showing still another example of configuration of the moving picture encoding system according to the second embodiment.

Or else, there may well be an example adapted, as illustrated in FIG. 9, for operations for a second encoder 107 to make a combination of prediction and encoding using an encoding target picture being a super-resolution enlarged and converted signal of an input picture as subjected to a combination of first super-resolution enlargement and resolution conversion, excluding operations to supply the second encoder 107 with either of two reference pictures, that is, without an operation to supply a first reference picture being an input picture as encoded and decoded as it is at a first encoder 102 to provide as a decoded picture, and an operation to supply a second reference picture being the decoded picture as subjected to a combination of second super-resolution enlargement and resolution conversion through a second super-resolution enlarger 105 and a second resolution converter 106 to provide as a super-resolution enlarged and converted signal of the decoded picture.

(Third Embodiment)

Description is now made of a moving picture encoding system according to a third embodiment of the present invention.

Figure 10:
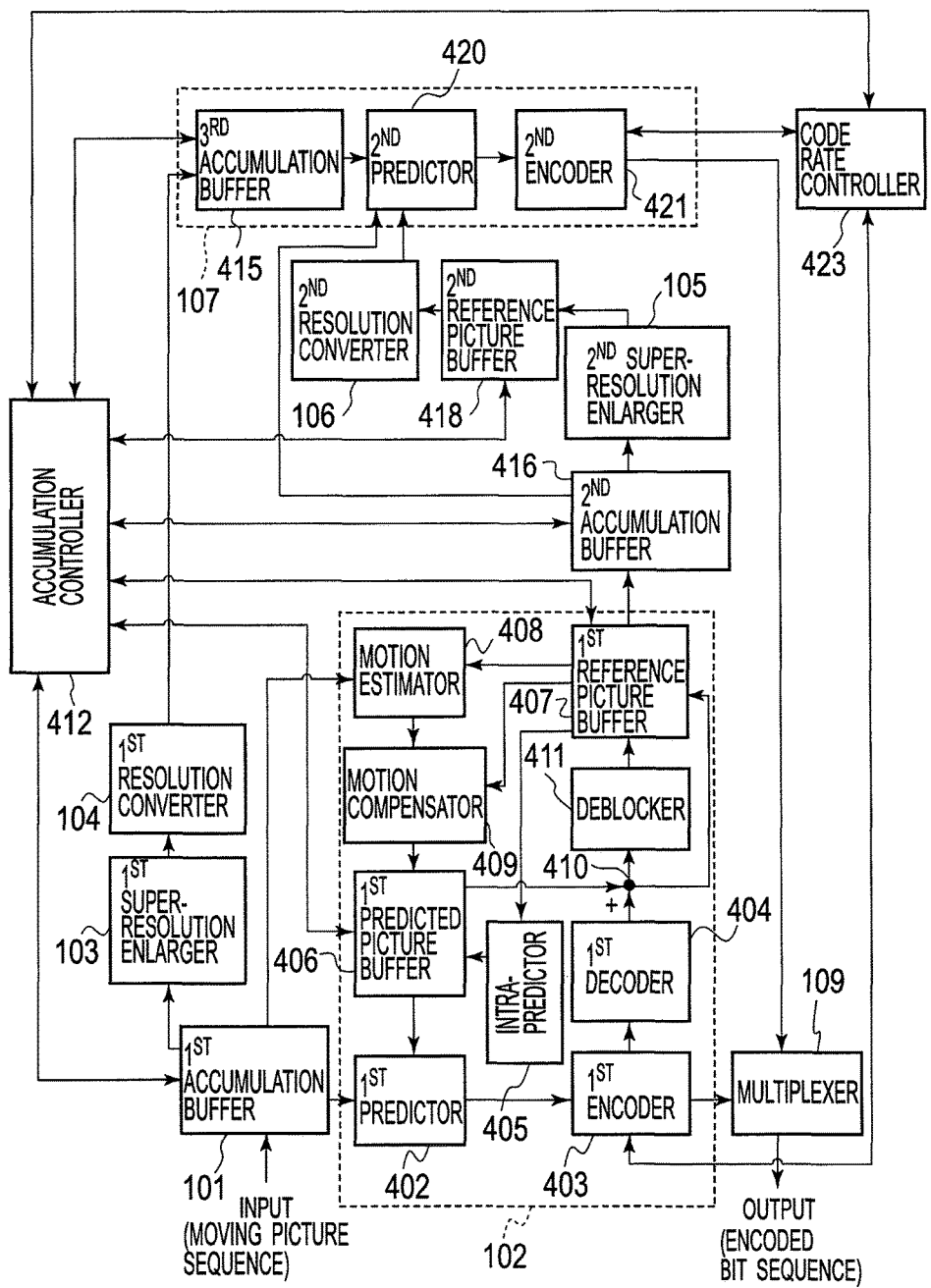
FIG. 10 is a block diagram showing an example of configuration of a moving picture encoding system according to a third embodiment.

FIG. 10 is a block diagram showing an example of configuration of the moving picture encoding system according to the third embodiment.

Referring to FIG. 10, the moving picture encoding system according to the third embodiment is configured as a specific example of the moving picture encoding system according to the first embodiment shown in FIG. 1, including an accumulation controller 412, a second accumulation buffer 416, a second reference picture buffer 418, and a code rate controller 423 added anew.

In FIG. 10, there is a first encoder 102 including a first predictor 402, a first encoder element 403, a first decoder element 404, an intra-predictor 405, a first predictive picture buffer 406, a first reference picture buffer 407, a motion estimator 408, a motion compensator 409, an adder 410, and a deblocker 411. This configuration affords to implement an equivalent function to MPEG-4 AVC specified to standardize under the ISO/IEC SC29 WG11 as a typical motion picture encoding. However, this specific configuration of the first encoder 102 is an example, so there may well be any example else subject to functions of the first encoder 102 to be implemented. For instance, there may be an example compliant with MPEG-2 employed in digital broadcasting or the like, or an example compliant with MPEG-4 SVC being a scalable extension of MPEG-4 AVC. There may be use of a pre-super-resolution encoder element based on a wavelet transform, as typified by JPEG2000.

Further, in FIG. 10, there is a second encoder 107 including a third accumulation buffer 415, a second predictor 420, and a second encoder element 421.

Description is now made of those component elements of the moving picture encoding system according to the third embodiment shown in FIG. 10, which have different functions or new functions relative to component elements of the first embodiment shown in FIG. 1.

The first predictor 402 is configured for functions to acquire from a first accumulation buffer 101 a set of pictures with a standard resolution as necessary for a process for a prescribed encoding, and from the first predictive picture buffer 406 a set of predictive pictures or predictive blocks stored therein, and implement a process for a prescribed prediction on acquired pictures and predictive pictures, to create data on differences, to supply to the first encoder element 403. The process for prediction at the first predictor 402 may well be a process of having a respective one of pictures acquired with the standard resolution, as an encoding target picture, and subtracting acquired predictive pictures or predictive blocks from the target picture, creating data on differences in between, to supply to the first encoder element 403.

The first encoder element 403 is configured for functions to acquire from the first predictor 402 data on differences after the process for prediction, and implement thereon the process for the prescribed encoding, to create a first sequence of encoded bits with the standard resolution, to supply to the first decoder element 404 and to a multiplexer 109. The first encoder element 403 may be configured to supply a first sequence of encoded bits to the first decoder element 404, as illustrated in Part (a) of FIG. 11, or may be configured to create data after quantization in a course of the process for the prescribed encoding, to supply to the first decoder element 404, as illustrated in Part (b) of FIG. 11. The first encoder element 403 is configured for a function to vary the code rate of a first sequence of encoded bits being created in the process for encoding, in accordance with control information from the code rate controller 423.

Figure 11:
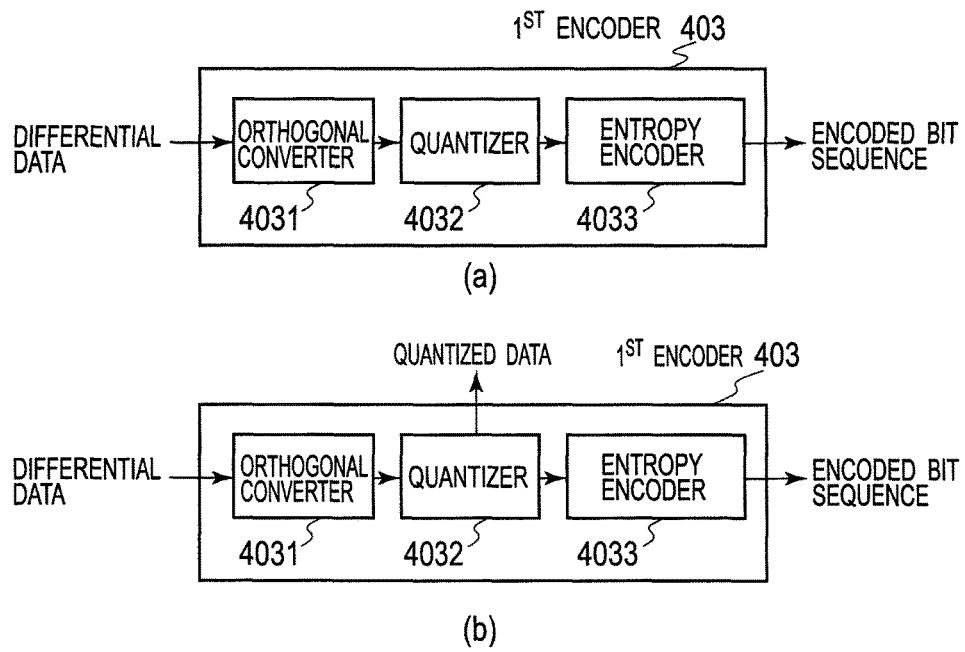
FIG. 11 is a block diagram showing an example of configuration of a first encoder 403 in the third embodiment.
Figure 12:
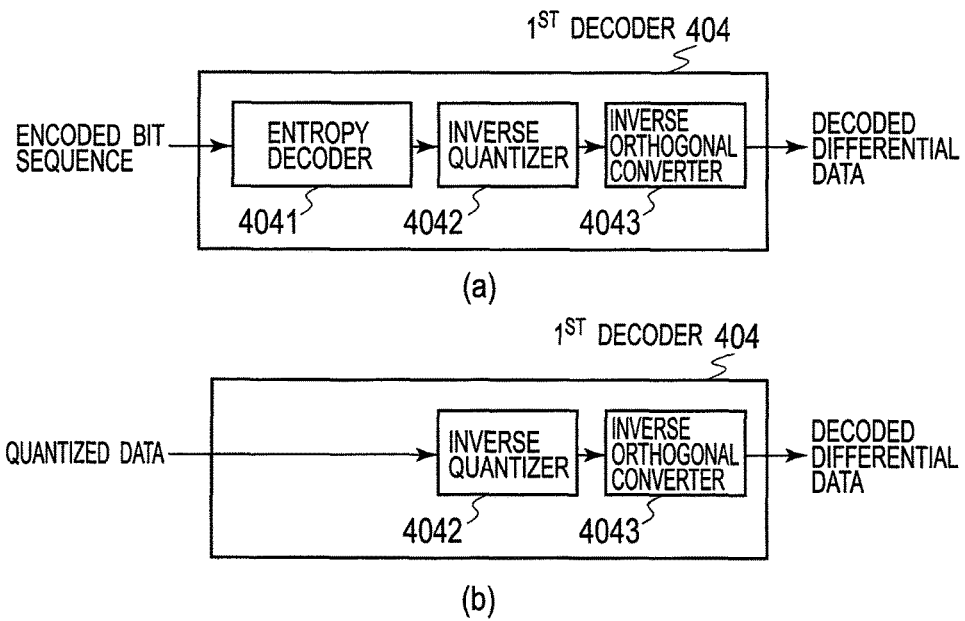
FIG. 12 is a block diagram showing an example of configuration of a first decoder 404 in the third embodiment.

The first decoder element 404 is configured for functions to work in accordance with the type of output at the first encoder element 403 illustrated in Part (a) or (b) of FIG. 11, to acquire a first sequence of encoded bits from the first encoder element 403 as illustrated in Part (a) FIG. 12 or acquire post-quantization data from the first encoder element 403 as illustrated in Part (b) FIG. 12, and implement a process for a prescribed decoding on the first sequence of encoded bits or the post-quantization data, to create decoded data on differences, to supply to the adder 410.

The intra-predictor 405 is configured for functions to acquire data on decoded pictures as necessary for a process for a prescribed intra-prediction, and implement thereon the process for the prescribed intra-prediction, to create intra-predictive data, to supply to the first predictive picture buffer 406. For creation of intra-predictive data, the intra-predictor 405 may well implement the process for the prescribed intra-prediction on blocks as decoded about a block constituting a target of prediction to create a set of intra-predictive blocks.

The first predictive picture buffer 406 is configured for functions to acquire intra-predictive data from the intra-predictor 405 and motion compensation predictive data from the motion compensator 409, to accumulate as predictive pictures or predictive blocks, and supply predictive pictures or predictive blocks to the first predictor 402 and the adder 410. The first predictive picture buffer 406 may be configured to acquire information on control for accumulation from the accumulation controller 412, and work on the accumulation control information to control acquisition, accumulation, and supply of predictive pictures or predictive blocks.

The first reference picture buffer 407 is configured for functions to acquire deblocked decoded pictures or decoded blocks from the deblocker 411 and decoded pictures or decoded blocks from the adder 410, to accumulate as reference pictures or reference blocks, and supply accumulated reference pictures or reference blocks, as necessary, to demanding ends inclusive of the intra-predictor 405, the motion estimator 408, the motion compensator 409, and the second accumulation buffer 416. The first reference picture buffer 407 may be configured to acquire information on control for accumulation from the accumulation controller 412, and work on the accumulation control information to control acquisition, accumulation, and supply of reference pictures or reference blocks.

The motion estimator 408 is configured for functions to acquire encoding target pictures from the first accumulation buffer 101 and reference pictures from the first reference picture buffer 407, and makes thereon a prescribed estimation of motions to create data on motion vectors. The motion estimator 408 is configured for a function to supply created motion vector data at least to the motion compensator 409. Preferably, there should be a configuration for motion vector data created at the motion estimator 408 to be processed for a prescribed entropy encoding at an unshown entropy encoder, to supply to the multiplexer 109.

The motion compensator 409 is configured for functions to acquire reference pictures from the first reference picture buffer 407 and motion vector data from the motion estimator 408, and make a prescribed motion compensation on acquired reference pictures and motion vector data, to create predictive pictures, to supply to the first predictive picture buffer 406.

The adder 410 is configured for functions to acquire decoded difference data from the first decoder element 404 and predictive pictures or predictive blocks from the first predictive picture buffer 406, and make an addition thereof, to create decoded pictures, to supply to the first reference picture buffer 407 and the deblocker 411.

The deblocker 411 is configured for functions to acquire decoded pictures from the adder 410, and implement thereon a process for a prescribed deblocking, to create deblocked decoded pictures, to supply to the first reference picture buffer 407.

Part (a) and Part (b) of FIG. 11 show examples of configuration of the first encoder element 403 according to the third embodiment.

In an example, the first encoder element 403 includes an orthogonal transformer 4031, a quantizer 4032, and an entropy encoder 4033.

The orthogonal transformer 4031 is configured for functions to acquire data on differences, and implement thereon a process for a prescribed orthogonal transform, to create data on orthogonal transform coefficients, to supply to the quantizer.

The quantizer 4032 is configured for functions to acquire data on orthogonal transform coefficients from the orthogonal transformer 4031, and implement thereon a process for a prescribed quantization, to create quantized data, to supply to the entropy encoder 4033. For application to a model of first decoder element 404 configured to work without making an entropy decoding on an encoded bit sequence, to acquire quantized data as a result of local decoding and implement thereon a process for a prescribed decoding, there may be use of a quantizer 4032 configured to supply quantized data to the first decoder element 404, as illustrated in Part (b) of FIG. 11.

The entropy encoder 4033 is configured for functions to acquire quantized data from the quantizer 4032, and implement thereon a process for a prescribed entropy encoding, to create a first sequence of encoded bits, to supply to the multiplexer 109. For application to a model of first decoder element 404 configured to make an entropy decoding on a first encoded bit sequence, to acquire quantized data and implement thereon a process for a prescribed decoding, there may be use of an entropy encoder 4033 configured to create a first sequence of encoded bits, to supply to the first decoder element 404, as illustrated in Part (a) of FIG. 11.

Part (a) and Part (b) of FIG. 12 show examples of configuration of the first decoder element 404 according to the third embodiment.

For adaptation to a local decoding process, the first decoder element 404 includes at least an inverse quantizer 4042, and an inverse orthogonal transformer 4043, as illustrated in Part (a) and Part (b) of FIG. 12. For configuration to acquire a first sequence of encoded bits to implement thereon a complete decoding process, it may additionally include an entropy decoder 4041, as illustrated in Part (a) of FIG. 12.

The entropy decoder 4041 is configured for functions to acquire a first sequence of encoded bits from the first encoder element 403, and implement thereon a process for a prescribed entropy decoding, to create quantized data, to supply to the inverse quantizer 4042.

The inverse quantizer 4042 is configured for functions to acquire quantized data from the entropy decoder 4041 or the quantizer 4032, and implement thereon a process for a prescribed inverse quantization, to create inverse quantized data on orthogonal transform coefficients, to supply to the inverse orthogonal transformer 4043.

The inverse orthogonal transformer 4043 is configured for functions to acquire inverse quantized data on orthogonal transform coefficients from the inverse quantizer 4042, and implement thereon a process for a prescribed inverse orthogonal transform, to create decoded data on differences, to supply to the adder 410.

Referring again to FIG. 10, according to the third embodiment, the second encoder 107 includes the third accumulation buffer 415, the second predictor 420, and the second encoder element 421.

The third accumulation buffer 415 is configured for functions to acquire from a first resolution converter 104 super-resolution enlarged and converted signals of input pictures with a standard resolution, to accumulate therein, and supply to the second predictor 420. The third accumulation buffer 415 is configured for functions to acquire from the accumulation controller 412 information on control for accumulation, and work on the accumulation control information to control acquisition, accumulation, and supply of super-resolution enlarged and converted signals of input pictures with the standard resolution.

The second predictor 420 is configured for functions to acquire from the third accumulation buffer 415 super-resolution enlarged and converted signals of input pictures with the standard resolution, from the second accumulation buffer 416 decoded pictures with the standard resolution, and from a second resolution converter 106 super-resolution enlarged and converted signals of decoded pictures with the standard resolution, and have the super-resolution enlarged and converted signals of input pictures, as encoding target pictures, the decoded pictures derived from the first encoder 102, as first reference pictures, and super-resolution enlarged and converted decoded pictures of the super-resolution enlarged and converted signals of decoded pictures with the standard resolution, as second reference pictures, to implement thereon a process for a prescribed prediction to create predictive pictures, and subtract the predictive pictures from the target pictures, to create data on differences, to supply to the second encoder element 421.

The second encoder element 421 is configured for functions to acquire data on differences from the second predictor 420, and implement thereon a process for a prescribed encoding to create the above-noted second sequence of encoded bits, to supply to the multiplexer 109, while working on control information from the code rate controller 423, to vary the code rate of the second sequence of encoded bits being created by the encoding process.

The accumulation controller 412 is configured for functions to supply information on control for accumulation to each accumulation buffer, to control among others the state of accumulation, acquisition of pictures, and timings of supply of the accumulation buffer.

The second accumulation buffer 416 is configured for functions to acquire decoded pictures with the standard resolution from the first reference picture buffer 407, and supply acquired decoded pictures to the second predictor 420 as well as to a second super-resolution enlarger 105.

The second accumulation buffer 416 is configured for functions to acquire information on control for accumulation from the accumulation controller 412, and work on the accumulation control information to control acquisition, accumulation, and supply of decoded pictures.

The second reference picture buffer 407 is configured for functions to acquire super-resolution enlarged decoded pictures from the second super-resolution enlarger 105, to accumulate therein, and supply acquired super-resolution enlarged decoded pictures to the second resolution converter 106. In doing so, the second reference picture buffer 407 acquires information on control for accumulation from the accumulation controller 412, and works on the accumulation control information to control acquisition, accumulation, and supply of super-resolution enlarged and converted signals of input pictures with the standard resolution.

The code rate controller 423 is configured for functions to monitor code rates of encoded bit sequences created at respective encoder elements, to control actions of the encoder elements to have the code rates fall within prescribed ranges, and work in accordance with among others states of the code rates and states of accumulation buffers obtained from the accumulation controller 412, to control the accumulation controller 412 to change actions of the accumulation buffers. The code rate controller 423 is configured to work when controlling actions of the encoder elements to control the code rates, to change data on parameters of quantization at the encoder elements to thereby control the code rates. There may be an example preferably configured to work on among others information on states of signal amplitudes of difference data at each encoder elements and information on reference picture selection adapted to identify which reference picture is used at each predictor, as necessary to determine whether a process for super-resolution enlargement on a decoded picture is effective or ineffective, to operate when it is ineffective, to command the accumulation controller 412 to control the second accumulation buffer 416 to stop supplying decoded pictures to the second super-resolution enlarger 105, and make a changeover to use data on parameters of quantization created as information on predictive differences based on first reference pictures, as they are different from those data on parameters of quantization which have been used while the process for super-resolution enlargement has been effective, to control the code rates.

Therefore, the moving picture encoding system according to the third embodiment is adapted to exhibit similar advantageous effects to the moving picture encoding system according to the first embodiment shown in FIG. 1, and besides configured with components such as an accumulation controller 412 and a code rate controller 423, implementing among others accumulation control at respective buffers and code rate control at a first encoder 102 and a second encoder 107, thus permitting an encoding to be executed taking into consideration among others accumulation amounts at the buffers and code rates at the first encoder 102 and the second encoder 107.

In the third embodiment described, there have been components such as an accumulation controller 412 and a code rate controller 423 incorporated in the moving picture encoding system according to the first embodiment shown in FIG. 1, to effect accumulation control at respective buffers and code rate control at a first encoder 102 and a second encoder 107, whereas there may well be an example having components such as an accumulation controller 412 and a code rate controller 423 incorporated in the moving picture encoding system according to the second embodiment shown in FIG. 7 as well as in FIG. 8 and FIG. 9, to likewise effect among others accumulation control and code rate control.

(Fourth Embodiment)

Description is now made of a moving picture encoding system according to a fourth embodiment of the present invention.

Figure 13:
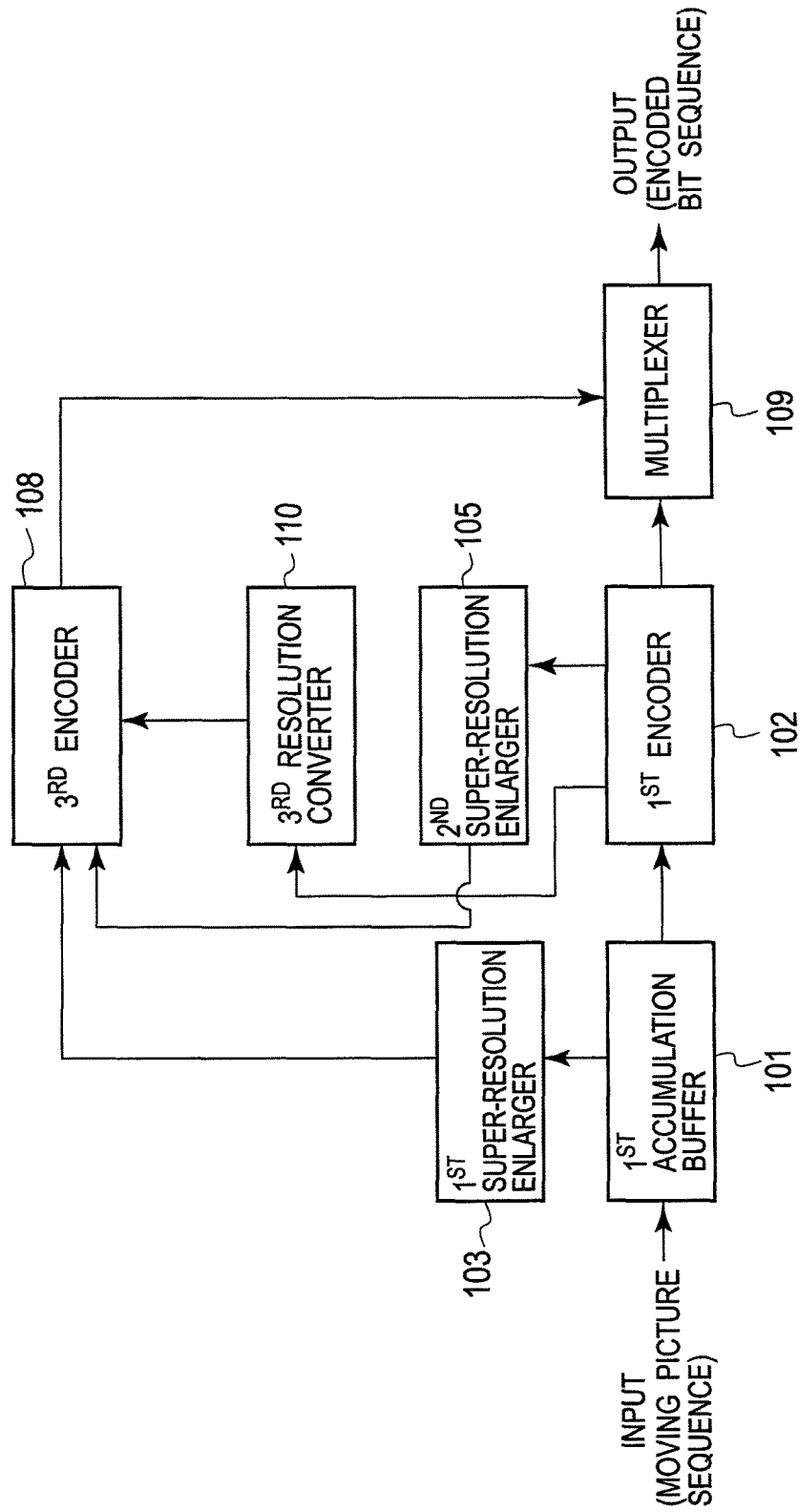
FIG. 13 is a block diagram showing an example of configuration of a moving picture encoding system according to a fourth embodiment.

FIG. 13 is a block diagram showing an example of configuration of the moving picture encoding system according to the fourth embodiment.

Referring to FIG. 13, the moving picture encoding system according to the fourth embodiment includes a first accumulation buffer 101, a first encoder 102, a first super-resolution enlarger 103, a second super-resolution enlarger 105, a third resolution converter 110, a third encoder 108, and a multiplexer 109.

The first accumulation buffer 101 is configured for equivalent functions to the embodiment shown in FIG. 1, and redundant description is omitted.

The first encoder 102 is configured for equivalent functions to the embodiment shown in FIG. 1. In the fourth embodiment, there is a set of decoded pictures created to supply to the second super-resolution enlarger 105 and the third resolution converter 110.

The first super-resolution enlarger 103 is configured for equivalent functions to the embodiment shown in FIG. 1. According to the fourth embodiment, the first super-resolution enlarger 103 is configured for functions to create super-resolution enlarged pictures with a resolution higher than a standard resolution, to supply to the third encoder 108.

The second super-resolution enlarger 105 is configured for equivalent functions to the embodiment shown in FIG. 1. According to the fourth embodiment, the second super-resolution enlarger 105 is configured for functions to create super-resolution enlarged decoded pictures with a resolution higher than the standard resolution, to supply to the third encoder 108.

The third resolution converter 110 is configured for functions to acquire decoded pictures with the standard resolution from the first encoder 102, and implement a process for a prescribed resolution conversion on acquired decoded pictures with the standard resolution to create resolution conversion enlarged decoded pictures being high resolution enlarged decoded pictures with a resolution equal to the spatial resolution of super-resolution enlarged pictures created at the first super-resolution enlarger 103 and that of super-resolution enlarged decoded pictures created at the second super-resolution enlarger 105, to supply to the third encoder 108. There may be configuration with a function to have a ratio of resolution conversion set up upon implementation of the process for the prescribed resolution conversion as preset information on a prescribed resolution conversion ratio, or as acquired information on resolution conversion ratio such as set up by an external user, and work on the basis of acquired information on resolution conversion ratio to establish a resolution conversion ratio to implement the process for the prescribed resolution conversion.

The third encoder 108 is configured for functions to acquire from the first super-resolution enlarger 103 super-resolution enlarged pictures, from the third resolution converter 110 resolution conversion enlarged decoded pictures with a high resolution, and from the second super-resolution enlarger 105 super-resolution enlarged decoded pictures with the high resolution, to have acquired super-resolution enlarged pictures as encoding target pictures, resolution conversion enlarged decoded pictures from the third resolution converter 110 as first reference pictures, and super-resolution enlarged decoded pictures from the second super-resolution enlarger 105 as second reference pictures, and implement thereon a combination of processes for prescribed prediction and encoding to create a third sequence of encoded bits, and supply the multiplexer 109 with the third sequence of encoded bits thus created.

For a reference picture to be used in a process for the prescribed prediction at the third encoder 108, there may be a configuration to employ either a first reference picture obtained from a resolution conversion enlarged decoded picture or a second reference picture obtained from a super-resolution enlarged decoded picture, to create a predictive picture, and subtract the predictive picture from a target picture, to create a data on a difference in between.

There may be a configuration involved to create a difference data from a target picture, using neither first reference picture nor second reference picture.

For control to make a selection of reference picture for each picture or for each set of a prescribed number of pictures, the third encoder 108 may be configured to create a set of data on the selection of reference picture to identify a first reference picture or a second reference picture whichever is used, and implement thereon a process for a prescribed entropy encoding using an unshown entropy encoder to create a sequence of encoded bits of data on the reference picture selection, to supply to the multiplexer 109.

There may be use of combination of target pictures each respectively divided with no spaces left into regions of a prescribed area and first and second reference pictures likewise divided with no spaces left into regions of a prescribed area, to operate for each commensurate region to identify a first reference picture or a second reference picture whichever is selective to create a predictive picture, and subtract the predictive picture from a target picture, to create a data on a difference in between. There may be operations made for each region of a prescribed area to have data for identification of which reference picture has been used, as data on reference picture selection, and implement thereon a process for a prescribed entropy encoding using an unshown entropy encoder, to create, and supply to the multiplexer 109, a resultant sequence of encoded bits of data on reference picture selection. There may well be regions of a prescribed area shaped as regions of a prescribed rectangular form, or as regions of an arbitrary form conforming to a prescribed domain division.

The third encoder 108 may be configured for combination of a set of operations to subtract a first reference picture as a predictive picture from an encoding target picture, to obtain a data on a difference in between as a first difference data, and implement thereon a process for a prescribed third encoding to create a first sequence of bits encoded by the third encoding, a set of operations to subtract a second reference picture as a predictive picture from the encoding target picture, to obtain a data on a difference in between as a second difference data, and implement thereon the process for the prescribed third encoding to create a second sequence of bits encoded by the third encoding, and a set of operations to create a data on difference simply from the encoding target picture, using neither first reference picture nor second reference picture, to use as a third difference data, and implement thereon the process for the prescribed third encoding to create a third sequence of bits encoded by the third encoding, to provide the multiplexer 109 with thus created first to third sequences of bits encoded by third encoding. There are data on methods for selection of respective types of reference pictures and data on encoding methods as described, which may be collected as data on reference picture selection modes and as data on encoding modes for the third encoding, respectively, and processed by implementing thereon a process for a prescribed entropy encoding using an unshown entropy encoder, to supply to the multiplexer 109.

The multiplexer 109 is configured for functions to acquire from the first encoder 102 a first sequence of encoded bits and from the third encoder 108 a third sequence of encoded bits, and operate complying with a prescribed syntax structure to implement a process of multiplexing the first sequence of encoded bits, the third sequence of encoded bits, and sequences of encoded bits of sets of data used in encoding processes, involving data on motion vectors, data on quantizing parameters, data on reference picture selection, and data on encoding parameters, as they are each respectively processed through an unshown entropy encoder, while inserting identification data for identification of a set of subsequent sequences of encoded bits and the like, to create a sequence of multiplexed bits to be output. The multiplexer 109 may well be configured for functions to additionally acquire data on modes of reference picture selection and data on reference picture selection as created at the third encoder 108 in the form of sequences of encoded bits encoded through an unshown entropy encoder, and implement thereon a process for a multiplexing to create a sequence of bits multiplexed as described above.

The multiplexer 109 may be configured to acquire from the first encoder 102 a first sequence of encoded bits, and from the third encoder 108 the first to the third sequence of bits encoded by the third encoding. The multiplexer 109 may then be configured to reproduce the acquired first sequence of encoded bits with the standard resolution, to create a first to a third sequence of bits encoded by a first encoding with the standard resolution. The multiplexer 109 may then be configured to operate complying with a prescribed syntax structure to implement a process of multiplexing a respective one of combination of the first sequence of bits encoded by the third encoding and the first sequence of bits encoded by the first encoding with the standard resolution, combination of the second sequence of bits encoded by the third encoding and a second sequence of bits encoded by the first encoding with the standard resolution, and combination of the third sequence of bits encoded by the third encoding and the third sequence of bits encoded by the first encoding with the standard resolution, and sequences of encoded bits of sets of data used in encoding processes, involving data on motion vectors, data on quantizing parameters, data on reference picture selection, and data on encoding parameters, as they are each respectively processed through an unshown entropy encoder, while inserting identification data for identification of a set of subsequent sequences of encoded bits and the like, to create a first to a third sequence of encoded bits as multiplexed to output. The multiplexer 109 may then be configured to operate in response to a demand such as from a data on encoding mode, to selectively create any of the first to the third sequence of encoded bits as multiplexed. The data on encoding mode then used may be formatted to include at least information to control the multiplexing.

According to the fourth embodiment, there is a moving picture encoding system configured for the foregoing functions, and adapted to work on input moving pictures, to implement a process for a prescribed super-resolution enlargement and a process for a prescribed resolution conversion, creating super-resolution enlarged and converted pictures, to make use of them allowing for a moving picture encoding based on an increased amount of information relative to an information amount of input moving pictures. In the configuration shown in FIG. 13, the first super-resolution enlarger 103 and the second super-resolution enlarger 105 have enlargement ratios applied thereto, which may well be enlargement ratios equal to each other, while they may be unequal to each other. Further, the resolution conversion ratio applied to the third resolution converter 110 may well be such a resolution conversion ratio that would provide the same resolution as the spatial resolution of super-resolution enlarged pictures created at the first super-resolution enlarger 103 and super-resolution enlarged decoded pictures created at the second super-resolution enlarger 105, while it may not be so.

Figure 14:
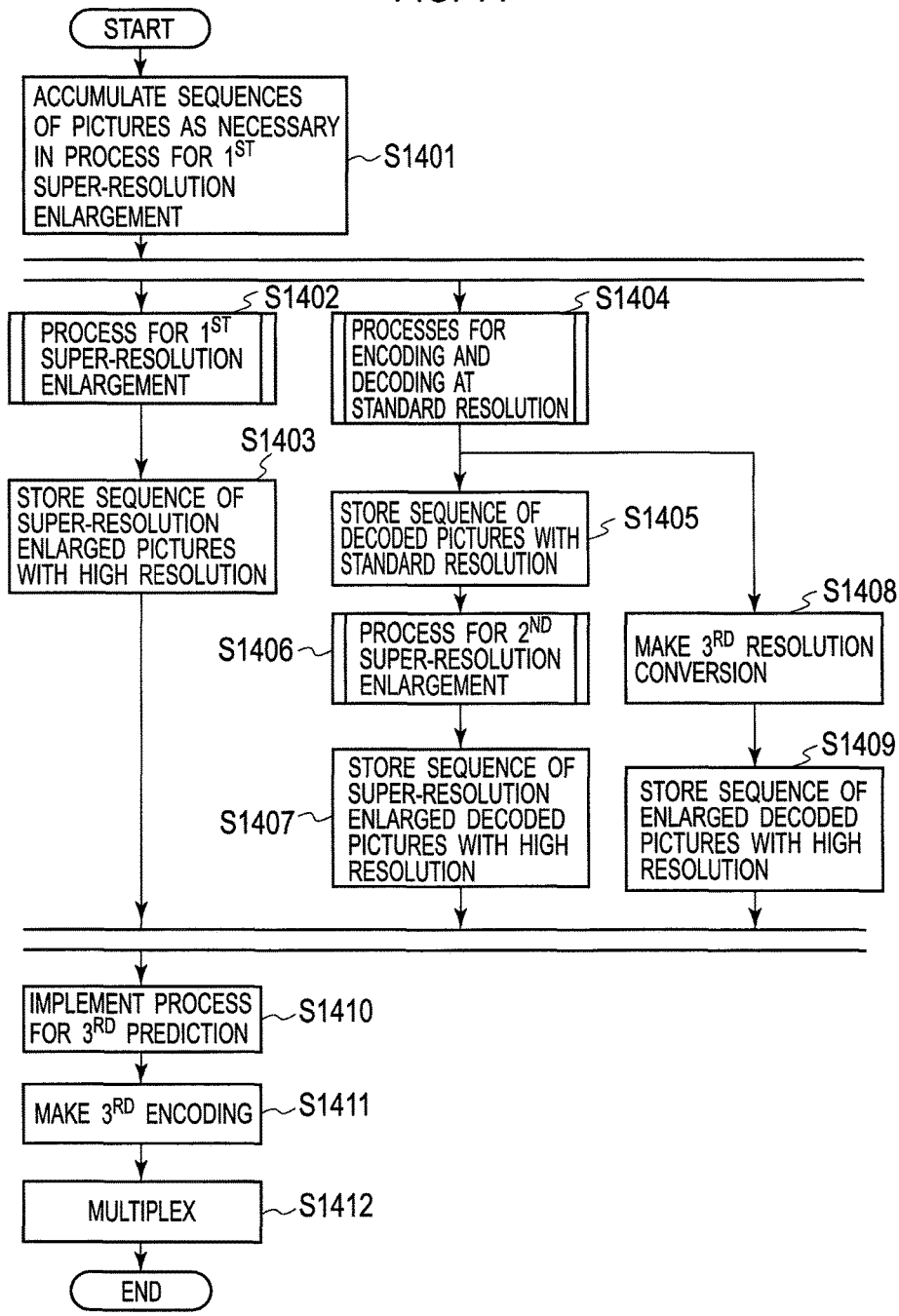
FIG. 14 is a flowchart of exemplary actions of the moving picture encoding system according to the fourth embodiment.

Description is now made of actions of the moving picture encoding system according to the fourth embodiment shown in FIG. 13, with reference to a flowchart of FIG. 14.

FIG. 14 is a flowchart showing actions of the moving picture encoding system according to the fourth embodiment.

First, in the moving picture encoding system according to the fourth embodiment, the first accumulation buffer 101 stores therein input moving pictures, as necessary in number of pictures for the first super-resolution enlarger 103 to implement a process for a first super-resolution enlargement (S1401).

The first super-resolution enlarger 103 acquires from the first accumulation buffer 101 two or more pictures, as necessary for a process for a prescribed first super-resolution enlargement, and implements thereon the process for the prescribed super-resolution enlargement (S1402), whereby it creates super-resolution enlarged pictures with a resolution higher than a standard resolution that input moving pictures have as a spatial resolution thereof, to supply to the third encoder 108.

The third encoder 108 acquires super-resolution enlarged pictures from the first super-resolution enlarger 103, storing them in a prescribed buffer for temporary accumulation (S1403).

On the other hand, the first encoder 102 acquires from the first accumulation buffer 101 a sequence of moving pictures with the standard resolution as necessary for implementation of a process for a prescribed pre-super-resolution encoding, and implements thereon a process for an encoding and a decoding at the standard resolution (S1404), whereby it creates a first sequence of encoded bits with the standard resolution as a result of the encoding process, and a set of decoded pictures with the standard resolution as a result of the decoding.

After that, the first encoder 102 works to supply the first sequence of encoded bits thus created to the multiplexer 109, and store the set of decoded pictures thus created in a prescribed buffer for temporary accumulation (S1405).

The second super-resolution enlarger 105 acquires the set of decoded pictures from the first encoder 102, and implements thereon a process for a prescribed super-resolution enlargement (S1406), whereby it creates a set of super-resolution enlarged decoded pictures with a resolution higher than the standard resolution, to supply to the third encoder 108.

After that, the third encoder 108 acquires super-resolution enlarged decoded pictures from the second super-resolution enlarger 105, storing them in a prescribed buffer for temporary accumulation (S1407).

Further, the third resolution converter 110 acquires the set of decoded pictures from the first encoder 102, and implements thereon a process for a prescribed resolution conversion (S1408), whereby it creates resolution conversion enlarged decoded pictures being high resolution enlarged decoded pictures with a resolution higher than the standard resolution, to supply to the third encoder 108.

After that, the third encoder 108 acquires resolution conversion enlarged decoded pictures with a high resolution from the third resolution converter 110, storing them in a prescribed buffer for temporary accumulation (S1409).

The combination of processes associated with steps S1402 to S1403, the combination of processes associated with steps S1404 to S1407, and the combination of processes associated with steps S1408 to S1409 may be implemented in parallel, or in series.

With the foregoing processes completed, the third encoder 108 has super-resolution enlarged pictures acquired from the first super-resolution enlarger 103 as encoding target pictures, resolution conversion enlarged decoded pictures acquired from the third resolution converter 110 as first reference pictures, and super-resolution enlarged decoded pictures acquired from the second super-resolution enlarger 105 as second reference pictures, and implements thereon a process for a prescribed third prediction (S1410), whereby it creates data on differences at the high resolution. After that, it works on the created data on differences, to implement a third encoding process that is a prescribed third encoding (S1411), whereby it creates a third sequence of encoded bits, to supply to the multiplexer 109.

Figure 15:
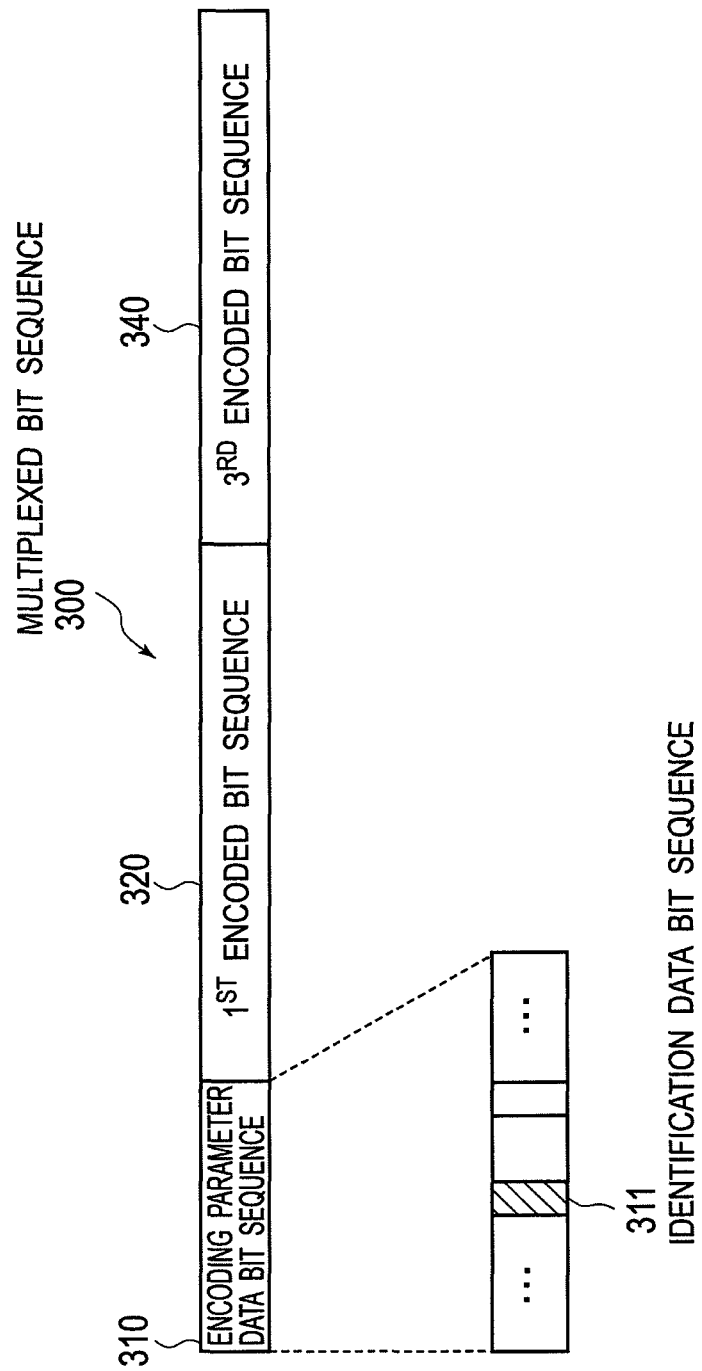
FIG. 15 is a diagram of data format illustrating an example of structure of a multiplexed bit sequence created at a multiplexer 109 in the fourth embodiment.

After that, the multiplexer 109 acquires a first sequence of encoded bits from the first encoder 102 and a third sequence of encoded bits from the third encoder 108, and works complying with a prescribed syntax structure, to implement a process of multiplexing them together with sets of data used in encoding processes, involving data on motion vectors, data on quantizing parameters, data on reference picture selection, and data on encoding parameters, as they area each respectively processed through an unshown entropy encoder, while inserting identification data for identification of a set of subsequent sequences of encoded bits and the like (S1412), to create such a sequence of multiplexed bits as illustrated in FIG. 15. The present embodiment involves a series of actions to be complete through the foregoing steps.

FIG. 15 is a diagram of data format illustrating an example of structure of a multiplexed bit sequence 300 created at the multiplexer 109 according to the fourth embodiment.

The multiplexed bit sequence 300 has multiplexed therein a bit sequence 310 of data on encoding parameters, a first sequence 320 of encoded bits from the first encoder 102, and a third sequence 340 of encoded bits from the third encoder 108.

There have been operations described as being parallel processes according to the fourth embodiment, while those processed in parallel may well be consecutively processed in a configuration operable according to the present embodiment.

According to the fourth embodiment, like the first embodiment described, the moving picture encoding system is configured with the first super-resolution enlarger 103 and the second super-resolution enlarger 105 working to implement processes for a first and a second super-resolution enlargement, affording to have a spatial resolution of input pictures as a standard resolution, permitting the process for the first super-resolution enlargement to create super-resolution enlarged pictures with a resolution higher than the standard resolution.

As a result, the process for the first super-resolution enlargement is allowed to process information on spatial and temporal frequency components that have been potentially contained in input moving pictures but unable to express to a sufficient degree by the standard resolution, to reconstruct from the input moving pictures on the basis of a prescribed super-resolution process, to describe with a resolution higher than the standard resolution. It is thus possible to extend information on frequency components that input moving pictures have, to implement thereon a process for moving picture encoding, to make a moving picture encoding based on a greater amount of information than input moving pictures have.

Further, it is possible to work on moving pictures input with the standard resolution, to implement a process for prescribed encoding and decoding to create decoded pictures with the standard resolution, and implement a process for a prescribed second super-resolution enlargement on the decoded pictures to create super-resolution enlarged decoded pictures with a resolution higher than the standard resolution with enlarged information on spatial and temporal frequency components, and to have thus created super-resolution enlarged decoded pictures as reference pictures with a high resolution, and use to implement a process for a prescribed prediction relative to super-resolution enlarged pictures, before implementing a process for a prescribed third encoding to create a third sequence of encoded bits. Like this, there can be use of super-resolution enlarged decoded pictures as reference pictures, to effect a hierarchical encoding making use of correlations of spatial resolution relative to super-resolution enlarged pictures, to make a moving picture encoding based on a greater amount of information than input moving pictures have.

That is, according to the fourth embodiment, like the first embodiment described, such information on frequency components of pictures that could have been expressed simply within a range that can be described with an inherent spatial resolution of standard resolution as input, is reconstructed making use of correlations that the pictures themselves potentially contain, so it is possible to implement a process for a prescribed super-resolution enlargement to create anew such information on frequency components that can be described simply within a range of spatial resolutions higher than the standard resolution, and reflect in super-resolution enlarged pictures, permitting differences between the super-resolution enlarged pictures being new final encoding targets thus created and information on frequency components of spatial resolution respectively contained in sequences of original moving pictures with the standard resolution, to be encoded and transmitted according to the present invention, as an essential point. Instead, even with a moving picture decoding system adapted to simply implement a process for a second super-resolution enlargement to create super-resolution enlarged decoded pictures to output to an external display system, there would have been a prescribed decoding process implemented on a first sequence of encoded bits as decoding targets with a standard resolution to create decoded pictures with the standard resolution, which should have contained not a little deterioration in the encoding, so even if the process for the second super-resolution enlargement were implemented as prescribed on the decoded pictures, the process implemented should have been for a super-resolution enlargement on decoded pictures with the standard resolution containing encoding deteriorations, and could not always have been a proper process implemented for super-resolution enlargement, while it might have had a certain effect. According to the present invention, there is a configuration adapted to implement a process for a prescribed extension encoding on super-resolution enlarged decoded pictures being not always sufficient as described, to encode and transmit their differences relative to information on frequency components contained in super-resolution enlarged pictures as inherently would be, thus allowing for more and accurate information on frequency components contained in super-resolution enlarged pictures to be supplied to a decoding system end.

Further, according to the fourth embodiment, it is possible to work upon creation of a predictive picture, to use a first reference picture from the third resolution converter 110 or a second reference picture from the second super-resolution enlarger 105, whichever is selective to implement a third encoding process that is a prescribed third encoding, permitting a hierarchical encoding to be made by utilization of a correlation of spatial resolution between a super-resolution enlarged picture and a resolution conversion enlarged decoded picture being the first reference picture or by utilization of a correlation of spatial resolution between the super-resolution enlarged picture and a super-resolution enlarged decoded picture being the second reference picture, whichever is requested, thus allowing for different multiplexed bit sequences to be created to supply to, accumulate at, and/or transmit to a decoding system end.

Further, according to the fourth embodiment, it is possible to work along creation of predictive pictures, to control selection of reference picture for each picture or for each set of a prescribed number of pictures, permitting an adaptive creation of predictive picture in accordance with the image quality of decoded picture, resulting in an enhanced encoding efficiency.

Further, according to the fourth embodiment, it is possible to provide a configuration for services to create a data of reference picture selection for identifying a first reference picture or a second reference picture whichever is used, to supply to the multiplexer 109, allowing for a facilitated identification of a reference picture used in an encoding according to the present invention.

Further, according to the fourth embodiment, it is possible to provide a target picture divided with no spaces left into regions each having a prescribed area, and combination of a first reference picture and a second reference picture likewise divided into regions each having a prescribed area, and identify the first reference picture or the second reference picture whichever is selective for a respective region to create a predictive picture, thereby permitting an adaptive creation of predictive picture in accordance with the image quality of decoded picture, resulting in an enhanced encoding efficiency.

Further, it is possible to work on moving pictures input with the standard resolution, to implement a process for prescribed encoding and decoding to create a first sequence of encoded bits, and implement a process for third encoding to create a third sequence of encoded bits with the standard resolution, and to operate complying with a prescribed syntax structure, to implement a process of multiplexing the sequences of encoded bits, together with sequences of encoded bits of sets of data used in encoding processes, involving data on motion vectors, data on quantizing parameters, data on reference picture selection, and data on encoding parameters, as they are each respectively processed through an unshown entropy encoder, while inserting identification data for identification of a set of subsequent sequences of encoded bits and the like, to create a sequence of multiplexed bits. The sequence of multiplexed bits thus created is configured as a single sequence of encoded bits including both of a result of encoding on inherent input moving pictures and a result of encoding on a set of errors in a prediction using information on frequency components as enlarged in super-resolution enlarged pictures having undergone a process for super-resolution enlargement, and is adaptive for services such as transmitting to an unshown external accumulator before recording in a prescribed recording medium, or delivering through a network using an unshown external communication system, thereby permitting a moving picture encoding system according to the present embodiment to operate on moving pictures with heavy amounts of information, allowing for efficient encoding, accumulation, and transmission.

Further, it is possible to work to acquire a first and a second sequence of bits encoded by the third encoding, identify a set of sequences of encoded bits to be multiplexed in accordance with data on encoding modes, and implement a process for a prescribed multiplexing on identified sequences of encoded bits to create a sequence of multiplexed bits, permitting a variety of encoded bit sequences to be created, affording to make a selective decoding at a decoding system end.

(Fifth Embodiment)

Figure 16:
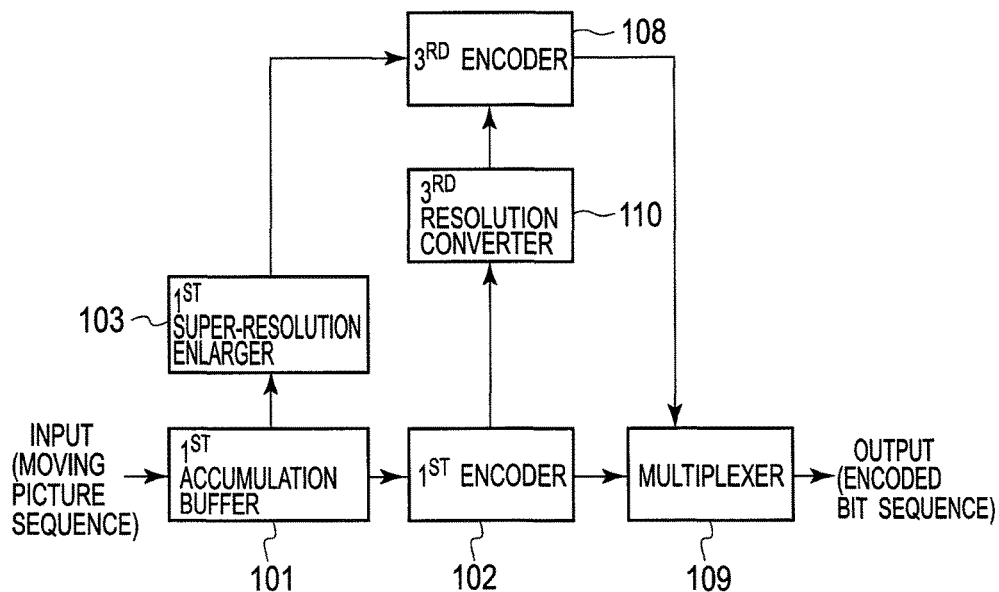
FIG. 16 is a block diagram showing an example of configuration of a moving picture encoding system according to a fifth embodiment.
Figure 17:
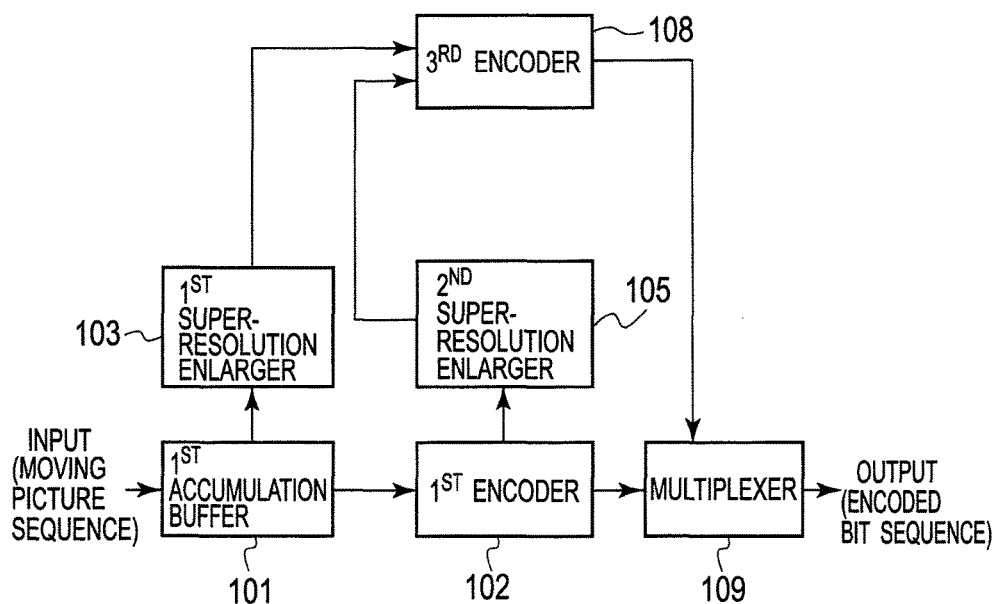
FIG. 17 is a block diagram showing another example of configuration of the moving picture encoding system according to the fifth embodiment.

In the fourth embodiment described above, there has been a third encoder 108 working as illustrated in FIG. 13 to have a pair of reference pictures input thereto, that is, combination of a first reference picture being a decoded picture from a first encoder 102 as processed for a third resolution conversion at a third resolution converter 110 to provide as a resolution conversion enlarged decoded picture, and a second reference picture being the decoded picture from the first encoder 102 as processed for a second super-resolution enlargement at a second super-resolution enlarger 105 to provide as a super-resolution enlarged decoded picture, to employ the reference pictures enabling a high efficient prediction to create a predictive picture, whereas there may well be an example adapted for instance as illustrated in FIG. 16, for operation to simply input a resolution conversion enlarged decoded picture from a third resolution converter 110, as a reference picture, or for instance as illustrated in FIG. 17, for operation to simply input a super-resolution enlarged decoded picture from a second super-resolution enlarger 105, as a reference picture, and have a super-resolution enlarged picture from a first super-resolution enlarger 103, as an encoding target picture, for use to make a combination of prediction and encoding.

(Sixth Embodiment)

Description is now made of a moving picture encoding system according to a sixth embodiment of the present invention.

Figure 18:
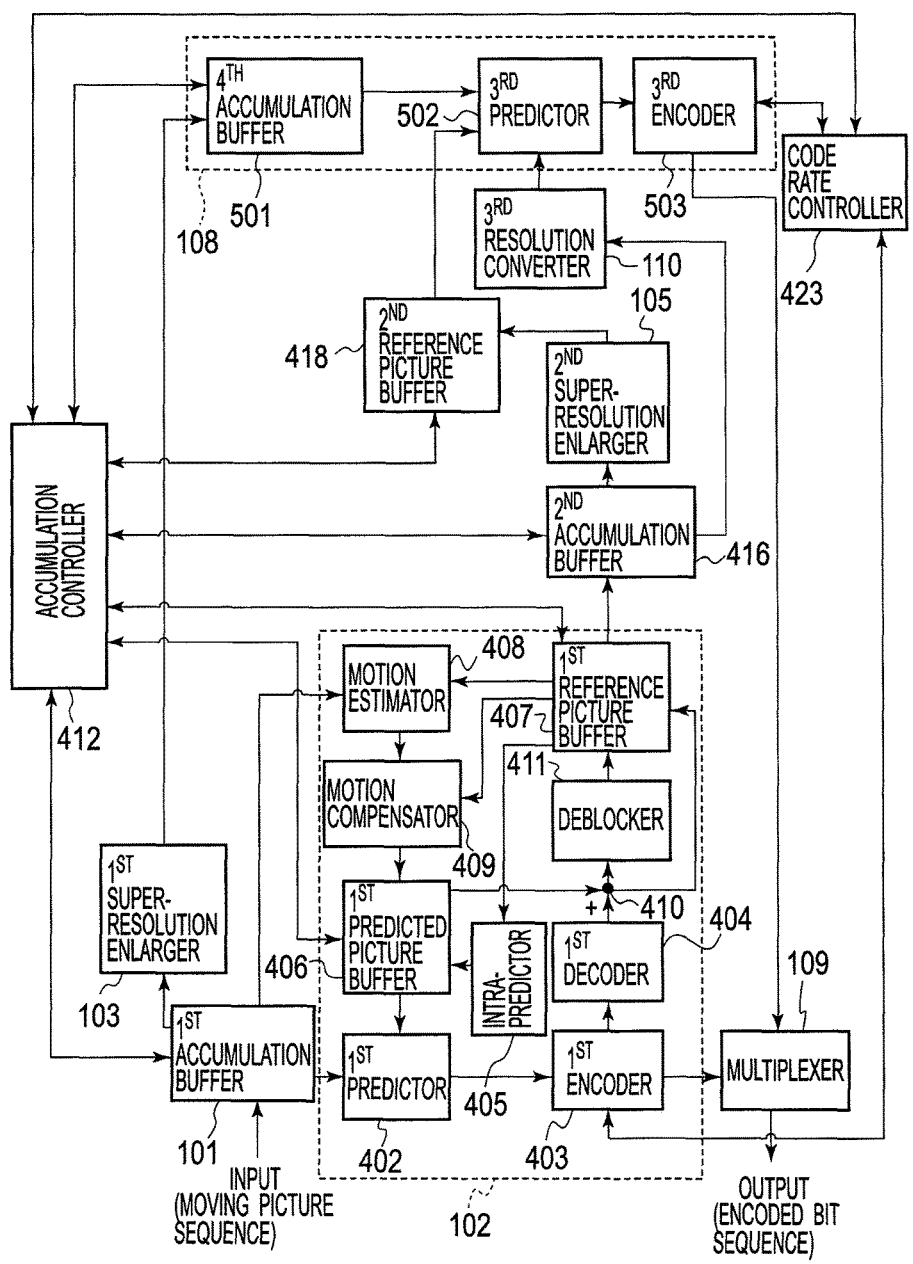
FIG. 18 is a block diagram showing an example of configuration of a moving picture encoding system according to a sixth embodiment.

FIG. 18 is a block diagram showing an example of configuration of the moving picture encoding system according to the sixth embodiment.

Referring to FIG. 18, the moving picture encoding system according to the sixth embodiment is configured as a specific example of the moving picture encoding system according to the fourth embodiment shown in FIG. 13, including an accumulation controller 412, a second accumulation buffer 416, a second reference picture buffer 418, and a code rate controller 423 added anew.

Description is now made of those component elements in FIG. 18, which have different functions or new functions relative to component elements of the fourth embodiment shown in FIG. 13.

There is a fourth accumulation buffer 501 configured for functions to acquire super-resolution enlarged pictures from a first super-resolution enlarger 103, to accumulate therein, and supply accumulated super-resolution enlarged pictures to a third predictor 502. The fourth accumulation buffer 501 may work to acquire information on control for accumulation from the accumulation controller 412, and operate on the accumulation control information to control acquisition, accumulation, and supply of super-resolution enlarged pictures.

The third predictor 502 may well be configured for functions to acquire from the fourth accumulation buffer 501 super-resolution enlarged pictures, from the second accumulation buffer 418 super-resolution enlarged decoded pictures, and from a third resolution converter 110 resolution conversion enlarged decoded pictures, and have a respective one of the super-resolution enlarged pictures thus acquired, as an encoding target picture, a respective one of the resolution conversion enlarged decoded pictures, as a first reference picture from resolution conversion enlarged decoded picture, and a respective one of the super-resolution enlarged decoded pictures, as a second reference picture from super-resolution enlarged decoded picture, to implement thereon a process for a prescribed prediction to create a predictive picture, and subtract the predictive picture from the encoding target picture, to create data on a difference in between, to supply to a third encoder element 503.

The third encoder element 503 is configured for functions to acquire difference data from the third predictor 502, and implement thereon a process for a prescribed encoding to create a third sequence of encoded bits, to supply to a multiplexer 109. The third encoder element 503 may well be configured for functions to work on control information from the code rate controller 423, to vary the code rate of the third sequence of encoded bits being created by the encoding process.

The third resolution converter 110 is configured for functions to acquire decoded pictures from the second accumulation buffer 416, and implement thereon a process for a prescribed resolution conversion, to create resolution conversion enlarged decoded pictures being enlarged decoded pictures with a high resolution, to supply to the third predictor 502. The third resolution converter 110 may be configured to implement the process for the prescribed resolution conversion to create resolution conversion enlarged decoded pictures with a high resolution equal to the spatial resolution of super-resolution enlarged pictures created at the first super-resolution enlarger 103 and that of super-resolution enlarged decoded pictures created at the second super-resolution enlarger 105.

There will be supplemental description of the accumulation controller 412, the second accumulation buffer 416, the second accumulation buffer 418, and the code rate controller 423.

The accumulation controller 412 can do with functions equivalent to those of the accumulation controller 412 in the third embodiment show in FIG. 10, and redundant description is omitted.

The second accumulation buffer 416 can do with functions equivalent to those of the second accumulation buffer 416 in the third embodiment show in FIG. 10, and redundant description is omitted.

The second accumulation buffer 418 is configured for additional functions to supply super-resolution enlarged decoded pictures acquired from the second super-resolution enlarger 105, to the third predictor 502.

Also the code rate controller 423 is configured for functions equivalent to those of the code rate controller 423 in the third embodiment show in FIG. 10.

Such being the case, the sixth embodiment shown in FIG. 18 is adapted for operations similar to those of the third embodiment show in FIG. 10, and redundant description is omitted.

The moving picture encoding system according to the sixth embodiment is adapted to exhibit similar advantageous effects to the moving picture encoding system according to the fourth embodiment shown in FIG. 1, and like the third embodiment show in FIG. 10, configured with components, such as an accumulation controller 412 and a code rate controller 423, implementing among others accumulation control at respective buffers and code rate control at a first encoder 102 and a third encoder 108, thus permitting an encoding to be executed taking into consideration among others accumulation amounts at the buffers and code rates at the first encoder 102 and the third encoder 108.

In the sixth embodiment described, there have been components such as an accumulation controller 412 and a code rate controller 423 incorporated in the moving picture encoding system according to the fourth embodiment shown in FIG. 13, to effect accumulation control at respective buffers and code rate control at a first encoder 102 and a third encoder 108, whereas there may well be an example having components such as an accumulation controller 412 and a code rate controller 423 incorporated in an example of moving picture encoding system according to the fifth embodiment shown in FIG. 16 or FIG. 17, to likewise effect among others accumulation control and code rate control.

(Seventh Embodiment)

Description is now made of a moving picture encoding system according to a seventh embodiment of the present invention.

Figure 19:
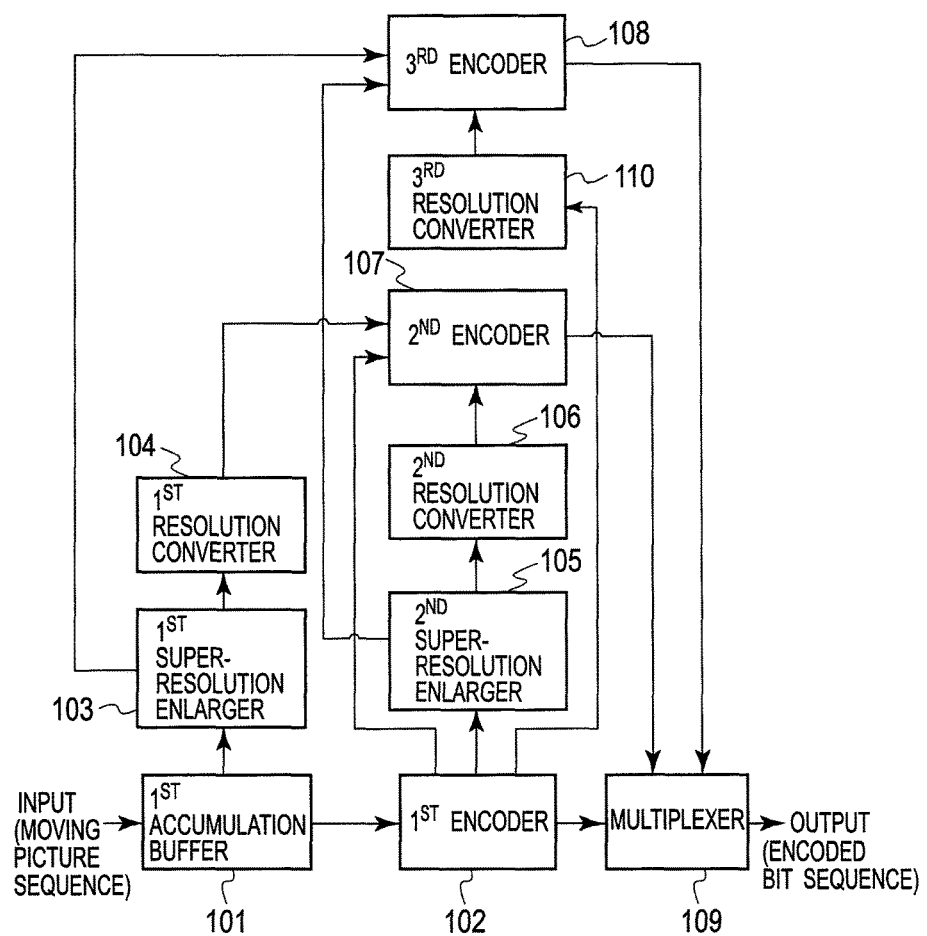
FIG. 19 is a block diagram showing an example of configuration of a moving picture encoding system according to a seventh embodiment.

FIG. 19 is a block diagram showing an example of configuration of the moving picture encoding system according to the seventh embodiment.

As shown in FIG. 19, the moving picture encoding system according to the seventh embodiment is configured as an integration of the moving picture encoding system according to the first embodiment shown in FIG. 1 and the moving picture encoding system according to the fourth embodiment shown in FIG. 13, so as for basic functions of component elements, different ones will be described, omitting redundancy.

There is a multiplexer 109 configured for functions to acquire from a first encoder 102 a first sequence of encoded bits, from a second encoder 107 a second sequence of encoded bits, and from a third encoder 108 a third sequence of encoded bits, and operate complying with a prescribed syntax structure to implement a process of multiplexing the first sequence of encoded bits, the second sequence of encoded bits, and the third sequence of encoded bits, together with sequences of encoded bits of sets of data used in encoding processes, involving data on motion vectors, data on quantizing parameters, data on reference picture selection, and data on encoding parameters, as they are each respectively processed through an unshown entropy encoder, while inserting identification data for identification of a set of subsequent sequences of encoded bits and the like, to create a sequence of multiplexed bits. The multiplexer 109 may then be configured to reproduce a first sequence of encoded bits acquired from the first encoder 102 with a standard resolution, to have a first sequence of bits encoded by a first encoding, and a second sequence of bits encoded by the first encoding, and operate complying with a prescribed syntax structure to implement a process of multiplexing the first sequence of bits encoded by the first encoding as reproduced with the standard resolution, and the second sequence of encoded bits as acquired, together with sequences of encoded bits of sets of data used in encoding processes, involving data on motion vectors, data on quantizing parameters, data on reference picture selection, and data on encoding parameters, as they are each respectively processed through an unshown entropy encoder, while inserting identification data for identification of a set of subsequent sequences of encoded bits, to create a sequence of encoded bits as multiplexed to output. The multiplexer 109 may be configured to operate complying with a prescribed syntax structure to implement a process of multiplexing the second sequence of bits encoded by the first encoding as reproduced, and the third sequence of encoded bits as acquired, together with sequences of encoded bits of sets of data used in encoding processes, involving data on motion vectors, data on quantizing parameters, data on reference picture selection, and data on encoding parameters, as they are each respectively processed through an unshown entropy encoder, while inserting identification data for identification of a set of subsequent sequences of encoded bits and the like, to create a second sequence of encoded bits as multiplexed to output.

Further, the multiplexer 109 may be configured to acquire from the second encoder 107 a first to a third sequence of bits encoded by a second encoding, and from the third encoder 108 a first to a third sequence of bits encoded by a third encoding. The multiplexer 109 may then be preferably configured for functions to reproduce a first sequence of encoded bits acquired with a standard resolution, to have a first to a sixth sequence of bits encoded by a first encoding, and operate complying with a prescribed syntax structure to implement a process of multiplexing a respective one of a combination of the first sequence of bits encoded by the second encoding and the first sequence of bits encoded by the first encoding with the standard resolution, a combination of a second sequence of bits encoded by the second encoding and a second sequence of bits encoded by the first encoding with the standard resolution, a combination of the third sequence of bits encoded by the second encoding and a third sequence of bits encoded by the first encoding with the standard resolution, a combination of the first sequence of bits encoded by the third encoding and a fourth sequence of bits encoded by the first encoding with the standard resolution, a combination of a second sequence of bits encoded by the third encoding and a fifth sequence of bits encoded by the first encoding with the standard resolution, and a combination of the third sequence of bits encoded by the third encoding and the sixth sequence of bits encoded by the first encoding with the standard resolution, and sequences of encoded bits of sets of data used in encoding processes, involving data on motion vectors, data on quantizing parameters, data on reference picture selection, and data on encoding parameters, as they are each respectively processed through an unshown entropy encoder, while inserting identification data for identification of a set of subsequent sequences of encoded bits and the like, to create a first to a sixth sequence of encoded bits as multiplexed to output as requested. The multiplexer 109 may then be configured to operate in response to a demand, to selectively create any of the first to the sixth sequence of encoded bits as multiplexed.

With functions inclusive of the foregoing, the seventh embodiment is configured to work on input moving pictures, to implement a process for a prescribed super-resolution enlargement and a process for a prescribed resolution conversion, to create among others super-resolution enlarged signals and super-resolution enlarged and converted signals of input pictures, to make use of them allowing for a moving picture encoding based on an increased amount of information relative to an information amount of input moving pictures. In the configuration shown in FIG. 19, there is combination of a first super-resolution enlarger 103 and a second super-resolution enlarger 105 that have enlargement ratios applied thereto, which may well be equal to each other, while they may be unequal to each other. Moreover, there is combination of a first resolution converter 104 and a second resolution converter 106 that have resolution conversion ratios applied thereto, which may well be such an identical resolution conversion ratio that would provide a standard resolution as a spatial resolution after the process for resolution conversion, while they may be different enlargement ratios. Further, there is a third resolution converter 110 that has a resolution conversion ratio applied thereto, which may well be such a resolution conversion ratio that would provide the same resolution as the spatial resolution of super-resolution enlarged pictures created at the first super-resolution enlarger 103 and super-resolution enlarged decoded pictures created at the second super-resolution enlarger 105, while it may be a different enlargement ratio.

Figure 20:
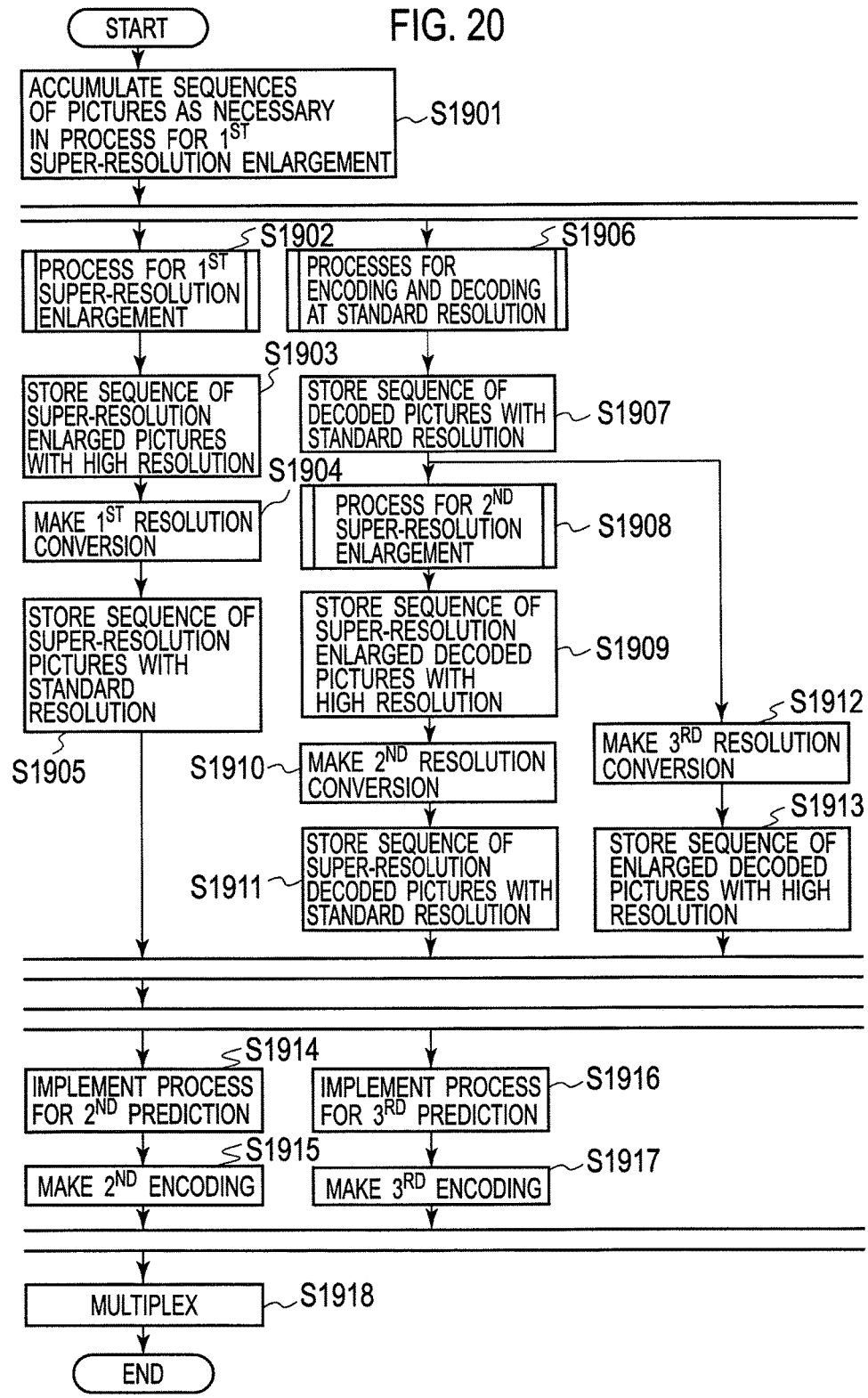
FIG. 20 is a flowchart of exemplary actions of the moving picture encoding system according to the seventh embodiment.

Description is now made of actions of the moving picture encoding system according to the seventh embodiment shown in FIG. 19, with reference to a flowchart of FIG. 20.

First, there are input moving pictures stored in a first accumulation buffer 101, as necessary in number of pictures for the first super-resolution enlarger 103 to implement a process for a first super-resolution enlargement (S1901).

The first super-resolution enlarger 103 acquires from the first accumulation buffer 101 two or more pictures, as necessary for a process for a prescribed first super-resolution enlargement, and implements thereon the process for the prescribed super-resolution enlargement (S1902), whereby it creates super-resolution enlarged pictures with a resolution higher than a standard resolution that input moving pictures have as a spatial resolution thereof, to supply to the first resolution converter 104 and the third encoder 108.

After that, the third encoder 108 acquires super-resolution enlarged pictures from the first super-resolution enlarger 103, storing them in a prescribed buffer for temporary accumulation (S1903).

After that, the first resolution converter 104 acquires super-resolution enlarged pictures from the first super-resolution enlarger 103, and implements thereon a process for a prescribed resolution conversion (S1904), whereby it creates super-resolution enlarged and converted signals of input pictures with the standard resolution, to supply thus created super-resolution enlarged and converted signals of input pictures with the standard resolution to the second encoder 107.

After that, the second encoder 107 acquires from the first resolution converter 104 super-resolution enlarged and converted signals of input pictures with the standard resolution, storing them in a prescribed buffer for temporary accumulation (S1905).

On the other hand, the first encoder 102 acquires from the first accumulation buffer 101 a sequence of moving pictures with the standard resolution as necessary for implementation of a process for a prescribed pre-super-resolution encoding, and implements thereon a process for an encoding and a decoding at the standard resolution (S1906), whereby it creates a first sequence of encoded bits with the standard resolution as a result of the encoding process, and a set of decoded pictures with the standard resolution as a result of the decoding. After that, the first encoder 102 works to supply the first sequence of encoded bits thus created to the multiplexer 109, and supply the set of decoded pictures created with the standard resolution to the second super-resolution enlarger 105, the second encoder 107, and the third resolution converter 110.

Then, the second encoder 107 acquires the set of decoded pictures from the first encoder 102, storing in a prescribed buffer for temporary accumulation (S1907).

Further, the second super-resolution enlarger 105 acquires the set of decoded pictures from the first encoder 102, and implements thereon a process for a prescribed super-resolution enlargement (S1908), whereby it creates a set of super-resolution enlarged decoded pictures with a resolution higher than the standard resolution, to supply to the second resolution converter 106 and the third encoder 108.

Then, the third encoder 108 acquires the set of super-resolution enlarged decoded pictures from the second super-resolution enlarger 105, storing in a prescribed buffer for temporary accumulation (S1909).

Further, the second resolution converter 106 acquires the set of super-resolution enlarged decoded pictures from the second super-resolution enlarger 105, and implements thereon a process for a prescribed resolution conversion (S1910), whereby it creates super-resolution enlarged and converted decoded signals with the standard resolution, to supply to the second encoder 107.

Then, the second encoder 107 acquires super-resolution enlarged and converted decoded signals with the standard resolution from the second resolution converter 106, storing them in a prescribed buffer for temporary accumulation (S1911).

Further, the third resolution converter 110 acquires the set decoded pictures from the first encoder 102, and implements thereon a process for a prescribed resolution conversion (S1912), whereby it creates a set of resolution conversion enlarged decoded pictures being enlarged decoded pictures with a high resolution, to supply to the third encoder 108.

After that, the third encoder 108 acquires the set of resolution conversion enlarged decoded pictures with the high resolution from the third resolution converter 110, storing in a prescribed buffer for temporary accumulation (S1913).

The combination of processes associated with steps S1902 to S1905, the combination of processes associated with steps S1906 to S1911, and the combination of processes associated with steps S1912 to S1913 may be implemented in parallel, or in series.

With the foregoing processes completed, the second encoder 107 has super-resolution enlarged and converted pictures of input pictures acquired from the first resolution converter 104 as encoding target pictures, decoded pictures acquired from the first encoder 102 as first reference pictures, and super-resolution enlarged and converted decoded pictures acquired from the second resolution converter 106 as second reference pictures, and works to implement thereon a process for a prescribed second prediction to create data on differences at the standard resolution (S1914), implement a second encoding process as a process for a prescribed second encoding on the difference data thus created (S1915), whereby it creates a second sequence of encoded bits, to supply to the multiplexer 109.

Further, the third encoder 108 has super-resolution enlarged pictures of input pictures acquired from the first super-resolution enlarger 103 as encoding target pictures, resolution conversion enlarged decoded pictures acquired from the third resolution converter 110 as first reference pictures, and super-resolution enlarged decoded pictures acquired from the second super-resolution enlarger 105 as second reference pictures, and works to implement thereon a process for a prescribed third prediction to create data on differences at the high resolution (S1916), and implement a third encoding process being a prescribed third encoding on the data on differences thus created to (S1917), whereby it creates a third sequence of encoded bits, to supply to the multiplexer 109. After that, it waits for completion of other parallel processes.

After that, the multiplexer 109 acquires a first sequence of encoded bits from the first encoder 102, a second sequence of encoded bits from the second encoder 107, and a third sequence of encoded bits from the third encoder 108, and works complying with a prescribed syntax structure, to implement a process of multiplexing the first sequence of encoded bits, the second sequence of encoded bits, and the third sequence of encoded bits, together with sets of data used in encoding processes, involving data on motion vectors, data on quantizing parameters, data on reference picture selection, and data on encoding parameters, as they area each respectively processed through an unshown entropy encoder, while inserting identification data for identification of a set of subsequent sequences of encoded bits and the like (S1918), to create a sequence of multiplexed bits. The present embodiment involves a series of actions to be complete through the foregoing steps.

Figure 21:
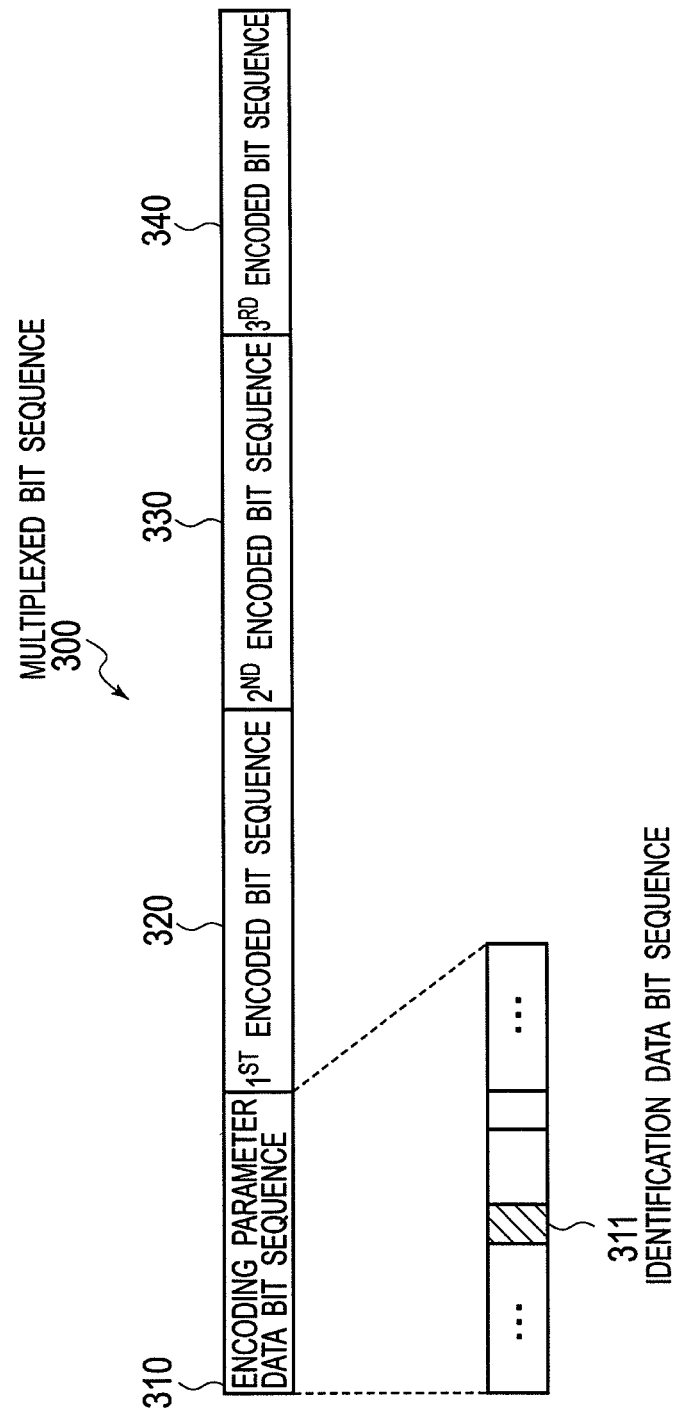
FIG. 21 is a diagram of data format illustrating an example of structure of a multiplexed bit sequence created at a multiplexer 109 in the seventh embodiment.

FIG. 21 is a diagram of data format illustrating an example of structure of a multiplexed bit sequence 300 created at the multiplexer 109 according to the seventh embodiment.

The multiplexed bit sequence 300 has multiplexed therein a bit sequence 310 of data on encoding parameters, a first sequence 320 of encoded bits from the first encoder 102, a second sequence 330 of encoded bits from the second encoder 107, and a third sequence 340 of encoded bits from the third encoder 108.

There have been operations described as being parallel processes according to the present embodiment, while those processed in parallel may well be consecutively processed in a configuration operable according to the present embodiment.

Therefore, the seventh embodiment, configured as shown in FIG. 19, affords to make simultaneous use of advantageous effects available from the first embodiment shown in FIG. 1 and those from the fourth embodiment shown in FIG. 12.

Further, according to the seventh embodiment, there is a system including a first encoder 102 configured to work on moving pictures input with a standard resolution, to implement thereon a combination of processes for prescribed encoding and decoding to create a first sequence of encoded bits with the standard resolution, a second encoder 107 configured to implement a process for a second encoding to create a second sequence of encoded bits with the standard resolution, and a third encoder 108 configured to implement a process for a third encoding to create a third sequence of encoded bits with a high resolution, the system being adapted to implement a process for a prescribed multiplexing on the first to the third sequence of encoded bits to create a sequence of multiplexed bits, as a single stream of encoded bits carrying results of encoding on inherent input moving pictures, and results of encoding on a set of errors in a prediction using information on frequency components as enlarged in among others super-resolution enlarged pictures and super-resolution enlarged and converted pictures created by a process for super-resolution enlargement combined with a process for resolution conversion, permitting their efficient accumulation or transmission, allowing for a selective decoding at a decoding system end.

Further, according to the seventh embodiment, there is a system configured with a second encoder 107 adapted to implement a process for a prescribed prediction making use of a first reference picture obtained from a decoded picture with a standard resolution or a second reference picture obtained from a set of super-resolution enlarged and converted signals of the decoded picture with the standard resolution, whichever is used as a reference picture, to create a predictive picture, and subtract the predictive picture from an encoding target picture obtained from a set of super-resolution enlarged and converted signals of an input picture with the standard resolution, to create a data on a difference in between, implementing a process for a prescribed encoding on the difference data to create a second sequence of encoded bits, in combination with a third encoder 108 adapted to implement a process for a prescribed prediction making use of a first reference picture obtained from a resolution conversion enlarged decoded picture with a high resolution or a second reference picture obtained from a super-resolution enlarged decoded picture, whichever is used as a reference picture, to create a predictive picture, and subtract this predictive picture from an encoding target picture obtained from a super-resolution enlarged picture, to create a data on a difference in between, implementing a process for a prescribed encoding on this difference data to create a third sequence of encoded bits, thereby affording to operate in accordance with a request, to perform a hierarchical encoding making use of a correlation of spatial resolution between the decoded picture and the set of super-resolution enlarged and converted signals of the input picture with the standard resolution, as well as in use of a correlation of spatial resolution between the set of super-resolution enlarged and converted decoded signals and the set of super-resolution enlarged and converted signals of the input picture with the standard resolution, and perform a hierarchical encoding making use of a correlation of spatial resolution between the super-resolution enlarged picture and the resolution conversion enlarged decoded picture, as well as in use of a correlation of spatial resolution between the super-resolution enlarged picture and the super-resolution enlarged decoded picture, thus allowing for different multiplexed bit sequences to be created to supply to, accumulate at, and/or transmit to a decoding system end.

Moreover, it is possible to provide a configuration for services to create information on reference picture selection including a data on reference picture selection for identifying a first reference picture or a second reference picture whichever is used, to supply to the multiplexer 109, allowing for a facilitated identification of a reference picture used in an encoding according to the seventh embodiment.

Further, according to the seventh embodiment, there is a system adapted to operate in accordance with a request, to implement a process for a multiplexing on a domain including a first sequence of encoded bits as derived from a first encoder 102 with a standard resolution, a first to a third sequence of bits encoded by a second encoding as derived from a second encoder 107, and a first to a third sequence of bits encoded by a third encoding as derived from a third encoder 107, to create any of first to sixth sequences of encoded bits as multiplexed, permitting creation of a variety of encoded bit sequences. Further, there is a system adaptive for services such as transmitting to an unshown external accumulator before recording in a prescribed recording medium, or delivering through a network using an unshown external communication system, thereby permitting a moving picture encoding system according to the present embodiment to operate on moving pictures with heavy amounts of information, allowing for efficient encoding, accumulation, and transmission, as well as for selective decoding at a decoding system end.

In FIG. 19, the moving picture encoding system according to the seventh embodiment is configured as an integration of the moving picture encoding system according to the first embodiment shown in FIG. 1 and the moving picture encoding system according to the fourth embodiment shown in FIG. 13, while there may well be integrations such as an integration of the moving picture encoding system according to the first embodiment shown in FIG. 1 and an example of moving picture encoding system according to the fifth embodiment shown in FIG. 16 or FIG. 17, an integration of an example of moving picture encoding system according to the second embodiment shown in FIG. 7, FIG. 8, or FIG. 9 and an example of moving picture encoding system according to the fifth embodiment shown in FIG. 16 or FIG. 17, and an integration of an example of moving picture encoding system according to the second embodiment shown in FIG. 7, FIG. 8, or FIG. 9 and the moving picture encoding system according to the fourth embodiment shown in FIG. 13.

(Eighth Embodiment)

Description is now made of a moving picture encoding system according to an eighth embodiment of the present invention.

Figure 22:
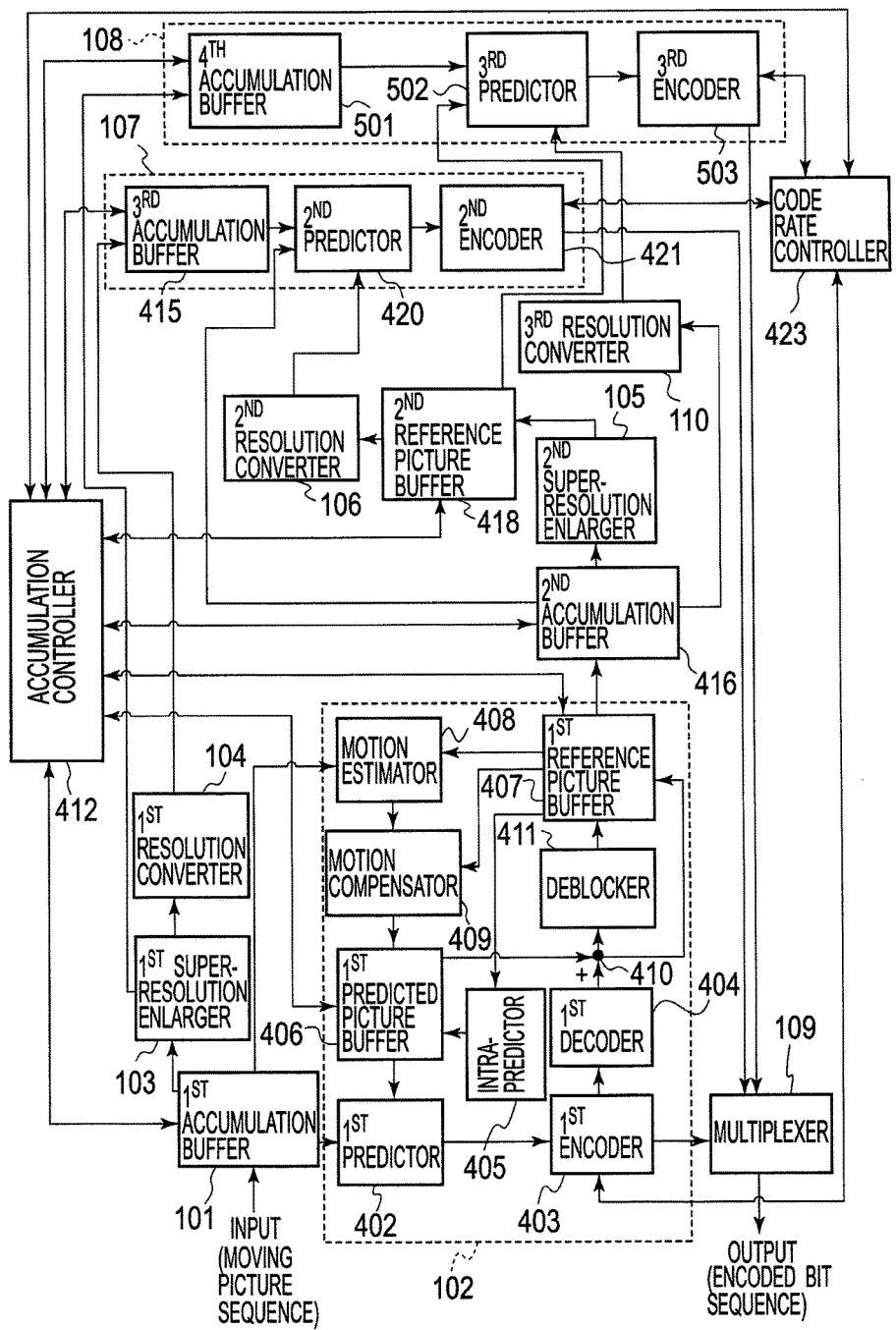
FIG. 22 is a block diagram showing an example of configuration of a moving picture encoding system according to an eighth embodiment.

FIG. 22 is a block diagram showing an example of configuration of the moving picture encoding system according to the eighth embodiment.

Referring to FIG. 22, the moving picture encoding system according to the eighth embodiment is comprised of a set of component elements equivalent to an integration of the fourth embodiment shown in FIG. 13 and the sixth embodiment shown in FIG. 18. Accordingly, the eighth embodiment is adapted for a set of operations equivalent to a combination of operations of the fourth embodiment and operations of the sixth embodiment shown, so redundant description is omitted.

The moving picture encoding system according to the eighth embodiment is adapted to exhibit similar advantageous effects to the moving picture encoding system according to the seventh embodiment shown in FIG. 19, and like the third embodiment show in FIG. 10, the sixth embodiment show in FIG. 18, or the like, configured with components, such as an accumulation controller 412 and a code rate controller 423, implementing among others accumulation control at respective buffers and code rate control at a first encoder 102 and a third encoder 108, thus permitting an encoding to be executed taking into consideration among others accumulation amounts at the buffers and code rates at the first encoder 102 and the third encoder 108.

In the first to the eighth embodiment described, there have been moving picture encoding systems depicted by block diagrams and described as hardware configurations, whereas according to the present invention being not limited thereto, there may well be moving picture encoding programs stored in CPU's and among others memories and HDD's, to attain functions of the first to the eighth embodiment by software processes, respectively. According to the present invention, there are moving picture encoding systems, moving picture encoding methods, and moving picture encoding programs having their ranges of application to such apparatuses or systems, methods, and programs as adapted for encoding moving pictures, without specific limitations. For the present invention, applications cited may involve, for instance, broadcasting equipment typified by TV, mobile telephones, teleconferences, monitors, DVD-R/RW or BD-R/RW, HDD, SD®, recording and reproducing systems using a recordable and rewritable recording medium such as a holographic memory, imaging, recording and reproducing systems such as a camcorder, recording and editing systems such as a an authoring system, and delivering systems for moving pictures.

(Ninth Embodiment)

There will be described moving picture decoding systems embodied according to the present invention, as a ninth embodiment et seq.

Figure 23:
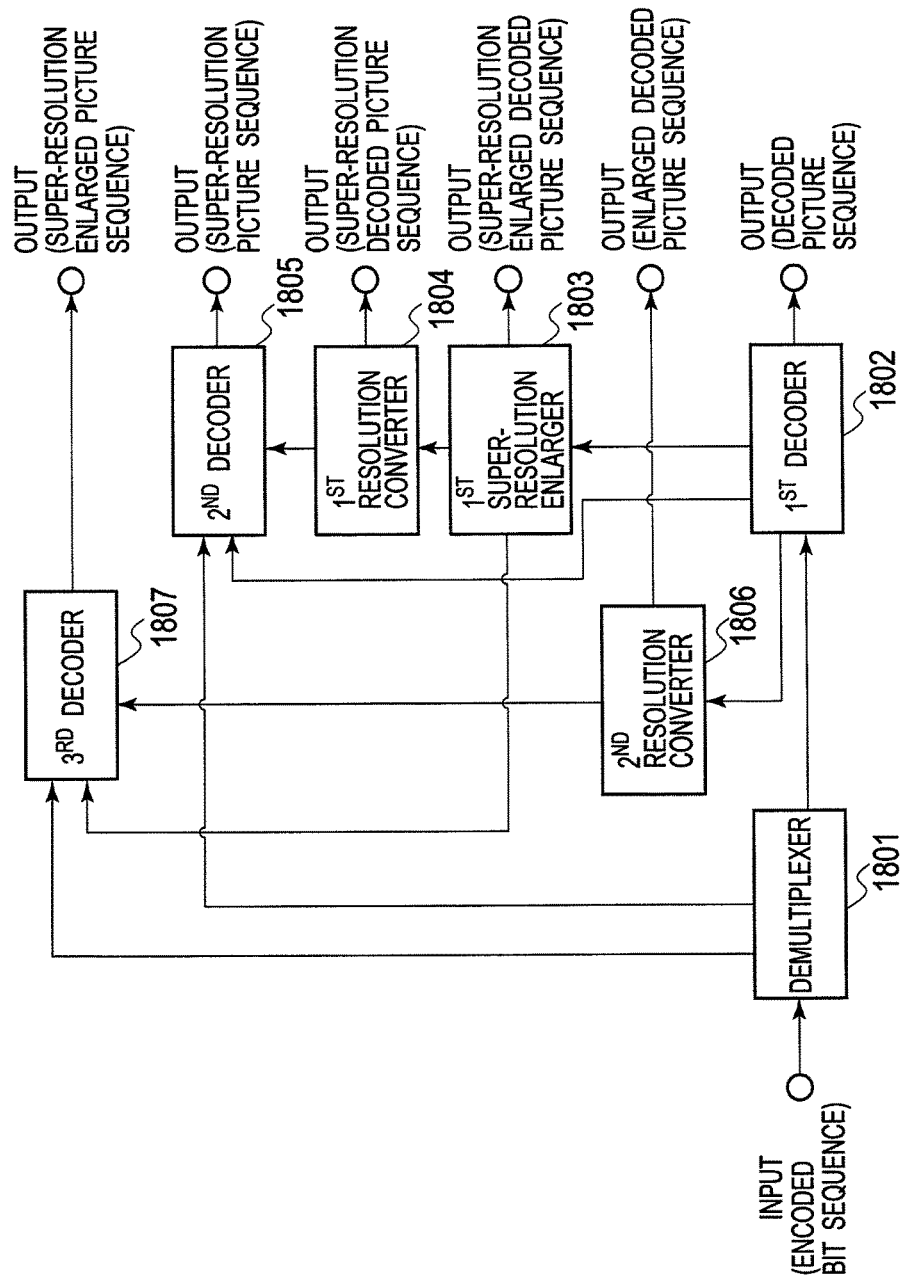
FIG. 23 is a block diagram showing an example of configuration of a moving picture decoding system according to a ninth embodiment.

FIG. 23 is a block diagram showing an example of configuration of a moving picture decoding system according to the ninth embodiment.

Referring to FIG. 23, the moving picture decoding system according to the ninth embodiment includes a demultiplexer 1801, a first decoder 1802, a first super-resolution enlarger 1803, a first resolution converter 1804, a second decoder 1805, a second resolution converter 1806, and a third decoder 1807.

The demultiplexer 1801 is configured for functions to acquire as an input a sequence of multiplexed encoded bits input thereto, and work complying with a prescribed syntax structure, to make a demultiplexing, while identifying identification data for identification of sets of data involving data on encoding modes and data on parameters of respective types as they are used in encoding processes, to acquire from the sequence of multiplexed encoded bits a first sequence of encoded bits to be decoded at the first decoder 1802, a second sequence of encoded bits to be decoded at the second decoder 1805, and a third sequence of encoded bits to be decoded at the third decoder 1807. The demultiplexer 1801 may well be configured for functions to additionally acquire, if available any from the sequence of multiplexed encoded bits, sequences of bits of data on enlargement ratios, sequences of bits of data on resolution conversion ratios, sequences of encoded bits of data on selection of reference pictures and data on selection modes of reference pictures to be used in a process for a second decoding, and sequences of encoded bits of data on selection of reference pictures and data on selection modes of reference pictures to be used in a process for a third decoding, to supply as necessary. The demultiplexer 1801 is configured for functions at least to supply the first decoder 1802 with the first sequence of encoded bits, the second decoder 1805 with the second sequence of encoded bits, and the third decoder 1807 with the third sequence of encoded bits, as they are acquired. The demultiplexer 1801 may well be configured for functions to acquire, as possible if any from the sequence of multiplexed encoded bits, sequences of encoded bits of data on motion vectors, to supply to the first decoder 1802.

The first decoder 1802 is configured for functions to acquire a first sequence of encoded bits with a standard resolution from the demultiplexer 1801, and implement thereon a process for a prescribed first decoding, to create a sequence of decoded pictures with the standard resolution. The first decoder 1802 may well be configured for functions to acquire, as possible if any through an unshown entropy decoder, a set of data on motion vectors obtained by implementation of a process for a prescribed entropy decoding, for use to implement the process for the prescribed decoding. The first decoder 1802 is configured for functions to supply the sequence of decoded pictures created with the standard resolution to the first super-resolution enlarger 1803, the second decoder 1805, and the second resolution converter 1806. The first decoder 1802 may well be configured for functions to temporarily store the sequence of decoded pictures. The first decoder 1802 may well be configured for functions to work in accordance with a request, to supply the sequence of decoded pictures created with the standard resolution to an unshown external display system, affording to provide an output for display of sequences of decoded pictures with the standard resolution.

The first super-resolution enlarger 1803 is configured for functions to acquire from the first decoder 1802 a sequence of decoded pictures with the standard resolution, for acquisition of two or more decoded pictures with the standard resolution as necessary for a process for a prescribed super-resolution enlargement, work on the sequence of decoded pictures acquired with the standard resolution to implement the process for the prescribed super-resolution enlargement, to create and output a sequence of super-resolution enlarged decoded pictures with a resolution higher than the standard resolution. For the process for the prescribed super-resolution enlargement to be given an enlargement ratio, there may well be a configuration for functions to acquire data on the enlargement ratio as it is preset as a prescribed enlargement ratio, or obtained as a data acquired at the demultiplexer 1801 and processed for a prescribed entropy decoding at an unshown entropy decoder, and work on the data on enlargement ratio thus acquired to establish an enlargement ratio, for use to implement the process for the prescribed super-resolution enlargement. The first super-resolution enlarger 1803 is configured for functions to supply the sequence of super-resolution enlarged decoded pictures thus created, to the first resolution converter 1804. The first super-resolution enlarger 1803 may well be configured for functions to work in accordance with a request, to supply the sequence of super-resolution enlarged decoded pictures created to an unshown external display system, affording to provide an output for display of sequences of super-resolution enlarged decoded pictures with the resolution higher than the standard resolution.

The first resolution converter 1804 is configured for functions to acquire from the first super-resolution enlarger 1803 a sequence of super-resolution enlarged decoded pictures, and work on the sequence of super-resolution enlarged decoded pictures as acquired, to implement a process for a prescribed resolution conversion to create, from the sequence of super-resolution enlarged decoded pictures with the resolution higher than the standard resolution, a sequence of super-resolution decoded pictures with the standard resolution, to supply to the second decoder 1805. For the process for the prescribed resolution conversion to be given a resolution conversion ratio, there may well be a configuration for functions to acquire data on the resolution conversion ratio as is it is preset as a prescribed resolution conversion ratio or, if possible, obtained as a data from the demultiplexer 1801 as it is processed for a prescribed entropy decoding at an unshown entropy decoder, and work on the data on resolution conversion ratio thus acquired to establish a resolution conversion ratio, for use to implement the process for the prescribed resolution conversion. The first resolution converter 1804 may well be configured for functions to work in accordance with a request, to supply the sequence of super-resolution decoded pictures created to an unshown external display system, affording to provide an output for display of sequences of super-resolution decoded pictures with the standard resolution.

The second decoder 1805 is configured for functions to acquire a second sequence of encoded bits with the standard resolution from the demultiplexer 1801, a sequence of decoded pictures with the standard resolution from the first decoder 1802, and a sequence of super-resolution decoded pictures with the standard resolution from the first resolution converter 1804, and work on the second sequence of encoded bits as acquired, to implement a process for a prescribed second decoding being an extension decoding at the standard resolution, to create a set of decoded difference data at the standard resolution. The second decoder 1805 may well be configured for functions to temporarily store the sequences of pictures as acquired.

The second decoder 1805 is configured for functions to have a respective decoded picture in the decoded picture sequence, as a first reference picture, and a respective super-resolution decoded picture in the super-resolution decoded picture sequence, as a second reference picture, for use to implement a process for a prescribed prediction to create predictive pictures with the standard resolution. The second decoder 1805 may be configured better with functions to acquire, if possible, data on reference picture selection and data on reference picture selection modes obtained from the demultiplexer 1801 as they are processed for a prescribed entropy decoding at an unshown entropy decoder, and work on the data on reference picture selection and the data on reference picture selection modes, to implement the process for the prescribed prediction to create predictive pictures with the standard resolution. For the process for the prescribed prediction, there may well be a configuration to follow the data on reference picture selection and the data on reference picture selection modes as acquired, to define what reference pictures were used under what encoding modes to prepare predictive pictures in creation of the second sequence of encoded bits constituting decoding targets, and work so as to make predictive pictures equivalent to those in the encoding. For instance, if it is defined from the data on reference picture selection modes that employed to implement a prediction process was an encoding mode using either a set of first reference pictures or a set of second reference pictures, then the second decoder 1805 is to select a set of reference pictures thus identified, for use to implement the process for the prescribed prediction to create predictive pictures. Or for instance, if it is defined from the data on reference picture selection modes that employed to implement a prediction process was an encoding mode using neither a set of first reference pictures nor a set of second reference pictures, then the second decoder 1805 is to implement the process for the prescribed prediction to create predictive pictures, using neither of the sets of reference pictures. Or for instance, if it is defined from the data on reference picture selection modes that employed to implement a prediction process was an encoding mode comprised of controlling selection of reference picture for each picture or for each set of a prescribed number of pictures, then the second decoder 1805 is to make use of the data on reference picture selection, to identify a first reference picture or a second reference picture, whichever is selective in order, to use reference pictures thus identified to implement the process for the prescribed prediction to create predictive pictures. Or for instance, if it is defined from the data on reference picture selection modes that employed to implement a prediction process was an encoding mode comprised of having a respective target picture divided with no spaces left into regions of a prescribed area and also a first reference picture and a second reference picture each likewise divided with no spaces left into regions of a prescribed area, and making a control for each combination of corresponding regions to select the first or the second reference picture for use, then the second decoder 1805 is to make use of the data on reference picture selection, to identify for each combination of corresponding regions a first reference picture or a second reference picture, whichever is selective in order, to use reference pictures thus identified to implement the process for the prescribed prediction to create predictive pictures.

The second decoder 1805 is configured for functions to add decoded difference data created at the standard resolution to predictive pictures with the standard resolution, to create a sequence of super-resolution pictures as decoded with the standard resolution. The second decoder 1805 may well be configured to work in accordance with a request, to supply the created sequence of super-resolution pictures as decoded with the standard resolution to an unshown external display system, affording to provide an output for display of sequences of super-resolution pictures with the standard resolution.

The second resolution converter 1806 is configured for functions to acquire from the first decoder 1802 a sequence of decoded pictures with the standard resolution, and work on the sequence of decoded pictures acquired with the standard resolution, to implement a process for a prescribed resolution conversion, to create a sequence of enlarged decoded pictures with a high resolution having the same resolution as the spatial resolution of the sequence of super-resolution enlarged decoded pictures created at the first super-resolution enlarger 1803, to supply to the third decoder 1807. For the process for the prescribed resolution conversion to be given resolution a conversion ratio, there may well be a configuration for functions to acquire data on the resolution conversion ratio as it is preset as a prescribed resolution conversion ratio or, if possible, obtained as a data from the demultiplexer 1801 as it is processed for a prescribed entropy decoding at an unshown entropy decoder, and work on the data on the resolution conversion ratio thus acquired to establish a resolution conversion ratio, for use to implement the process for the prescribed resolution conversion. The second resolution converter 1806 may well be configured for functions to work in accordance with a request, to supply the sequence of super-resolution decoded pictures created to an unshown external display system, affording to provide an output for display of sequences of super-resolution decoded pictures with the standard resolution.

The third decoder 1807 is configured for functions to acquire a third sequence of encoded bits with the high resolution from the demultiplexer 1801, a sequence of enlarged decoded pictures with the high resolution from the second resolution converter 1806, and a sequence of super-resolution enlarged decoded pictures with the high resolution from the first super-resolution enlarger 1803, and work on the third sequence of encoded bits as acquired, to implement a process for a prescribed third decoding being an extension decoding at the high resolution, to create a set of decoded difference data at the high resolution. The third decoder 1807 may well be configured for functions to temporarily store the sequences of pictures as acquired.

The third decoder 1807 is configured for functions to have a respective enlarged decoded picture in the enlarged decoded picture sequence, as a first reference picture, and a respective super-resolution enlarged decoded picture in the super-resolution enlarged decoded picture sequence, as a second reference picture, for use to implement a process for a prescribed prediction to create predictive pictures with the high resolution. The third decoder 1807 may be configured better with functions to acquire, if possible, data on reference picture selection and data on reference picture selection modes obtained from the demultiplexer 1801 as they are processed for a prescribed entropy decoding at an unshown entropy decoder, and work on the data on reference picture selection and the data on reference picture selection modes, to implement the process for the prescribed prediction to create predictive pictures with the high resolution. For the process for the prescribed prediction, there may well be a configuration to follow the data on reference picture selection and the data on reference picture selection modes as acquired, to define what reference pictures were used under what encoding modes to prepare predictive pictures in creation of the third sequence of encoded bits constituting decoding targets, and work so as to make predictive pictures equivalent to those in the encoding. For instance, if it is defined from the data on reference picture selection modes that employed to implement a prediction process was an encoding mode using either a set of first reference pictures or a set of second reference pictures, then the third decoder 1807 is to select a set of reference pictures thus identified, for use to implement the process for the prescribed prediction to create predictive pictures. Or for instance, if it is defined from the data on reference picture selection modes that employed to implement a prediction process was an encoding mode using neither a set of first reference pictures nor a set of second reference pictures, then the third decoder 1807 is to implement the process for the prescribed prediction to create predictive pictures, using neither of the sets of reference pictures. Or for instance, if it is defined from the data on reference picture selection modes that employed to implement a prediction process was an encoding mode comprised of controlling selection of reference picture for each picture or for each set of a prescribed number of pictures, then the third decoder 1807 is to make use of the data on reference picture selection, to identify a first reference picture or a second reference picture, whichever is selective in order, to use reference pictures thus identified to implement the process for the prescribed prediction to create predictive pictures. Or for instance, if it is defined from the data on reference picture selection modes that employed to implement a prediction process was an encoding mode comprised of having a respective target picture divided with no spaces left into regions of a prescribed area and also a first reference picture and a second reference picture each likewise divided with no spaces left into regions of a prescribed area, and making a control for each combination of corresponding regions to select the first or the second reference picture for use, then the third decoder 1807 is to make use of the data on reference picture selection, to identify for each combination of corresponding regions a first reference picture or a second reference picture, whichever is selective in order, to use reference pictures thus identified to implement the process for the prescribed prediction to create predictive pictures.

The third decoder 1807 is configured for functions to add decoded difference data created at the high resolution to predictive pictures with the high resolution, to create a sequence of super-resolution enlarged pictures as decoded with the high resolution. The third decoder 1807 may well be configured to work in accordance with a request, to supply the created sequence of super-resolution enlarged pictures as decoded with the high resolution to an unshown external display system for instance, affording to provide an output for display of sequences of super-resolution enlarged pictures with the high resolution.

The moving picture decoding system configured as described is adapted to input multiplexed sequences of encoded bits created at a moving picture encoding system according to any of the first to the eighth embodiment or the like, and decode in reverse to the encoding, affording to acquire decoded picture sequences with more diverse spatial resolutions or frequency components and higher qualities than ever, such as decoded picture sequences with standard resolution, enlarged decoded picture sequences, super-resolution enlarged decoded picture sequences, super-resolution decoded picture sequences, super-resolution picture sequences as decoded, and super-resolution enlarged picture sequences as decoded. It also is possible to provide a configuration adapted to operate in accordance with a request for a selective output of such diverse decoded picture sequences to an unshown display system. For instance, for users of those display devices non-adaptive to high resolution display, such as mobile terminal display devices, it is possible to request selective one of a decoded picture sequence with standard resolution, a super-resolution decoded picture sequence with standard resolution, and a super-resolution picture sequence as decoded with standard resolution, as an output to view and listen. Or for instance, for users of those display devices adaptive to high resolution display, such as high-definition televisions, it is possible to request selective one of an enlarged decoded picture sequence with high resolution, a super-resolution enlarged decoded picture sequence with high resolution, and a super-resolution enlarged picture sequence as decoded, as an output to view and listen.

Figure 24:
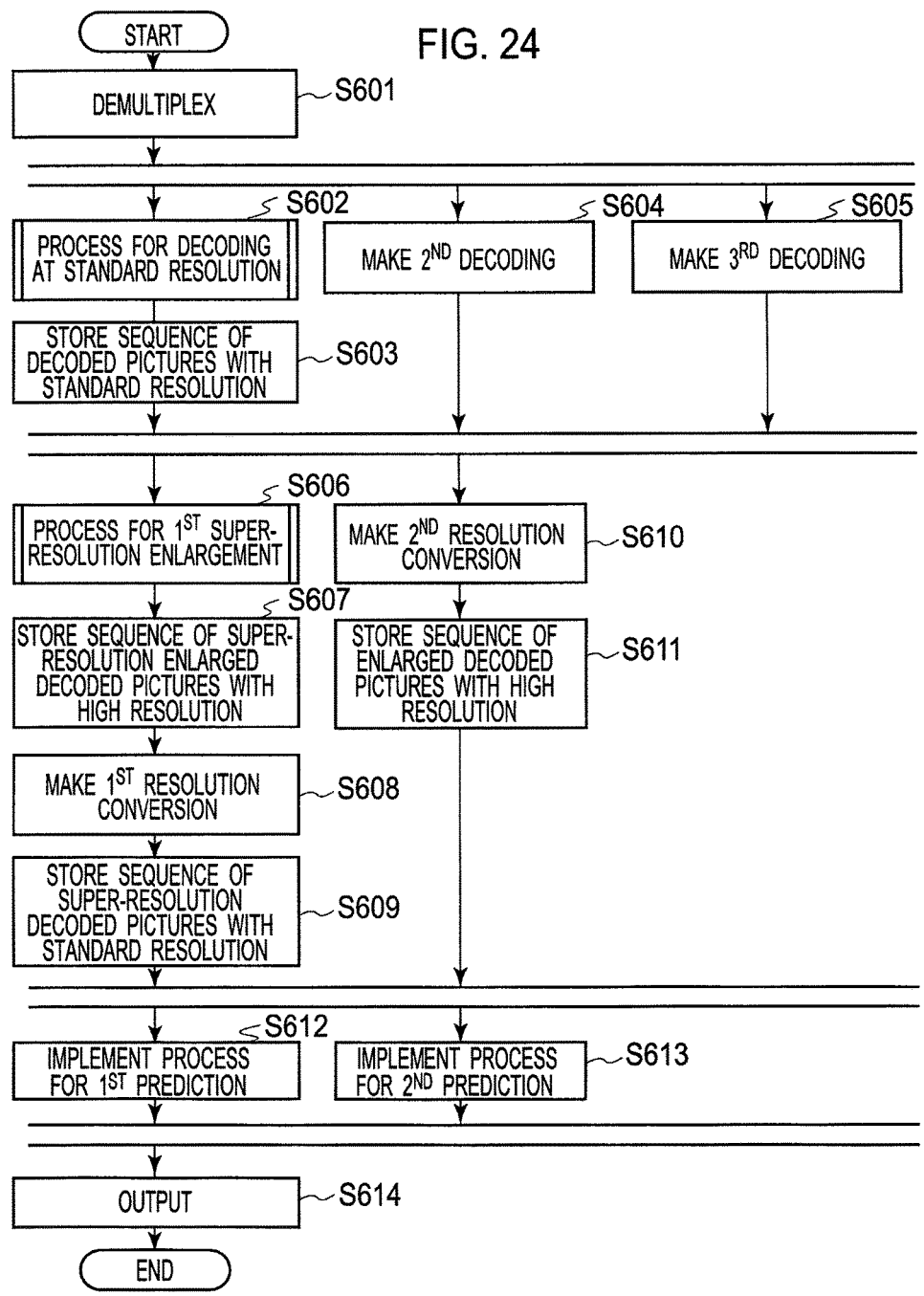
FIG. 24 is a flowchart of exemplary actions of the moving picture decoding system according to the ninth embodiment.

Description is now made of actions of the moving picture decoding system according to the ninth embodiment shown in FIG. 23, with reference to a flowchart of FIG. 24.

First, the demultiplexer 1801 acquires a sequence of multiplexed bits input thereto, and works thereon complying with a prescribed syntax structure, to make a demultiplexing (step S601) while identifying identification data for identification of among others data on encoding modes and data on parameters of respective types used in encoding processes, to acquire a first sequence of encoded bits with the standard resolution, a second sequence of encoded bits with the standard resolution, and a third sequence of encoded bits with the high resolution, and supply the first sequence of encoded bits to the first decoder 1802, the second sequence of encoded bits to the second decoder 1805, and the third sequence of encoded bits to third decoder 1807. Further, the demultiplexer 1801 acquires data on motion vectors if available from the sequence of multiplexed bits, and supplies to the first decoder 1802.

After that, the flow branches into a first parallel process (steps S602 and S603), a second parallel process (step S604), and a third parallel process (step S605), to enter parallel actions.

In the first parallel process, first, the first decoder 1802 acquires from the demultiplexer 1801 the first sequence of encoded bits and, if available, data on motion vectors, and implements thereon a process for a first decoding at the standard resolution (step S602), to create a sequence of decoded pictures with the standard resolution, and supply to the second decoder 1805.

Then, the second decoder 1805 acquires the sequence of decoded pictures created with the standard resolution at the first decoder 1802, and stores in a prescribed buffer for temporary accumulation (step S603). After that, it waits for completion of other parallel processes.

In the second parallel process, the second decoder 1805 acquires the second sequence of encoded bits with the standard resolution from the demultiplexer 1801, and implements thereon a process for a prescribed second decoding (step S604), to create a set of decoded difference data at the standard resolution. After that, it waits for completion of other parallel processes.

In the third parallel process, the third decoder 1807 acquires the third sequence of encoded bits with the high resolution from the demultiplexer 1801, and implements thereon a process for a prescribed third decoding (step S605), to create a set of decoded difference data at the high resolution. After that, it waits for completion of other parallel processes.

With the first to the third parallel process completed, the flow branches into a fourth parallel process (steps S606, S607, S608, and S609), and a fifth parallel process (steps S610 and S611), to enter parallel actions.

In the fourth parallel process, the first super-resolution enlarger 1803 acquires the sequence of decoded pictures with the standard resolution from the first decoder 1802, and implements thereon a process for a prescribed super-resolution enlargement (step S606), to create a sequence of super-resolution enlarged decoded pictures with the high resolution being a resolution higher than the standard resolution, and supply to the first resolution converter 1804 and the third decoder 1807.

Then, the third decoder 1807 acquires the sequence of super-resolution enlarged decoded pictures created with the high resolution at the first super-resolution enlarger 1803, and stores in a prescribed buffer for temporary accumulation (step S607).

Then, the first resolution converter 1804 acquires the sequence of super-resolution enlarged decoded pictures with the high resolution from the first super-resolution enlarger 1803, and implements thereon a process for a prescribed resolution conversion (step S608) to create, from the sequence of super-resolution enlarged decoded pictures with the resolution higher than the standard resolution, a sequence of super-resolution decoded pictures with the standard resolution, and supply to the second decoder 1805.

Then, the second decoder 1805 acquires the sequence of super-resolution decoded pictures created with the standard resolution at the first resolution converter 1804, and stores in a prescribed buffer for temporary accumulation (step S609). After that, it waits for completion of the other parallel process.

In the fifth parallel process, the second resolution converter 1806 acquires the sequence of decoded pictures with the standard resolution from the first decoder 1802, and implements thereon a process for a prescribed resolution conversion (step S610), to create a sequence of enlarged decoded pictures with the high resolution, and supply to the third decoder 1807.

Then, the third decoder 1807 acquires the sequence of enlarged decoded pictures created with the high resolution at the second resolution converter 1806, and stores in a prescribed buffer for temporary accumulation (step S611). After that, it waits for completion of the other parallel process.

With the foregoing parallel processes completed, the flow branches into a sixth parallel process (step S612) and a seventh parallel process (step S613), to enter parallel actions.

In the sixth parallel process, the second decoder 1805 implements a process for a prescribed prediction (step S612) to create a set of predictive pictures with the standard resolution, and makes an addition of created predictive pictures with the standard resolution and decoded difference data at the standard resolution, to create a sequence of super-resolution pictures as decoded with the standard resolution. After that, it waits for completion of the other parallel process.

In the seventh parallel process, the third decoder 1807 implements a process for a prescribed prediction (step S613) to create a set of predictive pictures with the high resolution, and makes an addition of created predictive pictures with the high resolution and decoded difference data at the high resolution, to create a sequence of super-resolution enlarged pictures as decoded with the high resolution. After that, it waits for completion of the other parallel process.

With the parallel processes completed, there is a set of sequences of decoded pictures created with described resolutions at the first decoder 1802, the first super-resolution enlarger 1803, the first resolution converter 1804, the second decoder 1805, the second resolution converter 1806, and the third decoder 1807 each operable in response to a request for supply to an unshown external display system or the like, to provide an output for display of a variety of decoding results on demand (step S614). The present embodiment involves a series of actions to be complete through the foregoing steps.

According to the ninth embodiment, there is a moving picture decoding system operable through execution of such the steps to create sequences of decoded pictures as necessary.

It is noted that there have been operations described as being parallel processes according to the ninth embodiment, while those processed in parallel may well be consecutively processed in a configuration operable according to the present embodiment.

Figure 25:
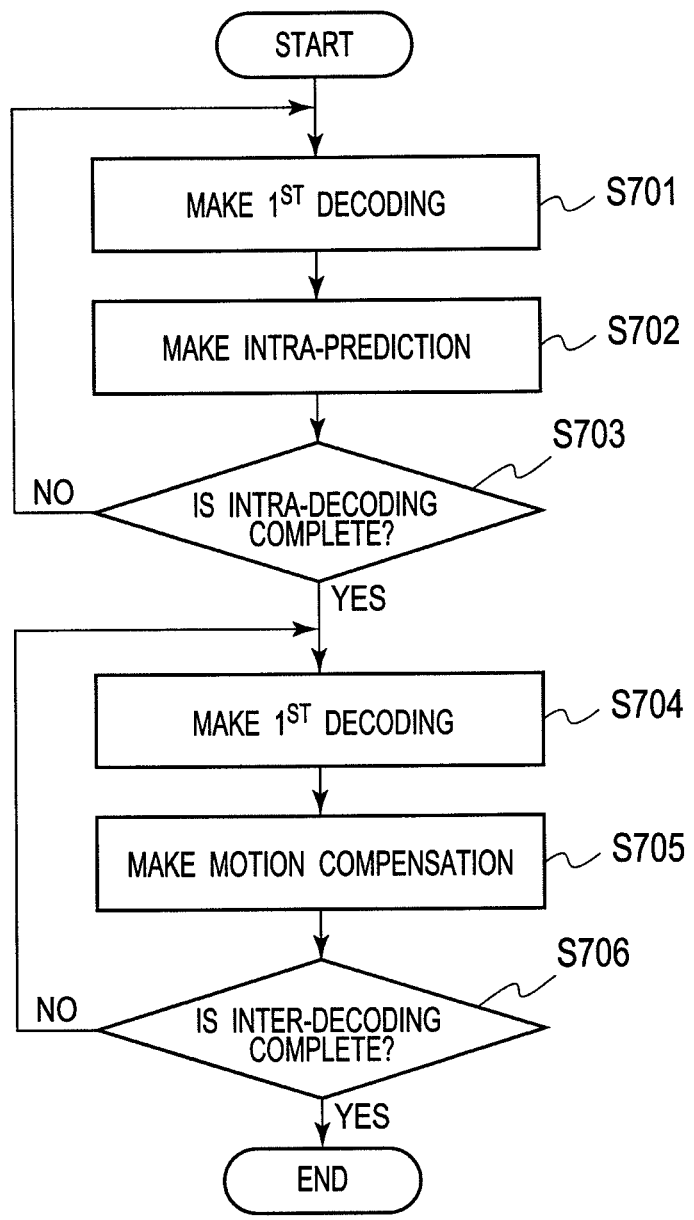
FIG. 25 is a flowchart showing an example of operational procedure of a process for a decoding at a standard resolution at a step S602 in FIG. 24.

FIG. 25 is a flowchart showing an example of operational procedure of the process for decoding at the standard resolution at the step S602 in FIG. 24.

Referring to FIG. 25, there is a process for a prescribed decoding to be implemented at the first decoder 1802 that includes an entropy decoder, an inverse quantizer, an inverse orthogonal transformer, an intra-predictor, and a motion compensator, as they are prescribed.

The first decoder 1802 first acquires a set of first sequences of encoded bits with the standard resolution from the demultiplexer 1801, and executes a first decoding for a current region of decoding target to be decoded (step S701), by use of the entropy decoder operating to implement a process for a prescribed decoding to create quantized data as decoded, the inverse quantizer operating on the quantized data to implement a process for a prescribed inverse quantization to create data on orthogonal transform coefficients as decoded, and the inverse orthogonal transformer operating on the data on orthogonal transform coefficients to implement a process for a prescribed inverse orthogonal transform to create decoded difference data.

Next, the intra-predictor operates for creation of predictive data at the current region of decoding target, by implementing a process for a prescribed prediction based on data of a decoded region neighboring the current decoding target region, to create predictive data (step S702), and makes an addition of the created predictive data and the decoded difference data of the decoding target region, to create decoded data of the decoding target region.

After that, there is a determination of whether or not the intra-decoding is complete, in combination with a determination of whether or not a decoded picture set is obtained with a set of decoded data created on whole regions in the planes (step S703).

Providing a repetition of the processes for any remaining encoded bit streams to be decoded, if any intra-decoding gets complete (YES at the step S703), then the flow goes to a step S704. If no encoded bit stream to be decoded is left, the foregoing processes for decoding come to an end.

After any intra-decoding, if this is in way to the end (NO at the step S703), there is a subsequent decoding target region identified, before the flow again goes to the step S701 for the repetition of processes.

If the intra-decoding comes to the end, then the first decoder 1802 enters a service for inter-decoding, where it makes a first decoding (step S704) to create decoded difference data, like the intra-decoding.

Further, the motion compensator operates to have a decoded picture set created as a reference picture set, acquire data on motion vectors from the demultiplexer 1801, and work on motion vector data using reference pictures to make a motion compensation (step S705) to create predictive pictures, and make an addition of created predictive pictures and decoded difference data, to create a set of decoded pictures.

After that, on bases of encoded mode data or the like, there is a determination of whether the inter-decoding has come to an end (step S706).

If there is any subsequent decoding left as an inter-decoding (NO at the step S706), the flow again goes to the step S704 to repeat processes for the inter-decoding to be repeated.

If there is no subsequent decoding left as an inter-decoding (YES at the step S706), the inter-decoding goes to the end. Here, if there comes any encoded bit sequence to be decoded by a subsequent decoding to be an intra-decoding, the flow again goes to the step S701 to repeat the foregoing processes for decoding. If there is no encoded bit sequence to be decoded, the processes for decoding go to an end.

Also in the ninth embodiment, there has been a moving picture decoding system depicted by a block diagram and described as a hardware configuration, whereas like the first to the eighth embodiment, there may well be a set of functions of the moving picture decoding system in FIG. 23 implemented as software processes using a CPU and a program.

(Tenth Embodiment)

Description is now made of an embodiment of moving picture decoding system according to a tenth embodiment.

Figure 26:
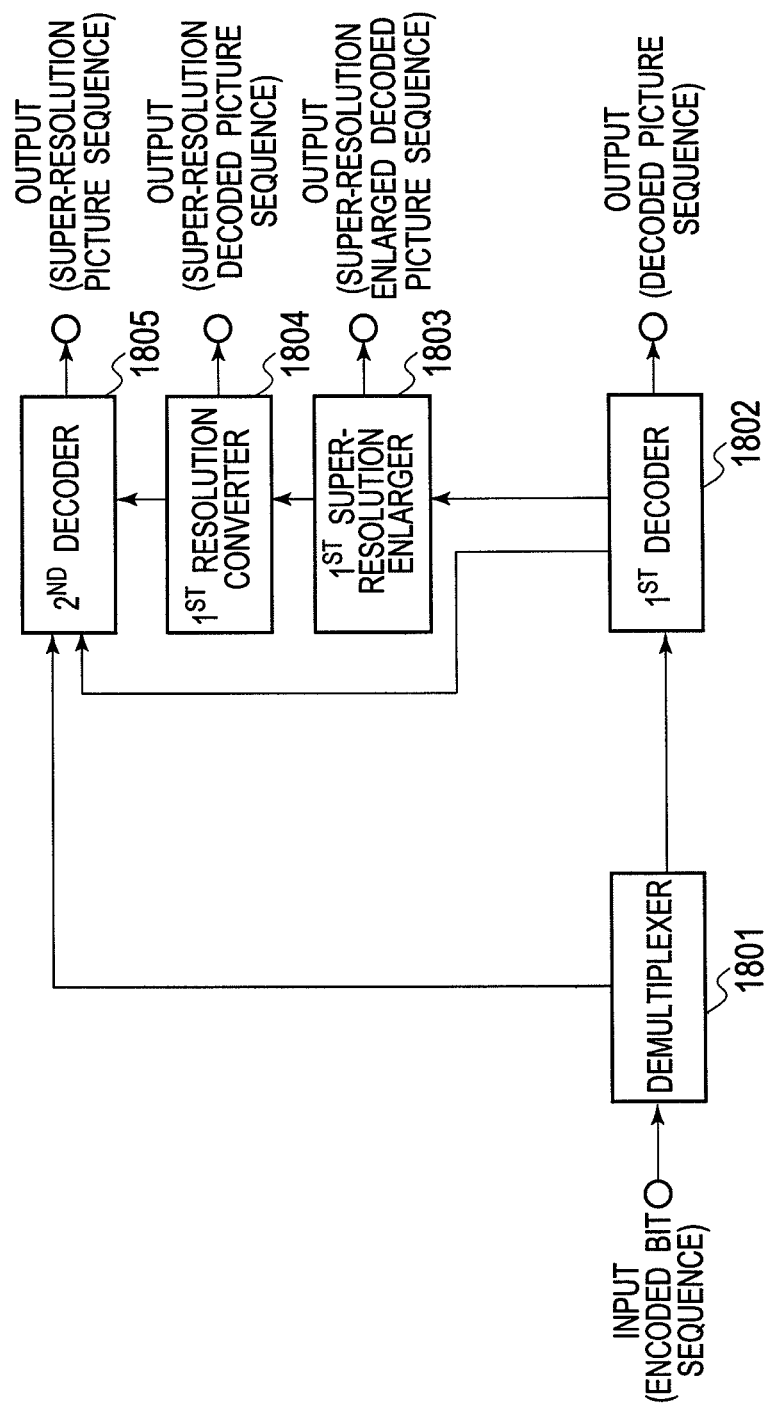
FIG. 26 is a block diagram showing an example of configuration of a moving picture decoding system according to a tenth embodiment.

FIG. 26 is a block diagram showing an example of configuration of the moving picture decoding system according to the tenth embodiment.

Referring to FIG. 26, the moving picture decoding system according to the tenth embodiment is comprised of a set of component elements of the moving picture decoding system according to the ninth embodiment shown in FIG. 23, with the second resolution converter 1806 and the third decoder 1807 being omitted or kept from working, while component elements shown in FIG. 26 are equivalent to those in FIG. 23, so redundant description is omitted.

The moving picture decoding system configured as described is adapted to acquire multiplexed sequences of encoded bits created by any of moving picture encoding systems, moving picture encoding methods, moving picture encoding programs, moving picture reencoding systems, moving picture reencoding methods, and moving picture reencoding programs corresponding to this embodiment, the moving picture decoding system according to this embodiment being adapted for correct decoding, affording to acquire decoded picture sequences with more diverse spatial resolutions or frequency components and higher qualities than ever, such as decoded picture sequences with standard resolution, super-resolution enlarged decoded picture sequences, super-resolution decoded picture sequences, and super-resolution picture sequences as decoded. It also is possible to provide a configuration adapted to operate in accordance with a request for a selective output of such diverse decoded picture sequences to an unshown display system.

Also in the tenth embodiment described, there has been a hardware configuration depicted by a block diagram, whereas like the first to the ninth embodiment, there may well be a set of functions of the moving picture decoding system in FIG. 26 implemented as software processes using a CPU and a program.

(Eleventh Embodiment)

Description is now made of a reencoding system according to an eleventh embodiment of the present invention.

Figure 27:
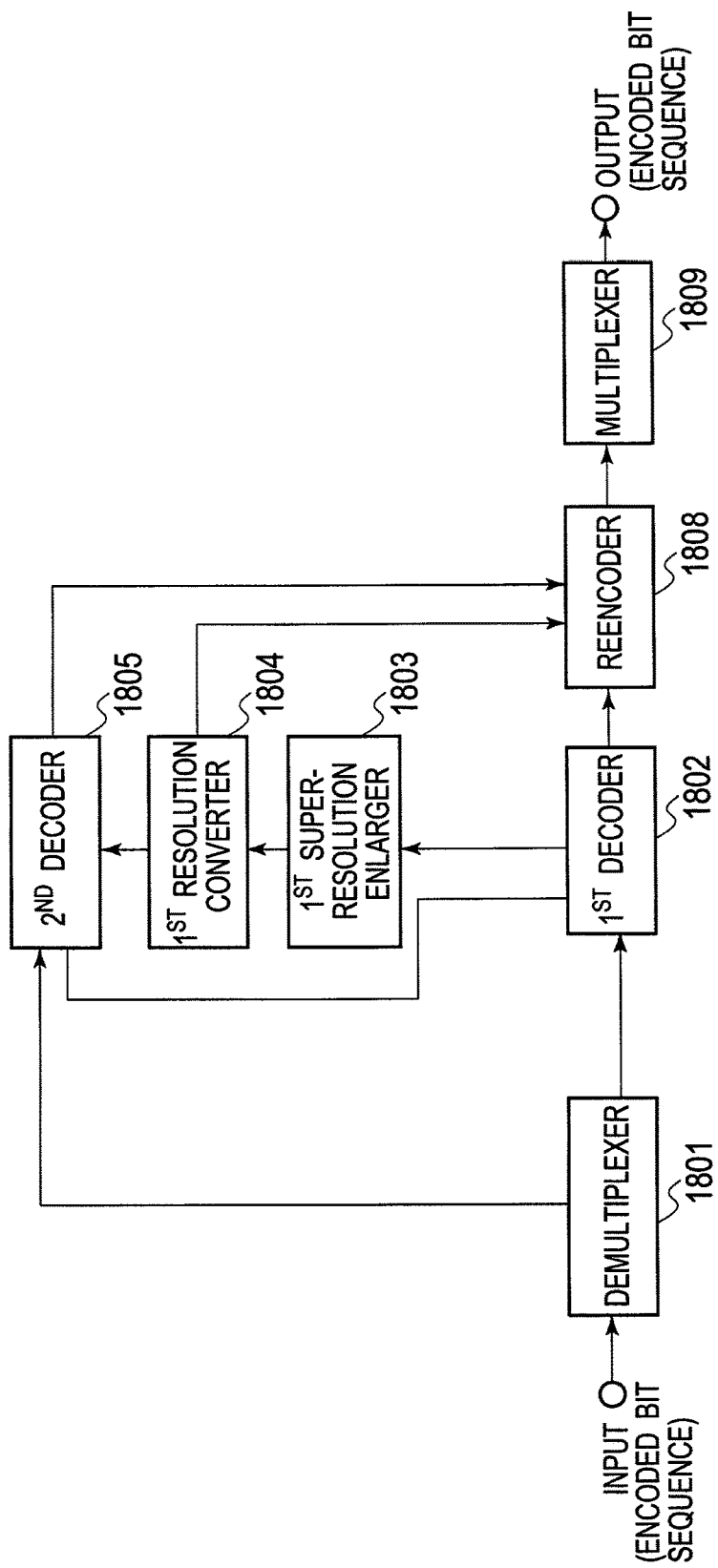
FIG. 27 is a block diagram showing an example of configuration of a moving picture reencoding system according to an eleventh embodiment.

FIG. 27 is a block diagram showing an example of configuration of the reencoding system according to the eleventh embodiment.

The reencoding system shown in FIG. 27 according to the eleventh embodiment is configured as a moving picture decoding system according to the tenth embodiment shown in FIG. 26, as combined with a reencoder 1808 and a multiplexer 1809 additionally incorporated therein, for adaptation to a process for a re-encoding as a transcoding from a certain specific encoding style to a different encoding style else.

For instance, the reencoding system shown in FIG. 27 according to the eleventh embodiment may be configured for an AVC rewriting (or AVC transcoding), that is, for adaptation to a process for a reencoding to an encoding style of AVC. It is noted that the moving picture decoding system shown in FIG. 23 according to the ninth embodiment may well be configured with a reencoder 1808 and a multiplexer 1809 additionally incorporated therein.

The eleventh embodiment includes a demultiplexer 1801 adapted to provide a second sequence of encoded bits with a standard resolution, which may well be configured for a CGS (Coarse Grain Scalability) layer complying with MPEG-4 SVC. Further, this may well be adapted, subject to an encoding with a spatial resolution equalized between a picture sequence with a standard resolution belonging to a base layer and a super-resolution picture sequence with the standard resolution belonging to an extension layer referring to the base layer, to make the encoding for creation of an encoded bit sequence complying with such a prescribed syntax structure that meets the conditions for restriction to permit a facilitated conversion from SVC to AVC, as set forth in rare literatures on AVC rewriting (as literature files on AVC rewriting: JVT-U043, http://ftp3.itu.ch/av-arch/jvt-site/2006_10_Hangzhou/JVT-U043.zip; and JVT-V035, http://ftp3.itu.ch/av-arch/jvt-site/2007_01_Marrakech/JVT-V035.zip) in the JVT (Joint Video Team) being a joint group of MPEG and ITU-T. The eleventh embodiment may well be configured for services to acquire an encoded bit sequence thus created, and create an encoded bit sequence enabling a conversion from an encoding style adapted for a handling on an extension layer configured with a CGS layer according to this invention, without such a reencoding as making a combination of complete decoding and encoding.

For encoded bit sequences non-adaptive to encoding services suitable to such the AVC rewriting, there may be a configuration to make a reencoding based on an AVC encoding style for single layers, using a super-resolution picture sequence obtained by decoding an encoded bit sequence with a standard resolution and a second encoded bit sequence with the standard resolution, as well as data on motion vectors and data on encoding modes of respective types or such obtained in the decoding of the encoded bit sequence with the standard resolution, for creation of an encoded bit sequence.

Accordingly, the reencoding system shown in FIG. 27 according to the eleventh embodiment may well have the component elements adapted for additional functions as described below.

That is, there is a first decoder 1802 further adapted for functions to work on an encoded bit sequence acquired with the standard resolution, implementing processes for prescribed entropy decoding and inverse quantization, to make a decoding to the state of data on orthogonal transform coefficients at the standard resolution on a base layer, without making a complete decoding. Further, the first decoder 1802 is adapted for functions to supply the reencoder 1808 with data on orthogonal transform coefficients in way of the decoding when the AVC rewriting is determined as being possible, or with a decoded picture sequence with the standard resolution when the reencoding is determined as being necessary. The first decoder 1802 may be adapted for functions to supply the reencoder 1808 with data on encoding modes and data on parameters of respective types obtained in the decoding.

There is a first resolution converter 1804 further adapted for functions to supply the reencoder 1808 with a super-resolution decoded picture sequence with the standard resolution when the reencoding is determined as being necessary.

There is a second decoder 1805 further adapted for functions to work on an extension encoded bit sequence acquired with the standard resolution, implementing processes for prescribed entropy decoding and inverse quantization, to make a decoding to the state of data on orthogonal transform coefficients at the standard resolution on an extension layer, without making a complete decoding, as well as for functions to supply the reencoder 1808 with data on orthogonal transform coefficients at the standard resolution on the extension layer in way of the decoding when the AVC rewriting is determined as being possible, or with a super-resolution picture sequence as decoded with the standard resolution when the reencoding is determined as being necessary.

The reencoder 1808 is adapted for functions to work when the AVC rewriting is determined as being possible, to acquire from the first decoder 1802 data on orthogonal transform coefficients in way of the decoding, and from the second decoder 1805 data on orthogonal transform coefficients at the standard resolution on the extension layer in way of the decoding, make a synthesis of respective data on orthogonal transform coefficients, and afterward implement a process for a prescribed entropy decoding, to create an encoded bit sequence as reencoded, and supply to the multiplexer 1809. The reencoder 1808 is adapted for functions to work when the reencoding is determined as being necessary, to acquire from the first decoder 1802 a decoded picture sequence with the standard resolution, from the first resolution converter 1804 a super-resolution decoded picture sequence with the standard resolution, and from the second decoder 1805 a super-resolution picture sequence as decoded with the standard resolution, as necessary, to implement a process for a prescribed encoding, to create an encoded bit sequence as reencoded, and supply to the multiplexer 1809.

The multiplexer 1809 is adapted for functions to acquire an encoded bit sequence as reencoded and supplied, and work complying with a prescribed syntax structure, to implement a process for a multiplexing, while inserting identification data for identification of sets of data used in the encoding, involving data on encoding modes and data on parameters of respective types, to create an encoded bit sequence as multiplexed to output.

The moving picture reencoding system configured as described is adapted to acquire multiplexed sequences of encoded bits created at a moving picture encoding system according to any of the first to the eighth embodiment or the like, in addition to adaptation of the moving picture reencoding system according to this invention to acquire from the first decoder 1802 data on orthogonal transform coefficients in way of the decoding and from the second decoder 1805 data on orthogonal transform coefficients in way of the decoding at the standard resolution on an extension layer, make a synthesis of respective data on orthogonal transform coefficients, and again implement a process for entropy encoding and a process for a multiplexing, to create an encoded bit sequence as reencoded, affording in a facilitated manner to reencode decoded components with more diverse spatial resolutions or frequency components and higher qualities than ever, without making a full decoding for creation of decoded picture sequences, and without consuming many operations for calculation.

Further, it is possible to provide a configuration adapted to create an encoded bit sequence as reencoded for conversion into a different encoding style, permitting creation of an encoded bit sequence adaptive to a targeted encoding style.

It is possible to provide decoded picture sequences obtained with more diverse spatial resolutions or frequency components and higher qualities than ever, such as a decoded picture sequence with standard resolution, a super-resolution decoded picture sequence, and a super-resolution picture sequence as decoded. Further, it is possible to make a reencoding on such various decoded picture sequences, to create encoded bit sequences on a single layer.

Accordingly, for instance, in application to those devices such as mobile terminal display devices having a moving picture decoding device mounted thereon under restrictions such as to calculation rate or power consumption, and simply adaptive to such a decoding as enabled with the lower calculation rate or power consumption, or lower encoding transmission rate, the moving picture reencoding system according to this invention can be configured for a reencoding to permit creation of an encoded bit sequence adaptive to a targeted encoding style.

The moving picture reencoding system configured as described is adapted to acquire multiplexed sequences of encoded bits created at a moving picture encoding system according to any of the first to the eighth embodiment or the like, in addition to adaptation of the moving picture reencoding system according to this invention to make a correct decoding, affording to obtain decoded picture sequences with more diverse spatial resolutions or frequency components and higher qualities than ever, such as decoded picture sequences with standard resolution, super-resolution decoded picture sequences, and super-resolution picture sequences as decoded.

Further, it is possible to make a reencoding on such various decoded picture sequences, to create encoded bit sequences on a single layer. Therefore, for instance, in application to those devices such as mobile terminal display devices having a moving picture decoding device mounted thereon under restrictions such as to calculation rate or power consumption, and simply adaptive to such a decoding as enabled with the lower calculation rate or power consumption, or lower encoding transmission rate, the moving picture reencoding system according to this invention can be configured to make a reencoding for conversion to a different encoding style, permitting creation of an encoded bit sequence adaptive to a targeted encoding style.

Description is now made of actions of the reencoding system according shown in FIG. 27, with reference to a flowchart of FIG. 28.

First, the demultiplexer 1801 acquires a sequence of multiplexed bits input thereto, and works thereon complying with a prescribed syntax structure, to make a demultiplexing (step S701) while identifying identification data for identification of among others data on encoding modes and data on parameters of respective types used in encoding processes, on one hand to thereby obtain from the sequence of multiplexed bits a first sequence of encoded bits with the standard resolution and a second sequence of encoded bits with the standard resolution, and on the other hand to further obtain, if available from the sequence of multiplexed bits, a sequence of bits of data on enlargement ratio, a sequence of bits of data on resolution conversion ratio, and a sequence of encoded bits of data on an extension prediction at the standard resolution. After that, the demultiplexer 1801 works to supply the first decoder 1802 with the first sequence of encoded bits and the second decoder 1805 with second sequence of encoded bits, as they are obtained, respectively, and further to obtain data on motion vectors, if available from the sequence of multiplexed bits, and supply to the first decoder 1802.

After that, the demultiplexer 1801 determines whether the AVC rewriting is possible or impossible (step S702). This determination may be based on determination data contained in the sequence of multiplexed bits, for use to determine whether or not the AVC rewriting is possible.

In this system, if the AVC rewriting is possible (YES at the step S702), then the flow branches into a first parallel process (steps S703) and a second parallel process (step S704), to enter subsequent parallel actions.

To the contrary, in this system, if the AVC rewriting is impossible (NO at the step S702), then determining a reencoding as being necessary, the flow branches into a third parallel process (step S707 and step S708) and a fourth parallel process (step S709), to enter subsequent parallel actions.

If the AVC rewriting is possible, the flow goes to the following processes.

In the first parallel process, the first decoder 1802 acquires the first sequence of encoded bits, and implements thereon a process for a prescribed entropy decoding (step S703) combined with a process for an inverse quantization, to create data on orthogonal transform coefficients on the base layer in way of the decoding, and supply to the reencoder 1808. After that, it waits for completion of the second parallel process.

In the second parallel process, the second decoder 1805 acquires the second sequence of encoded bits, and implements thereon a process for a prescribed entropy decoding (step S704) combined with a process for an inverse quantization, to create data on orthogonal transform coefficients on the extension layer in way of the decoding, and supply to the reencoder 1808. After that, it waits for completion of the first parallel process.

With the first and the second parallel process completed, the reencoder 1808 acquires from the first decoder 1802 data on orthogonal transform coefficients on the base layer in way of the decoding, and from the second decoder 1805 data on orthogonal transform coefficients on the extension layer in way of the decoding, and makes thereon a synthesis based on a process for a prescribed synthesizing (step S705), making a prescribed entropy encoding on a result of the synthesis (step S706), to create a sequence of encoded bits as reencoded, and supply to the multiplexer 1809. The foregoing processes are processes when the AVC rewriting is possible.

If the AVC rewriting is impossible, that is when the reencoding is necessary, the flow goes to the following processes.

In the third parallel process, the first decoder 1802 works to acquire from the demultiplexer 1801 a sequence of encoded bits with the standard resolution, and acquire, if available, data on motion vectors, and implements thereon a process for a decoding at the standard resolution (step S707), to create a sequence of decoded pictures, and supply to the second decoder 1805, and to the reencoder 1808 as necessary.

Then, the second decoder 1805 acquires the sequence of decoded pictures created with the standard resolution at the first decoder 1802, and stores in a prescribed buffer for temporary accumulation (step S708). After that, it waits for completion of the fourth parallel process.

In the fourth parallel process, the second decoder 1805 acquires the second sequence of encoded bits from the demultiplexer 1801, and implements thereon a process for a prescribed decoding (step S709), to create decoded difference data with the standard resolution. After that, it waits for completion of the third parallel process.

With the third and the fourth parallel process completed, a first super-resolution enlarger 1803 acquires the sequence of decoded pictures with the standard resolution from the first decoder 1802, and implements thereon a process for a prescribed super-resolution enlargement (step S710), to create a sequence of super-resolution enlarged decoded pictures with a high resolution being a resolution higher than the standard resolution, and supply to the first resolution converter 1804.

Then, the first resolution converter 1804 acquires the sequence of super-resolution enlarged decoded pictures with the high resolution from the first super-resolution enlarger 1803, and implements thereon a process for a prescribed resolution conversion (step S711) to create, from the sequence of super-resolution enlarged decoded pictures with the high resolution being a resolution higher than the standard resolution, a sequence of super-resolution decoded pictures with the standard resolution, and supply to the second decoder 1805, and to the reencoder 1808 as necessary.

Then, the second decoder 1805 acquires the sequence of super-resolution decoded pictures created with the standard resolution at the first resolution converter 1804, and stores in a prescribed buffer for temporary accumulation (step S712).

The second decoder 1805 implements a process for a prescribed prediction (step S713) to create predictive pictures with the standard resolution, and makes an addition of the predictive pictures created with the standard resolution and decoded difference data at the standard resolution, to create a sequence of super-resolution pictures as decoded with the standard resolution, and supply to the reencoder 1808 as necessary.

The reencoder 1808 thus acquires the sequence of decoded pictures with the standard resolution from the first decoder 1802, the sequence of super-resolution decoded pictures with the standard resolution from the first resolution converter 1804, and the sequence of super-resolution pictures with the standard resolution from the second decoder 1805, as necessary, and implements thereon a process for a prescribed encoding to thereby make a reencoding (step S714) to create a sequence of encoded bits, and supply to the multiplexer 1809.

The multiplexer 1809 acquires sequences of encoded bit as reencoded and supplied, and works complying with a prescribed syntax structure, to implement a process for a multiplexing, while inserting identification data for identification of sets of data used in the encoding, involving data on encoding modes and data on parameters of respective types, to create a sequence of encoded bit as multiplexed to output (step S715). The present embodiment involves a series of actions to be complete through the foregoing steps.

According to the present embodiment, there is a moving picture reencoding system operable by execution of the foregoing steps, permitting creation of a sequence of encoded bits as reencoded. It is noted that there have been operations described as being parallel processes according to the present embodiment, while those processed in parallel may be consecutively processed in a configuration operable according to the present embodiment.

Also in the eleventh embodiment, there has been a configuration depicted by a block diagram and described as a hardware, whereas like the first to the tenth embodiment, there may well be a set of functions of the reencoding system in FIG. 27 implemented as software processes using a CPU and a program.

According to the present invention, there are moving picture decoding systems, moving picture decoding methods, and moving picture decoding programs, as well as moving picture reencoding systems, moving picture reencoding methods, and moving picture reencoding programs, having their ranges of application to such apparatuses or systems, methods, and programs as adapted for encoding and decoding moving pictures, without specific limitations. For the present invention, applications cited may involve, for instance, broadcasting equipment typified by TV, mobile telephones, teleconferences, monitors, reproducing systems using a recording medium such as CD, DVD, or Blue-Ray Disc®, recording and reproducing systems using a recordable and rewritable recording medium such as DVD-R/RW or BD-R/RW, HDD, or SD, imaging, recording and reproducing systems such as a camcorder, recording and editing systems such as a an authoring system, and delivering systems for moving pictures.

INDUSTRIAL APPLICABILITY

According to the present invention, there are systems such as a moving picture encoding system, having a first encoder working for services to encode moving pictures input with a standard resolution, in combination with a first super-resolution enlarger working on moving pictures input with the standard resolution, implementing a process for a super-resolution enlargement including information on frequency components in the spatial direction and the temporal direction that has been potentially contained in the input moving pictures but unable to express to a sufficient degree by the standard resolution, followed by implementing processes such as for a prescribed resolution conversion at a first resolution converter, thus permitting a second encoder to make an encoding of moving pictures based on an increased amount of information relative to an information amount of moving pictures input with the standard resolution, as a resultant effect. At the second encoder, as reference signals for the encoding there may be use of, among others, decoded signals as decoded at the first encoder or as additionally processed through processes such as for a second super-resolution enlargement and a second resolution conversion.

Moreover, according to the present invention, there are systems such as a moving picture encoding system, having a first encoder working for services to encode moving pictures input with a standard resolution, in combination with a first super-resolution enlarger working on moving pictures input with the standard resolution, implementing a process for a super-resolution enlargement including information on frequency components in the spatial direction and the temporal direction that has been potentially contained in the input moving pictures but unable to express to a sufficient degree by the standard resolution, followed by an encoding of thus obtained signals at a third encoder, permitting the third encoder to make an encoding of moving pictures based on an increased amount of information relative to an information amount of moving pictures input with the standard resolution, as a resultant effect. At the third encoder, as reference signals for the encoding there may be use of decoded signals as decoded at the first encoder and processed through processes such as for a second super-resolution enlargement or a third resolution conversion to enhance the resolution up to the same resolution as first super-resolution enlarged signals. Still more, according to the present invention, there are systems such as a moving picture decoding system, adapted to input thus encoded moving pictures to decode, and yet more, according to the present invention, there are systems such as a moving picture reencoding system, adapted to input thus encoded moving pictures to decode and reencode.

REFERENCE SIGNS LIST 101 first accumulation buffer
102 first encoder
103 first super-resolution enlarger
104 first resolution converter
105 second super-resolution enlarger
106 second resolution converter
107 second encoder
108 third encoder
109 multiplexer
110 third resolution converter
1801 demultiplexer
1802 first decoder
1803 first super-resolution enlarger
1804 first resolution converter
1805 second decoder
1806 second resolution converter
1807 third decoder
1808 reencoder
1809 multiplexer

The invention claimed is:
1. A moving picture encoding system comprising:
a first encoder configured to work on a subsequence of a sequence of moving pictures with a standard resolution to implement a first combination of processes for an encoding and a decoding to create a first sequence of encoded bits and a set of decoded pictures with the standard resolution;
a first super-resolution enlarger configured to work on the subsequence of the sequence of moving pictures with the standard resolution to implement an interpolation of pixels with a first enlargement to create a set of super-resolution enlarged pictures with a first resolution higher than the standard resolution;
a first resolution converter configured to work on the set of super-resolution enlarged pictures to implement a process for a first resolution conversion to create a set of super-resolution enlarged and converted pictures with a standard resolution;
a second super-resolution enlarger configured to acquire the set of decoded pictures with the standard resolution from the first encoder to work on the sequence of decoded pictures to implement an interpolation of pixels with a second enlargement to create a set of super-resolution enlarged decoded pictures with a second resolution higher than the standard resolution;
a second resolution converter configured to work on the set of super-resolution enlarged decoded pictures to implement a process for a second resolution conversion to create a set of super-resolution enlarged and converted decoded pictures with a standard resolution; and
a second encoder configured to:
have the set of super-resolution enlarged and converted pictures from the first resolution converter as a set of encoding target pictures, the set of decoded pictures from the first encoder as a set of first reference pictures, and the set of super-resolution enlarged and converted decoded pictures from the second resolution converter as a set of second reference pictures,
select one of the set of first reference pictures and the set of second reference pictures to create reference picture selection information to identify the set of selected reference pictures to implement a second process for encoding to create a second sequence of encoded bits based on the set of encoding target pictures and the set of selected reference pictures, and
implement a third process for encoding for the reference picture selection information to create a sequence of encoded bits of the reference picture selection information,
wherein the set of encoding target pictures, the set of first reference pictures, and the set of second reference pictures have the same value in spatial resolution.

2. A moving picture decoding system comprising:

a demultiplexer configured to work on a sequence of input encoded bits to implement a process for a prescribed demultiplexing to output at least a first and a second sequence of encoded bits;

a first decoder configured to acquire the first sequence of encoded bits obtained with a standard resolution at the demultiplexer to implement thereon a process for a prescribed first decoding to create a sequence of decoded pictures with a standard resolution;

a first super-resolution enlarger configured to acquire the sequence of decoded pictures created with a standard resolution at the first decoder to work on the sequence of decoded pictures to implement an interpolation of pixels with a first enlargement to create a sequence of super-resolution enlarged decoded pictures with a first resolution higher than a standard resolution;

a first resolution converter configured to acquire the sequence of super-resolution enlarged decoded pictures created at the first super-resolution enlarger to work on the sequence of super-resolution enlarged decoded pictures to implement a process for a prescribed resolution conversion to create a sequence of super-resolution decoded pictures with a standard resolution;

a second decoder configured to acquire the second sequence of encoded bits obtained with a standard resolution at the demultiplexer as a set of decoding targets, the sequence of decoded pictures created with the standard resolution at the first decoder as a set of first reference pictures, and the sequence of super-resolution decoded pictures created with the standard resolution at the first resolution converter as a set of second reference pictures, and select one of the set of first reference pictures and the set of second reference pictures based on reference picture selection information to implement a combination of processes for a prescribed prediction and a prescribed second decoding being a decoding with an extension of the standard resolution, to create a sequence of super-resolution pictures decoded with the standard resolution based on the set of decoding targets and the set of selected reference pictures; and a second resolution converter configured to acquire the sequence of decoded pictures with the standard resolution from the first decoder to work on the sequence of decoded pictures to implement an interpolation of pixels with the second enlargement to create a sequence of enlarged decoded pictures with a high resolution as a second resolution higher than the standard resolution, wherein the set of decoding targets, the set of first reference pictures, and the set of second reference pictures have the same value in spatial resolution.

3. A moving picture decoding method comprising:

a step of implementing a process for a prescribed demultiplexing on a sequence of input encoded bits, outputting at least a first and a second sequence of encoded bits;

a step of acquiring the first sequence of encoded bits obtained with a standard resolution through the process for the prescribed demultiplexing, implementing thereon a process for a prescribed first decoding, creating a sequence of decoded pictures with the standard resolution;

a step of acquiring the sequence of decoded pictures created with the standard resolution through the process for the prescribed first decoding, working on the sequence of decoded pictures to implement an interpolation of pixels with a first enlargement, creating a sequence of super-resolution enlarged decoded pictures with a first resolution higher than the standard resolution;

a step of acquiring the sequence of super-resolution enlarged decoded pictures created through the process for the prescribed super-resolution enlargement working on the sequence of super-resolution enlarged decoded pictures to implement a process for a first resolution conversion, creating a sequence of super-resolution decoded pictures with a standard resolution;

a step of acquiring the second sequence of encoded bits obtained with a standard resolution through the process for the prescribed demultiplexing as a set of decoding targets, the sequence of decoded pictures created with the standard resolution through the process for the prescribed first decoding as a set of first reference pictures, and the sequence of super-resolution decoded pictures created with the standard resolution through the process for the prescribed resolution conversion as a set of second reference pictures, and selecting one of the set of first reference pictures and the set of second reference pictures based on reference picture selection information to implement a combination of processes for a prescribed prediction and a prescribed second decoding being a decoding with an extension of the standard resolution, based on the set of decoding targets and the set of selected reference pictures to create a sequence of super-resolution pictures decoded with the standard resolution; and a step of acquiring the sequence of decoded pictures created with the standard resolution through the process for the prescribed first decoding working on the sequence of decoded pictures to implement an interpolation of pixels with the second enlargement, creating a sequence of enlarged decoded pictures with a high resolution as a second resolution higher than the standard resolution, wherein the set of decoding targets, the set of first reference pictures, and the set of second reference pictures have the same value in spatial resolution.

4. A recording medium storing a moving picture decoding program comprising a non-transitory computer-readable medium configured to have a computer execute:

a step of implementing a process for a prescribed demultiplexing on a sequence of input encoded bits, outputting at least a first and a second sequence of encoded bits;

a step of acquiring the first sequence of encoded bits obtained with a standard resolution through the process for the prescribed demultiplexing, implementing thereon a process for a prescribed first decoding, creating a sequence of decoded pictures with the standard resolution;

a step of acquiring the sequence of decoded pictures created with the standard resolution through the process for the prescribed first decoding, working on the sequence of decoded pictures to implement an interpolation of pixels with a first enlargement, creating a sequence of super-resolution enlarged decoded pictures with a first resolution higher than the standard resolution;

a step of acquiring the sequence of super-resolution enlarged decoded pictures created through the process for the prescribed super-resolution enlargement working on the sequence of super-resolution enlarged decoded pictures to implement a process for a first resolution conversion, creating a sequence of super-resolution decoded pictures with a standard resolution;

a step of acquiring the second sequence of encoded bits obtained with a standard resolution through the process for the prescribed demultiplexing as a set of decoding targets, the sequence of decoded pictures created with the standard resolution through the process for the prescribed first decoding as a set of first reference pictures, and the sequence of super-resolution decoded pictures created with the standard resolution through the process for the prescribed resolution conversion as a set of second reference pictures, and selecting one of the set of first reference pictures and the set of second reference pictures based on reference picture selection information to implement a combination of processes for a prescribed prediction and a prescribed second decoding being a decoding with an extension of the standard resolution, based on the set of decoding targets and the set of selected reference pictures to create a sequence of super-resolution pictures decoded with the standard resolution; and a step of acquiring the sequence of decoded pictures created with the standard resolution through the process for the prescribed first decoding, working on the sequence of decoded pictures to implement an interpolation of pixels with the second enlargement creating a sequence of enlarged decoded pictures with a high resolution as a second resolution higher than the standard resolution, wherein the first resolution is different from the second resolution, wherein the standard resolution of the second sequence of encoded bits is the same as the standard resolution of the super-resolution decoded pictures, and wherein the set of decoding targets, the set of first reference pictures, and the set of second reference pictures have the same value in spatial resolution.

5. The moving picture encoding system according to claim 1, wherein the first super-resolution enlarger comprises:

a positioner configured to work in a processing for super-resolution enlargement, on a combination of a base picture constituting a base therein and one or more observation pictures to be based on, to make a positioning to pixel positions of a desirable high resolution, for an interval-unequal sampling to create nonhomogeneous high resolution pictures;

an interpolator configured to work on nonhomogeneous high resolution pictures created at the positioner, to implement a process for a prescribed nonhomogeneous interpolation to create interpolated pictures with a desirable high resolution;

an estimated picture creator configured to acquire interpolated pictures created at the interpolator, to implement thereon a process for a prescribed reconstruction to create estimated pictures with a desirable resolution; and a repetition determiner configured to acquire a nonhomogeneous high resolution picture from the positioner and a nonhomogeneous estimated picture from the estimated picture creator, for employment of the acquired pictures to follow a prescribed determination method to determine whether or not a repetition of the processing for super-resolution enlargement is necessary, and work depending on a result thereof, to operate as the repetition is necessary, to provide the interpolator with information for a control to continue the processing, and operate as the repetition is unnecessary, to provide the estimated picture creator with information for a control to output a set of estimated pictures with a high resolution after super-resolution enlargement.

6. The moving picture encoding system according to claim 1, further comprising a multiplexer configured to operate complying with a prescribed syntax structure to multiplex the first sequence of encoded bits from the first encoder, the second sequence of encoded bits from the second encoder, and information on encoding parameters of respective types used in the encoding at the first encoder and the encoding at the second encoder.

7. The moving picture encoding system according to claim 1, further comprising:

a first accumulation buffer configured to work in a course before the first encoder and the first super-resolution enlarger, to accumulate subsequences of the sequence of moving pictures with the standard resolution;

a second accumulation buffer configured to work in a course between the first encoder and the second encoder, to accumulate sets of decoded pictures from the first encoder;

an accumulation controller configured to work for detections of buffer accumulation amounts at the first accumulation buffer, the second accumulation buffer, the first encoder, and the second encoder, to control the buffer accumulation amounts; and a code rate controller configured to work on bases of the detections of buffer accumulation amounts at the accumulation controller, to control code rates at the first encoder and the second encoder.

8. A moving picture encoding method comprising:

a step of implementing a first combination of processes for an encoding and a decoding on a sequence of moving pictures with a standard resolution, creating a first sequence of encoded bits and a set of decoded pictures with the standard resolution;

a step of implementing an interpolation of pixels with a first enlargement on the sequence of moving pictures with the standard resolution, creating a set of super-resolution enlarged pictures with a first resolution higher than a standard resolution;

a step of implementing a process for a first resolution conversion on the set of super-resolution enlarged pictures, creating a set of super-resolution enlarged and converted pictures with a standard resolution;

a step of acquiring the set of decoded pictures with the standard resolution to work on the sequence of decoded pictures to implement an interpolation of pixels with a second enlargement to create a set of super-resolution enlarged decoded pictures with a second resolution higher than the standard resolution;

a step of working on the set of super-resolution enlarged decoded pictures to implement process for a second resolution conversion to create a set of super-resolution enlarged and converted decoded pictures with a standard resolution; and a step of:

having the set of super-resolution enlarged and converted pictures as a set of encoding target pictures, the set of decoded pictures as a set of first reference pictures, and the set of super-resolution enlarged and converted decoded pictures as a set of second reference pictures, selecting one of the set of first reference pictures and the set of second reference pictures to create reference picture selection information to identify the set of selected reference pictures to implement a second process for encoding to create a second sequence of encoded bits based on the set of encoding target pictures and the set of selected reference pictures, and implementing a third process for encoding for the reference picture selection information to create a sequence of encoded bits of the reference picture selection information, wherein the set of encoding target pictures, the set of first reference pictures, and the set of second reference pictures have the same value in spatial resolution.

9. A recording medium storing a moving picture encoding program comprising a non-transitory computer-readable medium configured to have a computer execute:

a step of implementing a first combination of processes for an encoding and a decoding on a sequence of moving pictures with a standard resolution, creating a first sequence of encoded bits and a set of decoded pictures with the standard resolution;

a step of implementing an interpolation of pixels with a first enlargement on the sequence of moving pictures with the standard resolution, creating a set of super-resolution enlarged pictures with a first resolution higher than the standard resolution;

a step of implementing process for a first resolution conversion on the set of super-resolution enlarged pictures, creating a set of super-resolution enlarged and converted pictures with a standard resolution;

a step of acquiring the set of decoded pictures with the standard resolution from the first encoder to work on the sequence of decoded pictures to implement an interpolation of pixels with a second enlargement to create a set of super-resolution enlarged decoded pictures with a second resolution higher than the standard resolution;

a step of working on the set of super-resolution enlarged decoded pictures to implement a process for a second resolution conversion to create a set of super-resolution enlarged and converted decoded pictures with a standard resolution; and a step of:

having the set of super-resolution enlarged and converted pictures as a set of encoding target pictures, the set of decoded pictures as a set of first reference pictures, and the set of super-resolution enlarged and converted decoded pictures as a set of second reference pictures, selecting one of the set of first reference pictures and the set of second reference pictures to create reference picture selection information to identify the set of selected reference pictures to implement a second process for encoding to create a second sequence of encoded bits based on the set of encoding target pictures and the set of selected reference pictures, and implementing a third process for encoding for the reference picture selection information to create a sequence of encoded bits of the reference picture selection information, wherein the set of encoding target pictures, the set of first reference pictures, and the set of second reference pictures have the same value in spatial resolution.

10. The moving picture encoding system according to claim 1, wherein the second encoder divides an encoding target picture into a plurality of regions to select one of the set of first reference pictures and the set of second reference pictures for each divided region.

11. The moving picture decoding system according to claim 2, wherein the second decoder divides a decoding target into a plurality of regions to select one of the set of first reference pictures and the set of second reference pictures for each divided region.

* * * * *